United States Patent
Suzuki et al.

[19]

[11] Patent Number: 6,005,690
[45] Date of Patent: *Dec. 21, 1999

[54] STILL PICTURE SYSTEM

[75] Inventors: Kiyosuke Suzuki, Saitama; Noboru Koyama, Kanagawa; Fumihiko Kaise, Tokyo; Hiroe Honma, Chiba, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/648,097

[22] PCT Filed: Sep. 21, 1995

[86] PCT No.: PCT/JP95/01912

§ 371 Date: Jun. 19, 1996

§ 102(e) Date: Jun. 19, 1996

[87] PCT Pub. No.: WO96/09716

PCT Pub. Date: Mar. 28, 1996

[30] Foreign Application Priority Data

Sep. 21, 1994 [JP] Japan .................................. 6-226232

[51] Int. Cl.⁶ .............................. G03F 3/10; H04N 1/00; G06K 9/00; G06K 9/32
[52] U.S. Cl. .......................... 358/527; 358/403; 382/166; 382/167; 382/240; 382/274; 382/299; 382/306
[58] Field of Search .................................. 382/162, 166, 382/167, 240, 258, 274, 305, 306, 299; 358/403, 527

[56] References Cited

U.S. PATENT DOCUMENTS

| 4,805,039 | 2/1989 | Otake et al. | 386/52 |
|---|---|---|---|
| 5,128,748 | 7/1992 | Murakami et al. | 358/75 |
| 5,184,227 | 2/1993 | Foley | 358/302 |
| 5,218,455 | 6/1993 | Kristy | 358/403 |
| 5,270,831 | 12/1993 | Parulski et al. | 358/403 |
| 5,315,400 | 5/1994 | Kurata et al. | 358/335 |
| 5,321,520 | 6/1994 | Inga et al. | 358/403 |
| 5,381,526 | 1/1995 | Ellson | 395/164 |
| 5,383,029 | 1/1995 | Kojima | 358/403 |
| 5,402,881 | 4/1995 | Manico | 206/225 |
| 5,440,401 | 8/1995 | Parulski et al. | 382/305 |
| 5,543,925 | 8/1996 | Timmermans | 358/310 |
| 5,764,870 | 6/1998 | Manico et al. | 395/117 |

FOREIGN PATENT DOCUMENTS

| 0435174 A2 | 7/1991 | European Pat. Off. | G06F 15/64 |
|---|---|---|---|
| 0449529 A2 | 10/1991 | European Pat. Off. | H04N 1/32 |
| 62-248376 | 10/1987 | Japan | H04N 1/387 |
| 62-293882 | 12/1987 | Japan | H04N 1/21 |
| 63-73474 | 4/1988 | Japan | G06F 15/40 |
| 2-202766 | 8/1990 | Japan | H04N 1/21 |
| 3-22472 | 3/1991 | Japan | H04N 1/387 |
| 4-2264 | 1/1992 | Japan | H04N 1/21 |
| 5-108732 | 4/1993 | Japan | G11B 27/00 |
| 6-314325 | 11/1994 | Japan | G06F 15/62 |
| WO 92/05504 | 4/1992 | WIPO | G06F 15/40 |

*Primary Examiner*—Jon Chang
*Assistant Examiner*—Mehrdad Dastouri
*Attorney, Agent, or Firm*—Limbach & Limbach L.L.P.

[57] ABSTRACT

At a storage unit 5, at least intermediate resolution picture data for monitor display, high resolution picture data for print, and print control data for controlling print operation of the high resolution picture data are recorded onto an optical disc. At the time of print operation, a system controller 6 reproduces print control data recorded on the optical disc to control a picture processing block 3, and a printer unit 2, etc. so as to implement thereto, e.g., expansion processing and/or color processing of picture, etc. corresponding to the print control data to carry out print operation.

Thus, at the time of print operation, user can automatically carry out print out operation without designating print operation.

35 Claims, 41 Drawing Sheets

FORMAT TABLE

| FIELD NAME | NO. OF BYTES | DATA FORM |
|---|---|---|
| TABLE ID | 1 | B |
| NEXT TABLE POINTER | 1 | B |
| FORMAT VERSION | 2 | B |
| FILE FORM | 1 | B |
| FILE FORM VERSION | 1 | B |
| NO. OF ALL TABLES | 1 | B |
| RESERVE (SPACE) | 1 | B |
| DATA START ADDRESS | 4 | B |
| DATA SIZE | 4 | B |
| RESERVE (SPACE) | 4 | |

FIG.22

PICTURE PARAMETER TABLE

| FIELD NAME | NO. OF BYTES | DATA FORM |
|---|---|---|
| TABLE ID | 1 | B |
| NEXT TABLE POINTER | 1 | B |
| PICTURE SIZE BREADTH | 2 | B |
| PICTURE SIZE LENGTH | 2 | B |
| PICTURE COMPONENT | 1 | B |
| DISCRIMINATION BETWEEN LENGTH AND BREADTH | 1 | B |
| WIDE ID | 1 | B |
| COMPRESSION RATE | 1 | B |
| COPY RIGHT, EDITORIAL RIGHT | 1 | B |
| INPUT EQUIPMENT KIND | 1 | B |
| RESERVE (SPACE) | 3 | B |
| EXISTENCE OF DUMMY DATA | 1 | B |
| X-BIGIN OF VALID DATA | 2 | B |
| Y-BIGIN OF VALID DATA | 2 | B |
| X-SIZE OF VALID DATA | 2 | B |
| Y-SIZE OF VALID DATA | 2 | B |
| RESERVE (SPACE) | 4 | B |

FIG.23

OV_INF. PMF FILE (OVERALL INFORMATION MANAGEMENT FILE)

HEADER:

| | |
|---|---|
| FORMAT TABLE | {ESSENTIAL} |
| NAME TABLE | {OPTION} |
| COMMENT TABLE | {OPTION} |
| DISC ID TABLE | {OPTION} |
| OPTION TABLE | {OPTION} |

DATA:

| FIELD NAME | NO. OF BYTES | DATA FORM |
|---|---|---|
| TOTAL NO. OF PICTURES | 2 | B |
| NEXT PICTURE DIRECTORY NO. | 2 | B |
| TOTAL NO. OF PICTURE DIRECTORIES | 2 | B |
| NO. OF REPRODUCTION CONTROL FILES | 1 | B |
| PRESENCE OR ABSENCE OF PMSE Q DIRECTORY | | |
| NO. OF RGB MUSICS | 1 | B |
| NO. OF PRINT DATA FILES | 1 | B |
| PRESENCE OR ABSENCE OF TELOP DATA FILE | 1 | B |
| PRESENCE OR ABSENCE OF RETRIEVAL INFORMATION FILE | 1 | B |
| AUTOMATIC START FILE NO. | 1 | B |
| LAST ACCESS PICTURE DIRECTORY NO. | 2 | B |
| LAST ACCESS PICTURE NO. | 2 | B |
| PASS WORD | 8 | B |
| NARRATION LANGUAGE INFORMATION | 6 | B |
| RESERVE | 2 | |
| PICTURE DIRECTORY INFORMATION UNIT | 48 × N | |

FIG.24(a)

| PICTURE DIRECTORY | NO. OF BYTES | DATA FORM |
|---|---|---|
| DIRECTORY NO. | 2 | B |
| INDEX PICTURE NO. | 2 | B |
| NO. OF PICTURES WITHIN DIRECTORY | 2 | B |
| INDEX PICTURE INDIVIDUAL INFORMATION | 1 | B |
| CHARACTER ID CODE | 1 | B |
| DIRECTORY NAME | 36 | A OR C |
| RESERVE | 4 | B |

FIG.24(b)

PIC_INF. PMF FILE (PICTURE DATA MANAGEMENT FILE)

| HEADER | | |
|---|---|---|
| | FORMAT TABLE | {ESSENTIAL} |
| | NAME TABLE | {OPTION} |
| | COMMENT TABLE | {OPTION} |
| | OPTION TABLE | {OPTION} |

DATA:

| FIELD NAME | NO. OF BYTES | DATA FORM |
|---|---|---|
| LINK ID | 1 | B |
| RESERVE | 3 | B |
| NEXT PICTURE NO. | 2 | B |
| NO. OF PICTURES | 2 | B |
| RESERVE | 2 | |
| NO. OF PICTURE INDEX FILES | 1 | B |
| NEXT PICTURE INDEX FILE NO. | 1 | B |
| INDEX FILE INFORMATION | 4 × 256 | |
| PICTURE INFORMATION UNIT | 16 × N | |

FIG.25(a)

| PICTURE INFORMATION UNIT | NO. OF BYTES | DATA FORM |
|---|---|---|
| DIRECTORY NO. | 2 | B |
| PICTURE NO. | 2 | |
| PICTURE KIND INFORMATION | 1 | |
| PICTURE INDIVIDUAL INFORMATION | 1 | |
| NO. OF LINKS | 1 | |
| NARRATION INFORMATION | 1 | |
| KEY WORD RETRIEVAL DATA NO. | 2 | |
| TIME STAMP RETRIEVAL DATA NO. | 2 | |
| TELOP NO. | 2 | |
| RESERVE | 2 | |

FIG.25(b)

OV_IDX. PMX FILE (OVERALL INDEX FILE)

| | NO. OF BYTES |
|---|---|
| HEADER — INDEX PICTURE DATA 0 | 4096 |
| INDEX PICTURE DATA 1 | 4096 |
| INDEX PICTURE DATA 2 | 4096 |
| ⋮ | ⋮ |
| INDEX PICTURE DATA N-1 | 4096 |
| INDEX PICTURE DATA N | 4096 |

FIG.28(a)

INDEX PICTURE DATA

| HEADER | FORMAT TABLE | {OPTION} |
|---|---|---|
| | SPACE | {OPTION} |

| | FIELD NAME | NO. OF BYTES | DATA FORM |
|---|---|---|---|
| HEADER | DATA (JPEG) | | |
| | SPACE | | |

FIG.28(b)

PIDXnnn. PMX FILE (PICTURE INDEX FILE)

| | NO. OF BYTES |
|---|---|
| HEADER — INDEX PICTURE DATA 0 | 4096 |
| HEADER — INDEX PICTURE DATA 1 | 4096 |
| INDEX PICTURE DATA 2 | 4096 |
| ⋮ | ⋮ |
| INDEX PICTURE DATA N-1 | 4096 |
| INDEX PICTURE DATA N | 4096 |

| PRINT INFORMATION UNIT | NO. OF BYTES | DATA FORM |
|---|---|---|
| PICTURE DIRECTORY NO. | 2 | B |
| PICTURE NO. | 2 | B |
| PICTURE KIND | 1 | B |
| NO. OF PRINT | 1 | B |
| RESERVE | 1 | |
| EXTRACTION ID | 1 | B |
| EXTRACTION START POSITION X | 2 | B |
| EXTRACTION START POSITION Y | 2 | B |
| EXTRACTION SIZE X | 2 | B |
| EXTRACTION SIZE Y | 2 | B |
| ROTATION ID | 1 | B |
| MIRROR ID | 1 | B |
| PRINT SIZE ID | 1 | B |
| REGULAR SHAPE DESIGNATION | 1 | B |
| NON-REGULAR SHAPE DESIGNATION X | 2 | B |
| NON-REGULAR SHAPE DESIGNATION Y | 2 | B |
| MULTI ID | 1 | B |
| MULTI MODE | 1 | B |
| CAPTION ID | 1 | B |
| CAPTION KIND | 1 | B |
| COLOR PROCESSING ID | 1 | B |
| R GAIN | 1 | B |
| G GAIN | 1 | B |
| B GAIN | 1 | B |
| CONTRAST | 1 | B |
| BRIGHTNESS | 1 | B |
| SHARPNESS | 1 | B |
| SATURATION | 1 | B |
| HUE | 1 | B |
| RESERVE | 3 | |

FIG.31

STILL PICTURE SYSTEM

TECHNICAL FIELD

This invention relates to a still picture system for recording/reproducing, e.g., still picture information formed by reading a picture from e.g., negative film or photograph, etc., or still picture information from camera device, video tape recorder equipment or monitor device, etc. to print pictures corresponding thereto.

BACKGROUND ART

As a system for obtaining a still picture which has been subjected to print (i.e., printed) in recent years, a system of taking images of objects by using a camera device in which, eg. , photographic film of 35 mm is loaded to take the photographed film for photograph to a shop (store) to designate development and print to thereby obtain the developed negative film and photographs on which photographed objects are printed is popular.

However, in such system of obtaining still picture, when user takes a film which has been photographed to a shop (store), it is necessary to designate the number of prints. This was very troublesome. Moreover, in carrying out additional print of a desired photograph, user marks, with sign pen, etc., a negative film taken with him to designate a desired picture or pictures. However, there have frequently taken place the case where inconvenience such that additionally printed photograph is not in correspondence with the designated photograph by erroneous marking, etc. Further, in carrying out "color designation" to obtain a photograph in which, e.g., red is emphasized, etc., an approach is employed to designate a picture to designate the portion in which red is desired to be emphasized of the picture, thereby making it possible to obtain a photograph of desired hue (tint). However, since such color designation is subjective designation of user, inconveniences such that a completed photograph has not desired hue (tint) took place.

Further, since the developing unit for developing film and the print unit for carrying out print from the developed film are very expensive, these units are not ordinarily installed within a shop (store) to which user takes a photographed film, but are installed at a processing laboratory for specially carrying out development, etc. For this reason, when the shop side receives already photographed film from user, they (the shop side) send (deliver) the already photographed film to the processing laboratory along with request of user such as the number of prints and or color designation, etc. as described above. The processing laboratory develops the photographed film received from the shop side to form negative film, and to form photographs corresponding to the user's request on the basis of this negative film to send them back to the shop side. Thus, user receives the negative film and photographs from the shop side. Accordingly, in the case of conventionally obtaining still picture, the film etc. is alternated between user, shop and processing laboratory. As a result, it has taken place inconvenience in which means (route) of acquisition is complicated and the request cannot be also precisely transmitted.

On the other hand, in the Official Patent Publication of No. 501932/1993 (International Laid Open No. WO92/05504), "Image data base having low resolution index image data" is disclosed. In accordance with this image data base, picture data is recorded onto a digital data recording medium onto which it can be written once to carry out print on the basis of the picture data recorded on the optical disc to thereby obtain still picture.

However, in this image data base, an optical disc on which data can be recorded only once (so called write once disc) is used as a recording medium, and it is thus impossible to rewrite data which has been once recorded on the disc. For this reason, the system using such image data base was a system only having a function to record picture data onto the optical disc at the shop side, and to reproduce that picture data at the user side. Accordingly, also in this system, it is necessary to orally carry out, in prints, request of user such as the number of prints or color designation, etc. A new system which replaces the system of obtaining still picture conventionally proposed has not been provided.

In view of such actual circumstances, this invention has been made, and its object is to provide a picture control apparatus, a recording medium, a picture control system and a picture control method which realize a new still picture control system which replaces the conventional system of obtaining still picture.

DISCLOSURE OF THE INVENTION

A picture control apparatus according to this invention is directed to a picture control apparatus for controlling picture data obtained from a recording medium, wherein the recording medium includes first picture file including picture data of first resolution (hereinafter simply referred to as first resolution data depending upon circumstances) and second picture file including picture data of second resolution (hereinafter simply referred to as second picture data depending upon circumstances) higher than the first resolution and caused to be related to the first picture file. Moreover, the picture control apparatus includes picture processing means for implementing desired picture processing to the first picture data reproduced from the recording medium, control data generating means for generating control data for indicating picture processing implemented to the first picture data by the picture processing means, and recording means for recording, onto the recording medium, the control data generated by the control data generating means as control data file different from the first picture file and the second picture file in a manner related to the second picture file.

In more practical sense, the first picture file is intermediate resolution picture file data including, e.g., intermediate resolution picture data for monitor display as picture data of first resolution, and the second picture file is high resolution picture file including high resolution picture data for print as picture data of second resolution.

In the picture control apparatus for controlling such respective picture data, when desired picture processing is implemented to the first picture data reproduced from the recording medium by the picture processing means, the control data generating means generates print control data as control data indicating picture processing implemented to the first picture data (intermediate resolution picture data). Further, the recording means records control data generated by the control data generating means onto the recording medium as print data file which is control data file different from the first and second files in a manner related to the second picture data (high resolution picture data).

Thus, a recording medium on which print control data for controlling print operation is recorded along with at least intermediate resolution picture data for monitor display and high resolution picture data for printer can be formed. For this reason, request such as the number of prints or color designation, etc. can be recognized only by reproducing the recording medium. In print, there is no necessity of carrying out request therefor orally or by any other means. Thus, convenience can be improved.

Moreover, user is caused to have such recording medium and the shop side is caused to have the picture control apparatus (unit) to which a printer unit is connected, whereby, without necessity of allowing user who has taken the recording medium to make orally, etc. request relating to print, an approach is employed at the shop side to reproduce the recording medium which has been taken to thereby recognize it, thus making it possible to carry out print out. For this reason, print miss resulting from erroneous hearing, etc. of request can be prevented. In addition, as the system of obtaining still picture, it is possible to provide a simplified available (acquisition) system in which "processing laboratory" is not required. For this reason, entirely new available system can be realized as the system of obtaining still picture.

Further, a recording medium according to this invention includes: picture file including first picture file including picture data of first resolution, and second picture file including picture data of second resolution higher than the first resolution and caused to be related to the first picture file; and control data file formed as file different from the picture file and in which control data generated on the basis of first picture data to which desired picture processing has been implemented is recorded in a manner related to the second picture data. In addition, the recording medium includes control data management file including control data file management information unit for carrying out management of the control data file, and management information table for carrying out, in first recording units of the recording medium, management of recording positions of the picture file, the control data file and the control data management file.

In more practical sense, the first picture file is intermediate resolution picture file including intermediate resolution picture data for monitor display as picture data of first resolution, and the second picture file is high resolution picture file including high resolution picture data for print as picture data of second resolution. In addition, the control data file is print data file for carrying out print control of the high resolution picture data for print.

The control data file is caused to undergo management by control data management file including control data file management information unit. In addition, recording positions of the picture file, the control data file and the control data management file are caused to undergo management, in first recording units (e.g., 1 cluster unit) of the recording medium, by the management information table.

Thus, a recording medium on which print control data for controlling print operation is recorded along with at least intermediate resolution picture data for monitor display and high resolution picture data for print can be formed. For this reason, similarly to the above-described picture control apparatus, print miss resulting from erroneous hearing of request relating to print can be prevented, and entirely novel simplified available system which does not require "processing laboratory" can be realized as the system of obtaining still picture.

Moreover, a picture control system according to this invention is directed to a picture control system in which a recording medium including first picture file including first resolution picture data and second picture file including picture data of second resolution higher than the first resolution and caused to be related to the first picture file is loaded into a first picture control unit or a second picture control unit to control picture data obtained from the recording medium.

Further, the first picture control unit comprises first picture processing means for implementing desired picture processing to the first picture data reproduced from the recording medium, control data generating means for generating control data for indicating picture processing implemented to the first picture data by the first picture processing means, and recording means for recording, onto the recording medium, control data generated by the control data generating means as control data file different from the first picture file or the second picture file in a manner caused to be related to the second picture file.

In addition, the second picture control unit comprises reproducing means for reproducing, from the recording medium, the second picture data and control data corresponding to the second picture data, and second picture processing means for implementing picture processing to the reproduced second picture data on the basis of the control data reproduced from the reproducing means.

In more practical sense, the first picture file is intermediate resolution picture file including first picture data which is intermediate resolution picture data for monitor display, and the second picture file is high resolution picture file including second picture data which is high resolution picture data for print.

In such a picture control system, when picture processing that user desires is implemented to the first picture data which is the intermediate resolution picture data by the first picture processing means, the control data generating means forms print control data as control data indicating picture processing implemented to the first picture data. Further, the recording means records, onto the recording means, the print control data as control data file (print data file) different from the first and second picture files.

Moreover, the second picture control unit is operative to reproduce at least the high resolution picture data and the print data file from the recording medium by the reproducing means, and to implement, by the second picture processing means, picture processing corresponding to print control data of the print data file to the high resolution picture data. By the second picture control unit, the picture data to which the picture processing corresponding to the print control data has been implemented is delivered to, e.g., a print unit externally connected.

Thus, picture processing that user has designated by using the first picture control unit is automatically carried out at the second picture control unit side, thus making it possible to obtain print picture that user desires. Accordingly, similarly to the above-described picture control unit and the recording medium, print miss resulting from erroneous hearing of request relating to print can be prevented, and entirely novel simplified available system which does not require "processing laboratory" can be realized as the system of obtaining still picture.

Moreover, a picture control method according to this invention is directed to a picture control method in which a recording medium comprising first picture file including picture data of first resolution and second picture file including picture data of second resolution higher than the first resolution and caused to be related to the first picture file is loaded into a first picture control unit or a second picture control unit to control picture data obtained from the recording medium, characterized in that the method comprises steps as described below.

Initially, as step (a), in the first picture control unit, desired picture processing is implemented to the first picture data reproduced from the recording medium. Subsequently, as step (b), in the first picture control unit, control data is generated on the basis of the first picture data which has been caused to undergo picture processing at the step (a). Subsequently, as step (c), in the first picture control unit, the control data generated at the step (b) is recorded onto the recording medium as control data file different from the first picture file and the second picture file in a manner caused to be related to the second picture data. As step (d), in the second picture control unit, the second picture data and control data corresponding to the second picture data recorded at the step (c) are reproduced from the recording medium. Subsequently, as step (e), in the second picture control unit, picture processing is implemented to the second picture data reproduced at the step (d) on the basis of the control data reproduced at the step (d).

In more practical sense, the first picture file is intermediate resolution picture file including intermediate resolution picture data for monitor display as the picture data of first resolution, and the second picture file is high resolution picture file including high resolution picture data for print as picture data of second resolution.

At the step (b), print control data which is control data is formed on the basis of the first picture data which has been caused to undergo picture processing at the step (a). This print control data is caused to be related to high resolution picture data which is the picture data of second resolution, and is then recorded onto the recording medium as print data file.

The high resolution picture data and the print data file recorded on the recording medium are reproduced by the second picture control unit at the step (d). Then, at the step (e), picture processing is implemented to the high resolution picture data in dependency upon print control data of print data file. The high resolution picture data which has been caused to undergo picture processing is delivered to a print unit externally connected.

Thus picture processing that user has designated by using the first picture control unit is automatically carried out at the second picture control unit side, thus making it possible to obtain print picture that user desires. Accordingly, similarly to the picture control unit and the recording medium as described above, print miss resulting from erroneous hearing, etc. of request relating to print can be prevented, and simplified entirely the novel available system which does not require "processing laboratory" can be realized as the system of obtaining still picture.

BRIEF DESCRIPTION OF THE DRAWINGS

FIG. 22 is a view for explaining format table in the hierarchical directory structure.

FIG. 23 is a view for explaining picture parameter table in the hierarchical directory structure.

FIG. 24 is a view for explaining overall information management file in the hierarchical directory structure.

FIG. 25 is a view for explaining picture data management file in the hierarchical directory structure.

FIG. 28 is a view for explaining overall index file in the hierarchical directory structure.

FIG. 31 is a view for explaining print control data which is data content of print information unit included in the print data file.

BEST MODE FOR CARRYING OUT THE INVENTION

Preferred modes (forms) for carrying out a picture control apparatus, a recording medium, a picture control system and a picture control method according to this invention will now be described in detail with reference to the attached drawings.

Figure 1:
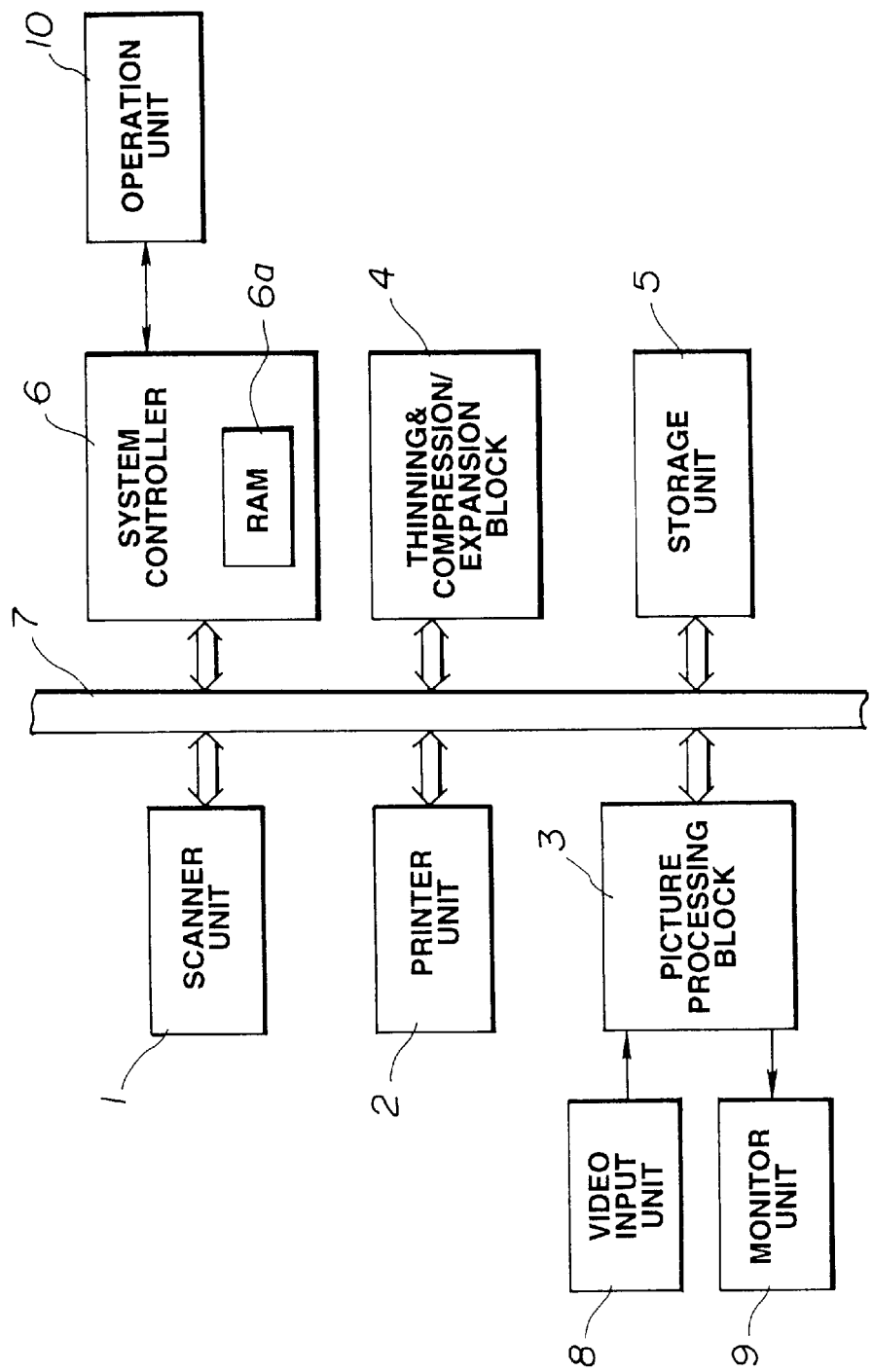
FIG. 1 is a block diagram of a still picture system to which a picture control apparatus, a recording medium, a picture control system, and a picture control method according to this invention are applied.

Initially, the picture control apparatus, the recording medium, the picture control system and the picture control method according to this invention can be applied to a still picture system as shown in FIG. 1.

1 Configuration of the Still Picture System

This still picture system comprises a scanner unit 1 for carrying out reading operation of picture (pictorial image) from film or photograph, etc., a printer unit 2 for carrying out print operation of still picture corresponding to picture data taken in or recorded at the still picture system, and a picture processing block 3 for forming, from the picture data taken into the still picture system, high resolution picture data for print, intermediate resolution picture data for monitor display, and low resolution picture data for index display. A video input unit 8 for taking thereinto picture data from other image equipments such as video tape recorder equipment or camera device, etc., and a monitor unit 9 on which still picture corresponding to picture data through the picture processing block 3 is displayed are connected to the picture processing block 3.

Moreover, the still picture system comprises a thinning and contraction/expansion block 4 for implementing thinning and contraction/expansion processing to picture data taken into the still picture system, a storage unit 5 for recording and reproducing the picture data of respective resolutions with respect to optical disc provided as a recording medium in the still picture system, and a system controller 6 for carrying out control of the entirety of the still picture system. At the system controller 6, as described later, there is provided a random access memory (RAM) 6a for temporarily storing picture data which has been read out from the optical disc when recording the picture data after undergone sequencing in order of reproduction (playback). In addition, an operation unit 10 for designating taking-in, recording, reproduction (playback) and print, etc. of the picture data is connected to the system controller 6.

The still picture system is of a structure in which the scanner unit 1, the printer unit 2, the picture processing block 3, the thinning and contraction/expansion processing block 4, the storage unit 5, and the system controller 6 are connected (interconnected) through a bus line 7.

1-1 [Configuration of the scanner unit]

Figure 2:
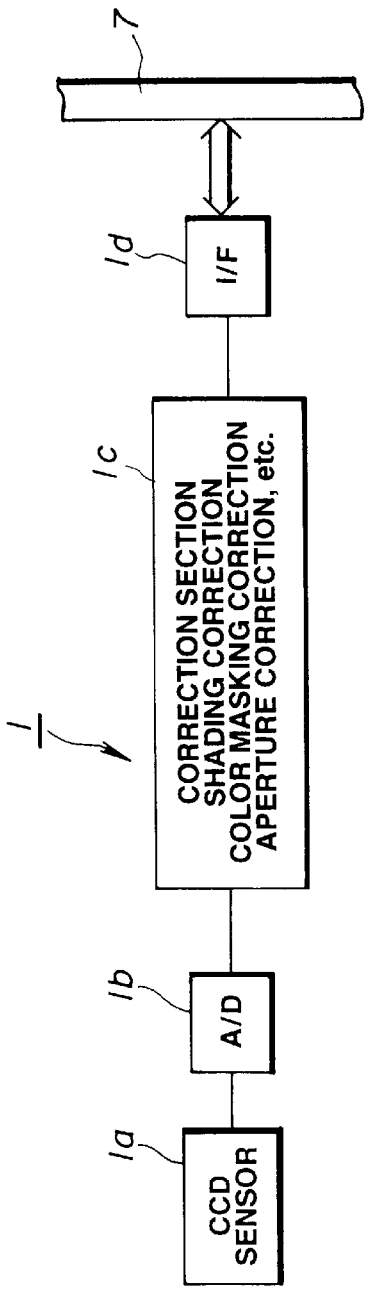
FIG. 2 is a block diagram of scanner unit provided in the still picture system.

The scanner unit 1 is composed, as shown in FIG. 2, of a CCD image sensor 1a for reading still picture recorded on negative film, positive film or photograph, etc., an A/D converter 1b for allowing a picture signal delivered as an analog signal from the CCD image sensor 1a to undergo digital conversion to form picture data, a correction section 1c for implementing correction processing such as shading correction or color masking correction, etc. to the picture data from the A/D converter 1b, and an interface 1d connected to the bus line 7.

1-2 [Configuration of the printer unit]

Figure 3:
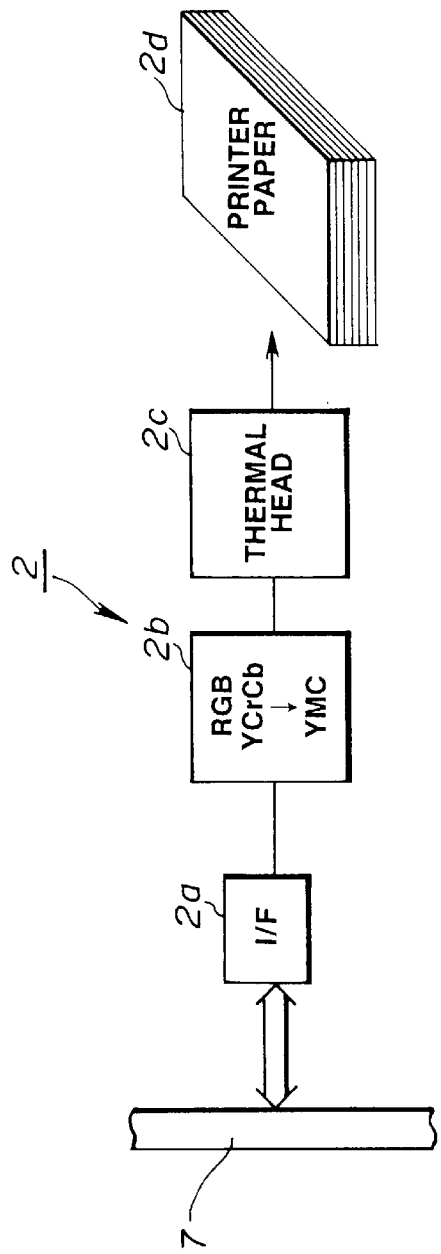
FIG. 3 is a block diagram of printer unit provided in the still picture system.

The printer unit 2 is composed, as shown in FIG. 3, an interface 2a connected to the bus line 7, a data conversion circuit 2b for implementing data conversion processing suitable for print to the picture data delivered thereto, and a thermal head 2c for carrying out print operation of still picture corresponding to the picture data from the data conversion circuit 2b onto a printer paper 2d. The print operation in this printer unit is controlled in accordance with print control data, which will be described later, for controlling the number of prints and hue (tint), etc.

1-3 [Configuration of the Picture Processing Block]

Figure 4:
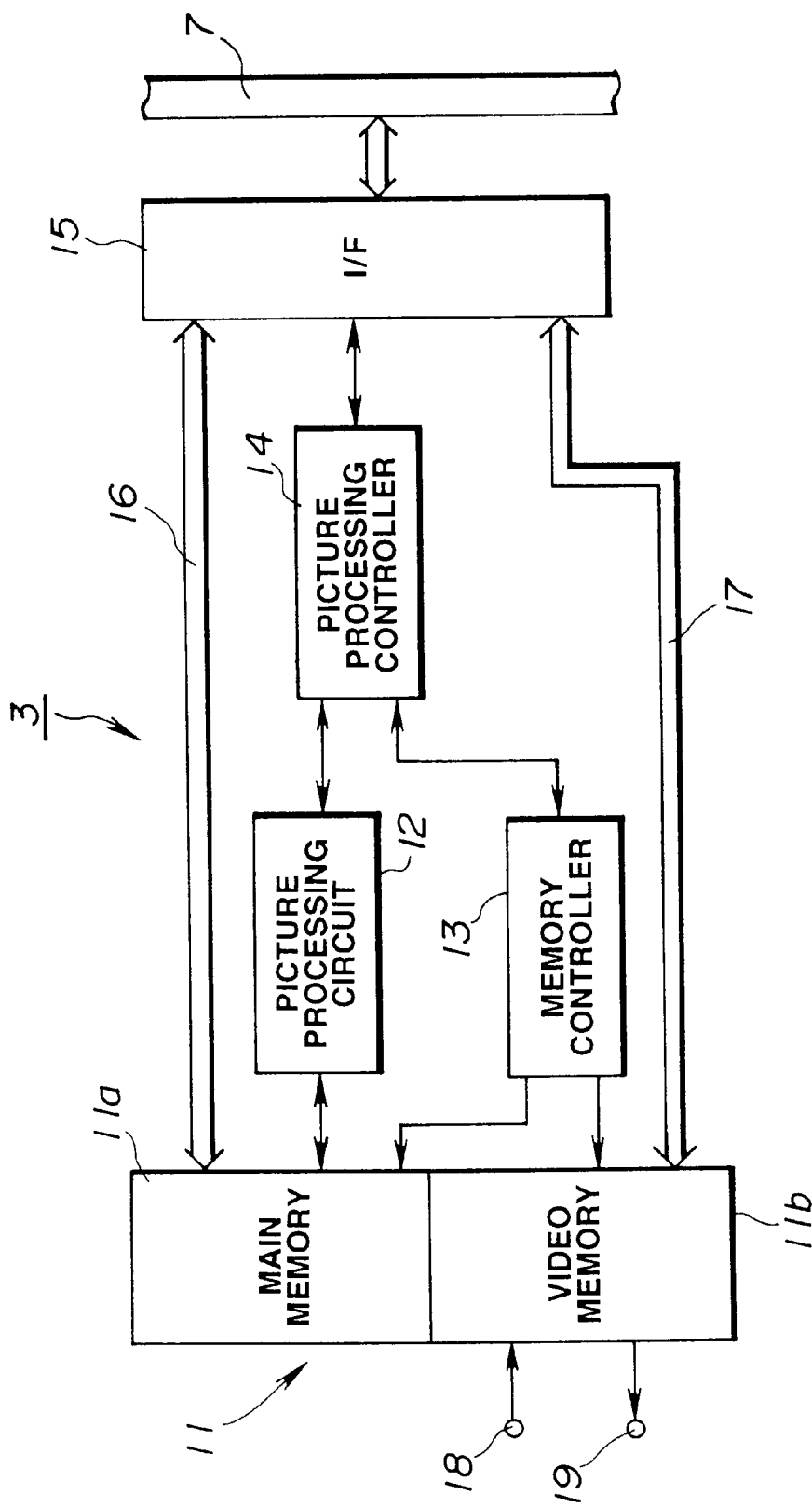
FIG. 4 is a block diagram of picture processing block provided in the still picture system.

The picture processing block 3 comprises, as shown in FIG. 4, a frame memory 11 composed of a main memory 11a for temporarily storing picture data taken into the still picture system and a video memory 11b for temporarily storing picture data taken thereinto through the scanner unit 1 or the video input unit 8, etc., and a picture processing circuit 12 for implementing picture processing such as expansion (enlargement) processing or contraction processing, etc. to the picture data which has been read out from the main memory 11a. The picture processing block 3 further includes a memory controller 13 for controlling the frame memory 11, a picture processing controller 14 for controlling picture processing operation in the picture processing circuit 12, and an interface 15 connected to the bus line 7.

More particularly, the frame memory 11 is composed of frame memory for R in which picture data of Red (R) is subjected to read/write operation, frame memory for G in which picture data of Green (G) is subjected to read/write operation, and frame memory for B in which picture data of Blue (B) is subjected to read/write operation.

The frame memories for respective colors are of a structure, from a theoretical point of view, such that eight DRAMs (Dynamic RAMs) in total obtained by stacking four DRAMs in a depth direction in a double line form, each having memory area of 4M bits in which, e.g., the three-dimensional relationship of length, breadth and depth is expressed as 1024pixels×1024 pixels×4 bits, have memory area of 2048×2048×8 bits. Further, the frame memory 11 is of a structure, from a theoretical point of view, such that the frame memories for respective colors having the memory area of 2048×2048×8 bits are respectively stacked in order of R, G and B in the depth direction. For this reason, the frame memory 11 has a memory area of 2048×2048×24 bits.

1-4 [Configuration of thinning and contraction/expansion processing block]

Figure 5:
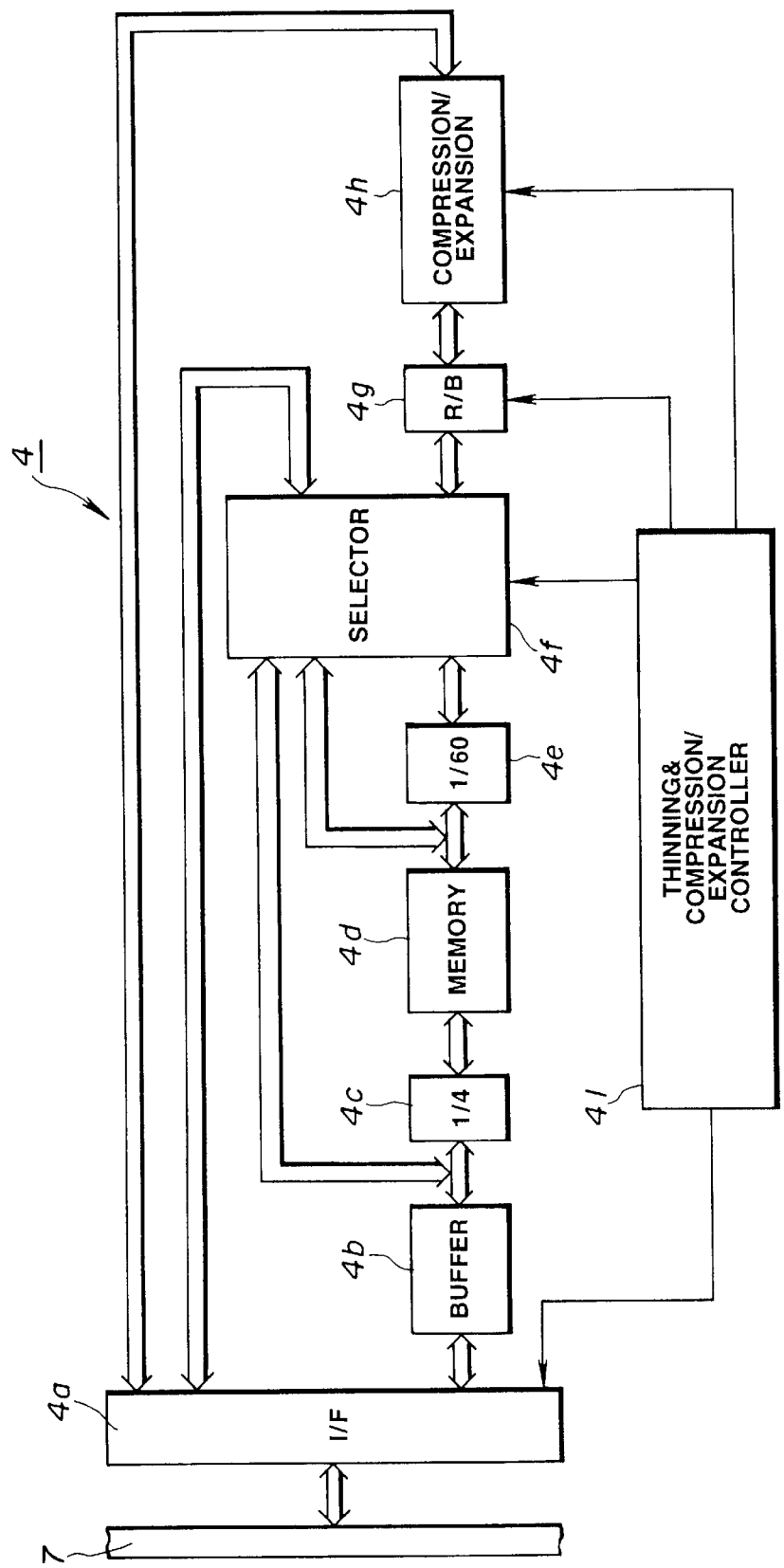
FIG. 5 is a block diagram of thinning and compression/expansion block provided in the still picture system.

The thinning and contraction/expansion processing block 4 is composed, as shown in FIG. 5, of an interface 4a connected to the bus line 7, a buffer 4b for temporarily storing high resolution picture data delivered through the interface 4a, an 1/4 thinning circuit 4c for allowing the high resolution picture data from the buffer 4a to undergo thinning processing into 1/4 to thereby form intermediate resolution picture data, and a buffer memory (buffer) 4d for temporarily storing the intermediate resolution picture data from the 1/4 thinning circuit 4c. Moreover, the thinning and contraction/expansion block 4 includes a 1/60 thinning circuit 4e for allowing the intermediate resolution picture data which has been read out from the buffer 4d to undergo thinning processing into 1/60 to thereby form low resolution picture data, and a selector 4f for selecting any one of the high resolution picture data from the buffer 4b, the intermediate resolution picture data from the 1/4 thinning circuit 4c, and the low resolution picture data from the 1/60 thinning circuit 4e to output selected one. Further, the thinning and contraction/expansion block 4 includes a raster/block converting circuit 4g for dividing each picture data selected by the selector 4f into blocks of predetermined pixel unit suitable for compression processing, a compression/expansion circuit 4h for implementing fixed length encoding processing to the picture data blocked (divided into blocks) by the raster/block converting circuit 4g, and a thinning and contraction/expansion controller 4i for controlling the thinning and contraction/expansion processing operation at the thinning and contraction/expansion processing block 4.

1-5 [Configuration of the storage unit]

Figure 6:
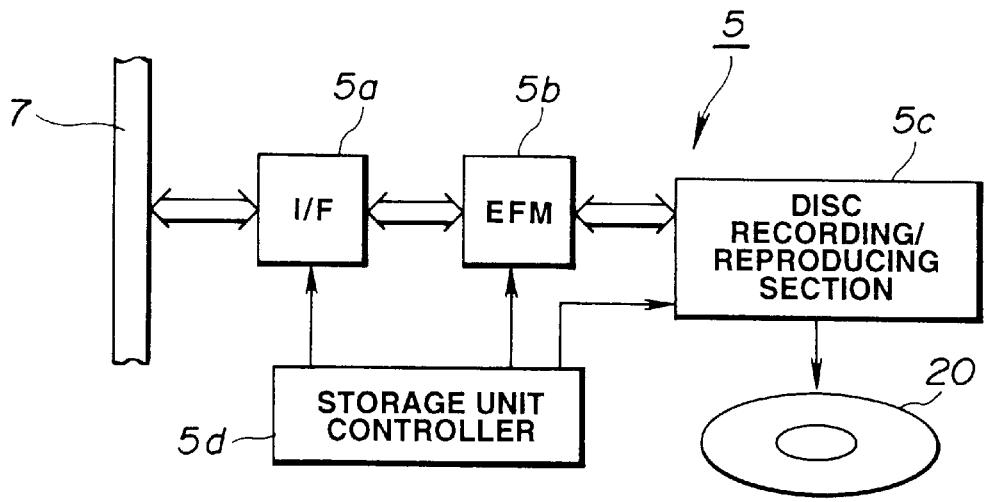
FIG. 6 is a block diagram of storage unit provided in the still picture system.

The storage unit 5 is composed, as shown in FIG. 6, of an interface 5a connected to the bus line 7, an EFM circuit 5b for implementing 8–14 modulation processing to picture data of respective resolutions from the thinning and compression/expansion processing block 4, a disc recording/reproducing section 5c for recording and reproducing picture data from the EFM circuit 5b with respect to the optical disc 20, and a storage unit controller 5d for controlling the operation of the entirety of the storage unit 5.

1-6 [Configuration of the video input unit]

Figure 7:
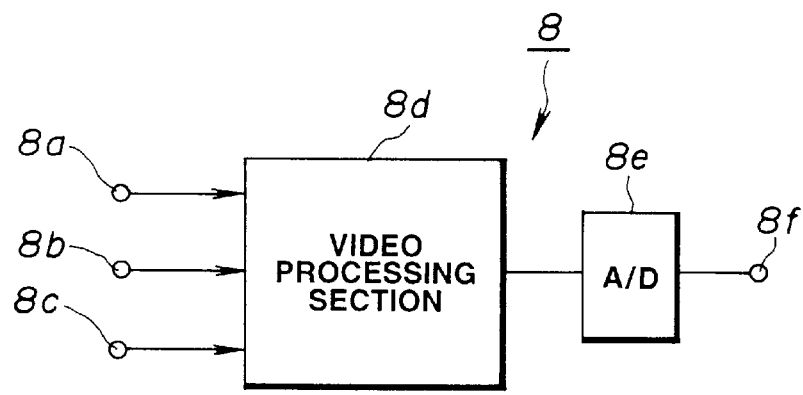
FIG. 7 is a block diagram of video input unit provided in the still picture system.

The video input unit 8 is composed, as shown in FIG. 7, of an input terminal 8a for composite video signal, an input terminal 8b for video signal delivered in the Y (luminance)/C (chroma) separate format (form), an input terminal 8c for video signal delivered in the RGB format, a video processing section 8d for implementing a processing to carry out conversion into picture size suitable for the still picture system to the video signals of respective formats delivered through the respective input terminals 8a to 8c, and an A/D converter 8e for converting the respective video signals delivered as an analog signal from the video processing section 8d into digital data to form respective picture data.

1-7 [Configuration of the operation unit]

Figure 8:
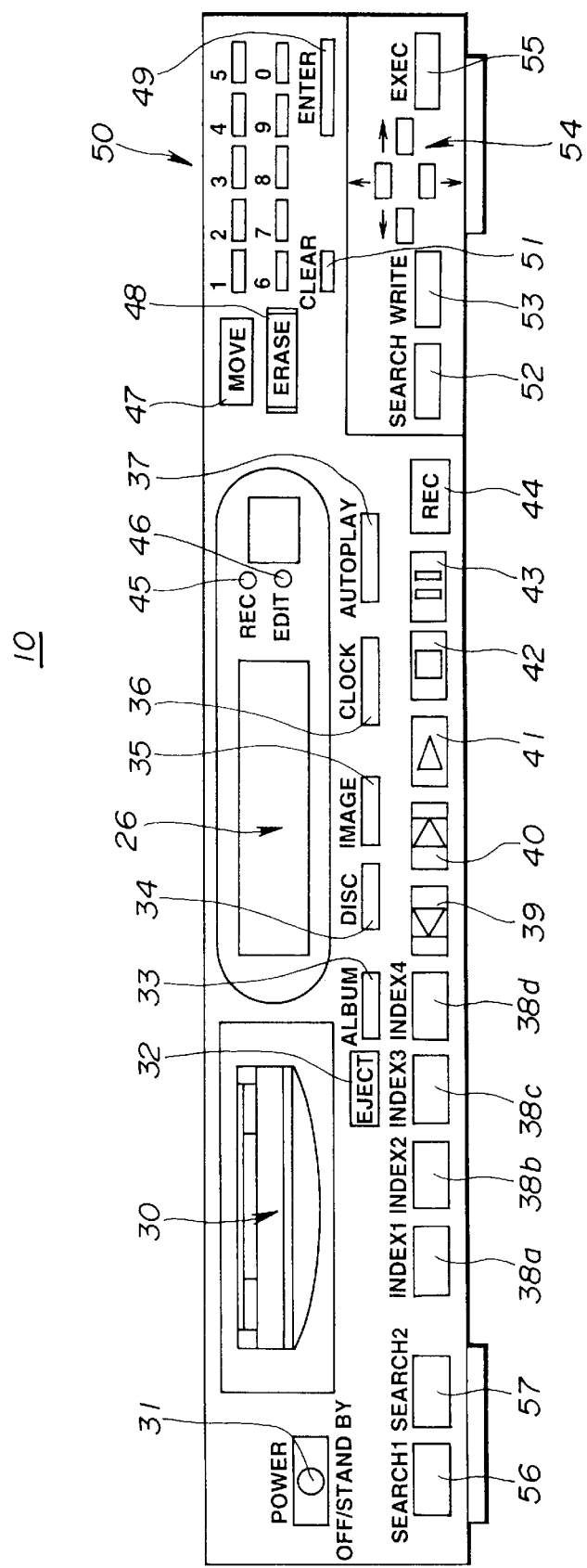
FIG. 8 is a view showing appearance of operation unit provided in the still picture system.

The operation unit 10 has an appearance as shown in FIG. 8, and has, on the surface panel thereof, a disc insertion hole 30 and a display section 26 formed by liquid crystal display plate. Moreover, the operation unit 10 includes a power key 31 for turning ON main power supply of the storage unit 5, an eject key 32 for designating ejection (taking-out) of the optical disc 20 inserted through the disc insertion hole 30, and an album key 33 for carrying out album selection within the disc.

Further, the operation unit 10 includes a disc key 34 for designating display of disc name and album name, etc., an image key 35 for designating display of picture (image) name, key word and recording date, etc., a clock key 36 for designating display of current date and time, etc., and an automatic play (auto play) key 37 for designating automatic playback (auto play) to automatically play back (reproduce) picture image of designated album in order of recording, or to automatically picture images of designated respective albums in a designated order.

Further, the operation unit 10 includes a first index key 38a for designating first index display to display, e.g., 25 picture images constituting a selected album by one picture, a second index key 38b for designating second index display to display only the first picture images of respective albums by one picture, a third index key 38c for designating third index display to display as far as several picture images from the first of respective albums by one picture, and a fourth index key 38d for designating fourth index display to display picture images of respective albums played back (reproduced) at intervals of predetermined number of picture images by one picture.

Further, the operation unit 10 includes a first album search key 56 for designating first album search display to display only the leading picture images of respective albums one by one to carry out retrieval of desired album, a second album search key 57 for designating second album search display to display as far as several picture images from the first of respective albums one by one to carry out retrieval of desired album, a return key 39 for designating playback (reproduction) of picture forward (in point of time) by one with respect to current picture, a feed key 40 for designating playback (reproduction) of picture backward (in point of time) by one with respect to current picture, a playback (reproduction) key 44 for designating playback (reproduction) of picture, and a stop key 42 for designating stop of recording playback (reproduction).

Further, the operation unit 10 includes a temporary stop key 43 for designating temporary stop of the automatic playback, a recording designation key 44 for designating recording of picture, a REC indicator 45 turned ON at the time of recording, an edit indicator 46 turned ON at the time of editing, etc., and a move key 47 used in the case of moving a desired picture to a desired position within corresponding album or to a desired position of any other album.

Further, the operation unit 10 includes an erase key 48 for designating erasing of recorded picture, an enter key 49 used for designation of a desired picture in moving the desired picture within corresponding album or moving it to any other album by using the above-mentioned move key 47, a ten key 50 used in inputting figures (numeric values) or characters, and a clear key 51 for designating erasing of figure or character, etc. inputted by the ten key 50.

Since the above-mentioned respective keys 31 to 51 have high use frequency, those keys are provided in the state where they are all exposed to the surface panel.

In addition, the operation unit 10 includes a retrieval key 52 for designating retrieval of desired picture, a write key 53 for designating recording of album name or picture name, etc., a cross (cruciform) key 54 for designating character, etc. to be inputted, and an EXEC key 55 for designating recording of character, etc. designated by the cross key 54.

These respective keys 52 to 55 are ordinarily covered with the surface cover because they are used for special use purpose, such as, for example, at the time of recording of album name and picture name, etc. As occasion demands, user uncovers the surface cover to use such keys.

2 Outline of the Recording Operation

The first recording operation of the still picture system as constructed above will now be described.

Initially, in the case where desired picture data is recorded onto optical disc 20 of the storage unit 5, user operates the operation unit 10 to designate destination of taking-in of picture data (scanner unit 1 or video input unit 8), and to set destination of output of the picture data which has been taken in to the storage unit 5. Thus, the system controller 6 controls the scanner unit 1 or the video input unit 8 so that it is in operative state.

2-1 [Description of the operation of the scanner unit]

The scanner unit 1 is adapted so that it can read both pictures of reflection type manuscript and transmission type manuscript. In more practical sense, the scanner unit 1 can read, e.g., photograph of E size, photograph of L size, and photograph of A6 size as the reflection type manuscript, and can read negative film of 35 mm, or Brownie size as the transmission type manuscript. It is to be noted that the scanner unit 1 can also read manuscript obtained by allowing, negative film of the 35 mm, or Brownie size to undergo print at the original size.

When the film or photograph, etc. is mounted on the manuscript reading table, the scanner unit 1 reads this manuscript by scanning CCD line sensor 1a shown in FIG. 2. The CCD line sensor 1a forms a picture signal corresponding to the picture which has been read to deliver it to A/D converter 1b. The A/D converter 1b digitizes the picture signal delivered from the CCD line sensor 1a to thereby form picture data to deliver it to correction system 1c. For example, in the case where picture has been read from the 35 mm film, the correction system 1c corrects this picture data so that there is provided picture data of size (dimensions) of 1200 pixels×1700 pixels as the size (dimensions) of length x breadth to output the corrected picture data.

Moreover, in the case where manuscripts to be read are film of Brownie size, photograph of E size, photograph of L size, and photograph of A6 size, the scanner unit 1 respectively makes corrections into picture data of sizes of 1298 pixels×975~1875 pixels, 1050 pixels×1450 pixels, 1120 pixels×1575 pixels, and 1325 pixels×1825 pixels to output corrected picture data.

2-2 [Description of the operation of the video input unit]

The video input unit 8 is adapted as shown in FIG. 7 so that, e.g., video signals of three formats of composite video signals, video signals delivered in the Y (luminance)/C (chroma) separate format, and video signals delivered in the format of RGB from video tape recorder equipment, etc. can be inputted thereto. These video signals are delivered to video processing system 8d through input terminals 8a to 8c, respectively.

The video processing system 8d changes pixels of the video signals of the respective formats into pixels of cubic lattice, and makes a change such that their pixel sizes have 480 pixels×640 pixels to deliver them to A/D converter 8e. The A/D converter 8e digitizes the video signals to thereby form picture data corresponding to the video signals of the respective formats to output them through output terminal 8f.

2-3 [Description of the operation of the picture processing block]

Picture data formed by the scanner unit 1 or the video input unit 8 to picture data of high resolution such that, e.g., the dimensional relationship between length and breadth is expressed as 1024 pixels×1536 pixels, and are delivered to video memory 11b within frame memory 11 through input terminal 18 of the picture processing block 3 shown in FIG. 4.

The memory controller 13 is operative so that when picture data of high resolution is delivered to the video memory 11b, it carries out write-in control and read-out control so as to temporarily store such picture data and to read out the stored picture data of high resolution. This high resolution picture data is transferred to thinning and compression/expansion processing block 4 through data line 17, interface 15, bus line 7 and data line 16 in order, and is transferred to main memory 11a. The memory controller 13 carries out write-in control of the main memory 11a so as to temporarily store the high resolution picture data which has been transferred to the main memory 11a.

When the high resolution picture data is stored into the main memory 11a, the picture processing controller 14 controls the picture processing circuit 12 and the memory controller 13 so as to convert the high resolution picture data into, e.g., picture data of intermediate resolution for monitor display of 480 pixels×640 pixels. Thus, the high resolution picture data is read out from the main memory 11a by read-out control of the memory controller 13, and is delivered to the picture processing circuit 12. Then, the high resolution picture data is converted into intermediate resolution picture data by the picture processing circuit 12, and is delivered to the video memory 11b through the data line 16, the interface 15, the bus line 7 and the data line 17. The memory controller 13 is operative so that when the intermediate resolution picture data is delivered to the video memory 1b, it allows the video memory 11b to undergo write-in control so as to temporarily store such picture data and allows the video memory 11b to undergo read-out control so as to read out it. Thus, the intermediate resolution picture data stored in the video memory 11b is read out, and is then delivered to monitor unit 9 shown in FIG. 1 through output terminal 19.

The intermediate resolution picture data delivered to the monitor unit 9 is converted into picture data in analog form by D/A converter so that a picture signal for monitor display of intermediate resolution is provided. Thus, the picture image which has been taken in by the scanner unit 1 or the video input unit 8 is displayed on the monitor unit 9.

In this example, the picture processing controller 14 shown in FIG. 4 is operative so that in the case where picture processing such as expansion processing or contraction processing, etc. of picture which has been taken in by the scanner unit 1 or the video input unit 8 is designated by operation of the operation unit 10, it controls the picture processing circuit 12 so that the designated picture processing is implemented to the picture data which has been read out from the main memory 11a. The picture data to which the designated picture processing has been implemented by the picture processing circuit 12 is delivered to the monitor unit 9. Thus, the picture to which the designated picture processing has been implemented is displayed on the monitor unit 9. In addition, the picture processing controller 14 delivers data indicating picture processing implemented to the picture data (picture processing information) to the thinning and compression/expansion processing block 4 through the interface 15 and the bus line 7.

2-4 [Description of the operation of the thinning and compression/expansion processing block]

Then, user confirms by the picture image displayed on the monitor unit 9 as to whether or not corresponding picture image is desired one, whereby in the case where the corresponding picture image is desired one, user operates the recording designation key 44 of the operation unit 10 shown in FIG. 8 to designate recording of the picture image displayed on the monitor unit 9.

The system controller 6 shown in FIG. 1 is operative so that when the recording designation key 44 is caused to undergo ON operation, it detects this operation to deliver data indicating that designation of the recording has been made and the picture processing information in the case where such information exists to the thinning and compression/expansion controller 4*i* of the compression/expansion processing block 4 through the bus line 7 and the interface 4*a* shown in FIG. 5.

The thinning and compression/expansion controller 4*i* is operative so that in the case where the picture processing information exists, it controls the interface 4*a* so as to temporarily store such data and to carry out taking-in of the high resolution picture data. When the high resolution picture data is taken into the thinning and compression/expansion processing block through the interface 4*a*, it is temporarily stored into the buffer 4*b*. When the high resolution picture data is stored into the buffer 4*b*, the thinning and contraction/expansion controller 4*i* allows the buffer 4*b* to undergo read-out control so as to deliver the high resolution picture data to the 1/4 thinning circuit 4*c* and the selector 4*f*, e.g., every line.

The 1/4 thinning circuit 4*c* implements a thinning processing such that (the number of) pixels of the higher resolution picture data is reduced to one fourth (1/4) to thereby form intermediate resolution picture data of 480 pixels×640 pixels to deliver it to the memory 4*d*. The thinning and compression/expansion controller 4*i* is operative so that when the intermediate resolution picture data is delivered to the memory 4*d*, it controls the memory 4*d* so as to temporarily store such picture data and to read out it. The intermediate resolution picture data which has been read out from the memory 4*d* is delivered to the 1/60 thinning circuit 4*e* and the selector 4*f*.

The 1/60 thinning circuit 4*e* implements a thinning processing such that (the number of) pixels of the intermediate resolution picture data which has been read out from the memory 4*d* is reduced to one sixtieth (1/60) to thereby form low resolution picture data of 60 pixels×80 pixels (picture data for index) to deliver it to the selector 4*f*.

The selector 4*f* is subject to switching control by the thinning and compression/expansion controller 4*i*. Namely, the thinning and compression/expansion controller 4*i* allows the selector 4*f* to undergo switching control, e.g., so as to select picture data of respective resolutions delivered to the selector 4*f* in order of high resolution picture data, intermediate resolution picture data and low resolution picture data to output selected one. The picture data of respective resolutions from the selector 4*f* are delivered to the raster/block converting circuit 4*g*.

The raster/block converting circuit 4*g* divides the respective picture data into, e.g., processing block units of 8 pixels×8 pixels which are processing unit of compression encoding to deliver them to the compression/expansion circuit 4*h*.

As stated above, the picture data of respective resolutions are divided into processing block units of 8 pixels×8 pixels at the raster/block converting circuit 4*g*. In this case, the low resolution picture data has picture size of 60 pixels×80 pixels. For this reason, when attempt is made to divide the lower resolution picture data into processing block units of 8 pixels×8 pixels, because the number of pixels in a longitudinal direction cannot be divided by eight (8) (60 pixels÷8 pixels=7.5 pixels), it is impossible to divide the low resolution picture data in the processing block units of 8 pixels×8 pixels. From facts as described above, the raster/block converting circuit 4*g* is operative so that when the low resolution picture data is delivered thereto, it adds dummy data of 4 pixels×80 pixels to the upper row (line) side or the lower row (line) side of the picture data to thereby allow the low resolution picture data of 60 pixels×80 pixels to be low resolution picture data of 64 pixels×80 pixels. By such a processing, the number of pixels in the longitudinal direction can be divided by eight (8). Thus, the raster/block converting circuit 4*g* divides the low resolution picture data of 64 pixels×80 pixels into 8 processing blocks and 10 processing blocks to deliver them to the compression/expansion circuit 4*h*. It is to be noted that since the dummy data is eliminated in the index display, there is no possibility that pictures according to the dummy data (e.g., black pictures or white pictures) are displayed in the state added to the index picture.

The compression/expansion circuit 4*h* is composed of Discrete Cosine Transform circuit (DCT circuit), quantizing circuit, and fixed length encoding circuit which are not shown. Accordingly, the picture data of respective resolutions are first delivered to the DCT circuit.

The DCT circuit carries out orthogonal transform processing to transform the picture data of respective resolutions into picture data on the frequency base to form DCT coefficients, thus to deliver, to the quantizing circuit, those picture data of respective resolutions to which the orthogonal transform processing has been implemented.

The quantizing circuit carries out quantization processing of the picture data of respective resolutions by using, e.g., suitable quantization coefficients set by the system controller 6 to deliver quantized picture data to the fixed length encoding circuit.

The fixed length encoding circuit implements fixed length encoding processing to DCT coefficients of the picture data of respective resolutions quantized by the suitable quantization coefficients to feed the result of fixed length encoding processing back to the thinning and compression/expansion controller 4*i*. The thinning and compression/expansion controller 4*i* forms quantization coefficients optimum for quantizing that picture data in accordance with the result of the fixed length encoding processing to deliver them to the quantizing circuit. The quantizing circuit carries out quantization of the picture data by using the optimum quantization coefficients set for the second time to deliver it to the fixed length encoding circuit. Thus, at the fixed length encoding circuit, picture data of respective resolutions are permitted to undergo fixed length encoding so that they have predetermined data length.

In more practical sense, by such compression encoding processing, the intermediate resolution picture data is caused to undergo fixed length encoding processing so that it has data length of 2 clusters twice greater than one cluster which is one recording unit, the high resolution picture data is caused to undergo fixed length encoding processing so that it has data length of 8 clusters, and the low resolution picture data is caused to undergo fixed length encoding processing so that it has data length of 1/15 clusters. The picture data of respective resolutions which have been caused to undergo fixed length encoding in this way are delivered to the storage unit 5 shown in FIG. 6 through the interface 4*a* and the bus line 7. In addition, in the case where picture processing information is added to the delivered picture data as described above, the thinning and compression/expansion controller 4*i* delivers the picture processing information to the storage unit 5 along with the picture data of respective resolutions.

2-5 [Description of the operation of the storage unit]

Picture data of respective resolutions and picture processing information from the thinning and compression/expansion processing block 4 are delivered to the interface 5*a* of FIG. 6. The storage unit controller 5*d* is operative so that when the picture data of respective resolutions and the picture processing information are delivered to the interface 5*a*, it controls the interface 5*a* so as to take them into the storage unit 5. The picture data of respective resolutions and the picture processing information which have been taken into the storage unit 5 through the interface 5a are delivered to the EFM circuit 5b. When the picture data of respective resolutions and the picture processing information are delivered to the EFM circuit 5b, the storage unit controller 5d controls the EFM circuit 5b so as to implement so called EFM processing (8–14 modulation processing) to the picture data of respective resolutions and the picture processing information which have been caused to undergo fixed length encoding. The picture data of respective resolutions and the picture processing information which have been caused to undergo EFM processing are delivered to the disc recording/reproducing section 5c. When the picture data of respective resolutions and the picture processing information are delivered to the disc recording/reproducing section 5c, the storage unit controller 5d controls the disc recording/reproducing section 5c so as to record the picture data of respective resolutions and the picture processing information onto the optical disc 20. Thus, the picture data of respective resolutions and the picture processing information thereof are recorded onto the optical disc 20.

In more practical sense, the optical disc 20 is, e.g., magneto-optical disc having diameter of 64 mm, and is adapted so that picture data corresponding to 200 pictures can be rewritten desired number of times every respective resolutions. Further, the picture data corresponding to 200 pictures are caused to undergo management in the state divided into four albums in total with picture data corresponding to 50 pictures being as one album. Accordingly, in the case where user carries out recording of such picture data, he selects an album on which corresponding picture data is recorded by using the operation unit 10. Thus, the system controller 6 controls the disc recording/reproducing section 5c through the storage unit controller 5d so as to record, in order of taking-in, the picture data of respective resolutions onto the album selected by the user.

It is to be noted that, in this instance, the low resolution picture data are recorded as index file for index for displaying a plurality of pictures recorded on the album within one picture on screen, the intermediate resolution picture data are recorded as intermediate resolution picture file for monitor display for displaying a desired one picture recorded on the album, and the high resolution picture data are recorded as high resolution picture file for print for carrying out print of picture corresponding thereto.

3 Description of the Format of the Optical Disc

The optical disc 20 on which picture data of respective resolutions are recorded as described above has a new format for picture recording as described below.
3-1 [Cluster structure]

Initially, recording and reproduction (playback) are carried out with respect to the optical disc 20 with "cluster" being as one unit. One cluster corresponds to two~three rounds (circumferences) of tracks. These clusters are continuously recorded in point of time, whereby one data track is formed. The one cluster consists of subdata area of 4 sectors (one sector is 2352 bytes) and main data area of 32 sectors. Addresses are recorded every respective one sectors.

It is to be noted that the areas in which data are actually recorded within respective sectors are the area of 2048 bytes of the 2352 bytes, and header data by synchronization (sync) pattern or address, etc., and error correction code, etc are recorded in the remaining by he area.

In the subdata area of four (4) sectors, subdata or linking data indicating that successive data is recorded in another area in the case where the successive data is recorded in another area, etc., are re corded.

In addition, into the main data area of 32 sectors, TOC data, audio (speech) data and picture data, etc. are recorded.
3-2 [Track structure]

Figures 9A, 9B, 9C:
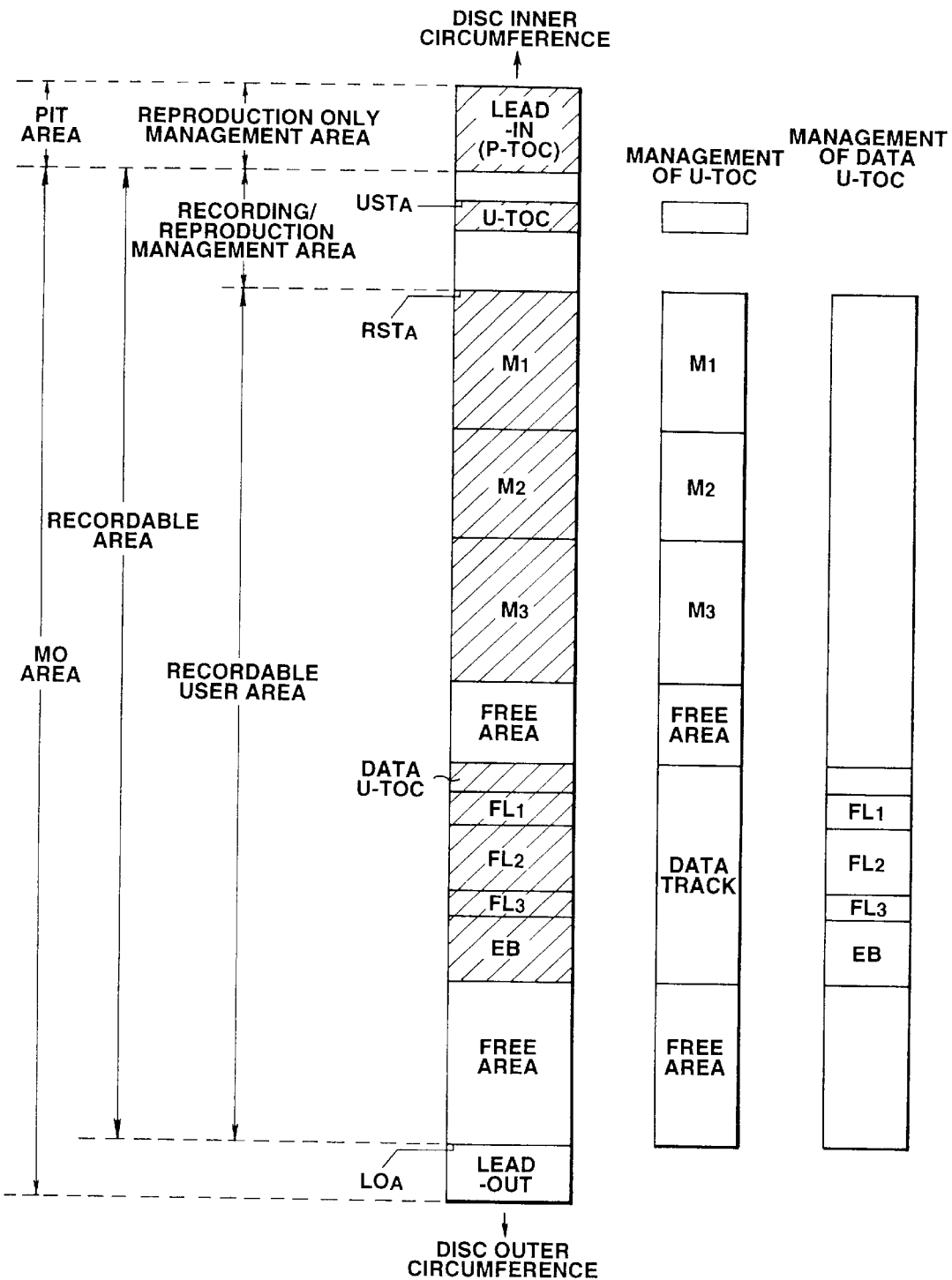
FIG. 9 is a view for explaining data structure of picture data recorded on the optical disc.

The area of the optical disc 20 consists, as shown in FIG. 9(a), of pit area in which data are recorded by emboss pits and magneto-optical area (MO area) in which grooves are provided so that data are caused to undergo recording/reproduction by the magneto-optical system.

The pit area is caused to serve as reproduction (playback) only management area in which P-TOC (Premastered Table Of Contents) which is management information recorded on the optical disc 20 is recorded, and P-TOC sectors which will be described later are repeatedly recorded.

The MO area is the area innermost circumference side up to the termination of the lead-out area of the disc outermost circumferential side. Moreover, the area from immediately after the lead-in area up to immediately before the lead-out area of the disc outermost circumferential side of the MO area is caused to be recordable area where data can be recorded.

The recordable area consists of recording/reproduction (playback) management area formed at the leading portion of the recordable area, and recordable user area formed from immediately after the recording/reproduction management area up to immediately before the lead-out area.

The recording/reproduction (playback) management area is adapted so that U-TOC which is TOC for management of recording/reproduction (playback) of audio data, etc., is recorded. Moreover, the area except for the U-TOC within the recording/reproduction management area is used as calibration area for carrying out trial writing in order to adjust laser power of the optical pick-up. Recording position of U-TOC within the recording/reproduction management area is indicated by the P-TOC. The U-TOCs are recorded continuously by three clusters at a predetermined position within the recording/reproduction (playback) management area indicated by the P-TOC.

The recordable user area is of a structure in which audio data track where audio data is recorded, a free area caused to undergo management as recordable area where audio data or picture data can be recorded (unrecorded area), data track where the above-described picture data of respective resolutions are recorded, and the free area are arranged (allocated) in order respectively from the disc inner circumference side to the disc outer circumference side.

At the audio data track, audio data indicated as "M1", "M2", "M3" in FIG. 9(a), for example, are recorded. In addition, at the data track, data file including picture data indicated as "FL1", "FL2" and "FL3" in FIG. 9(a) and "data U-TOC" for carrying out management of the respective data files are recorded.

It is sufficient that the data U-TOC may be at any position within the recordable area. In this still picture system, the data U-TOC is recorded immediately before data file FL1 which is data file serving as the disc innermost circumferential side of respective data files of the picture data.

Further, as shown in FIG. 9(b) the U-TOC recorded in the recording/reproduction management area carries out management of respective audio data "M1", "M2", "M3" and start addresses and end addresses of respective free areas, and carries out management, collectively as single data track, of respective data files FL1, FL2, FL3 including the picture data.

Respective data files FL1, FL2, FL3 within the data track and unrecorded (not yet recorded) block "EB" within the data track are caused to undergo management, in cluster units, by data U-TOC recorded at the preceding portion of the data file FL1 as shown in FIG. 9(c).

It is to be noted that while audio tracks M1, M2, M3 are recorded on the disc in this example, the entirety of the recordable user area is used as data track for picture data.

3-3 [Configuration of data track]

The configuration of the data track where respective data files FL1, FL2, FL3 including the picture data and data U-TOC are recorded will now be described with reference to FIG. 10. As described above, management of the data track is carried out as parts (track portion where a series of data physically continuous on the disc are recorded) within the U-TOC. Managements of respective data files recorded within the data track are carried out by data U-TOC recorded within the data track.

Figures 10A, 10B, 10C:
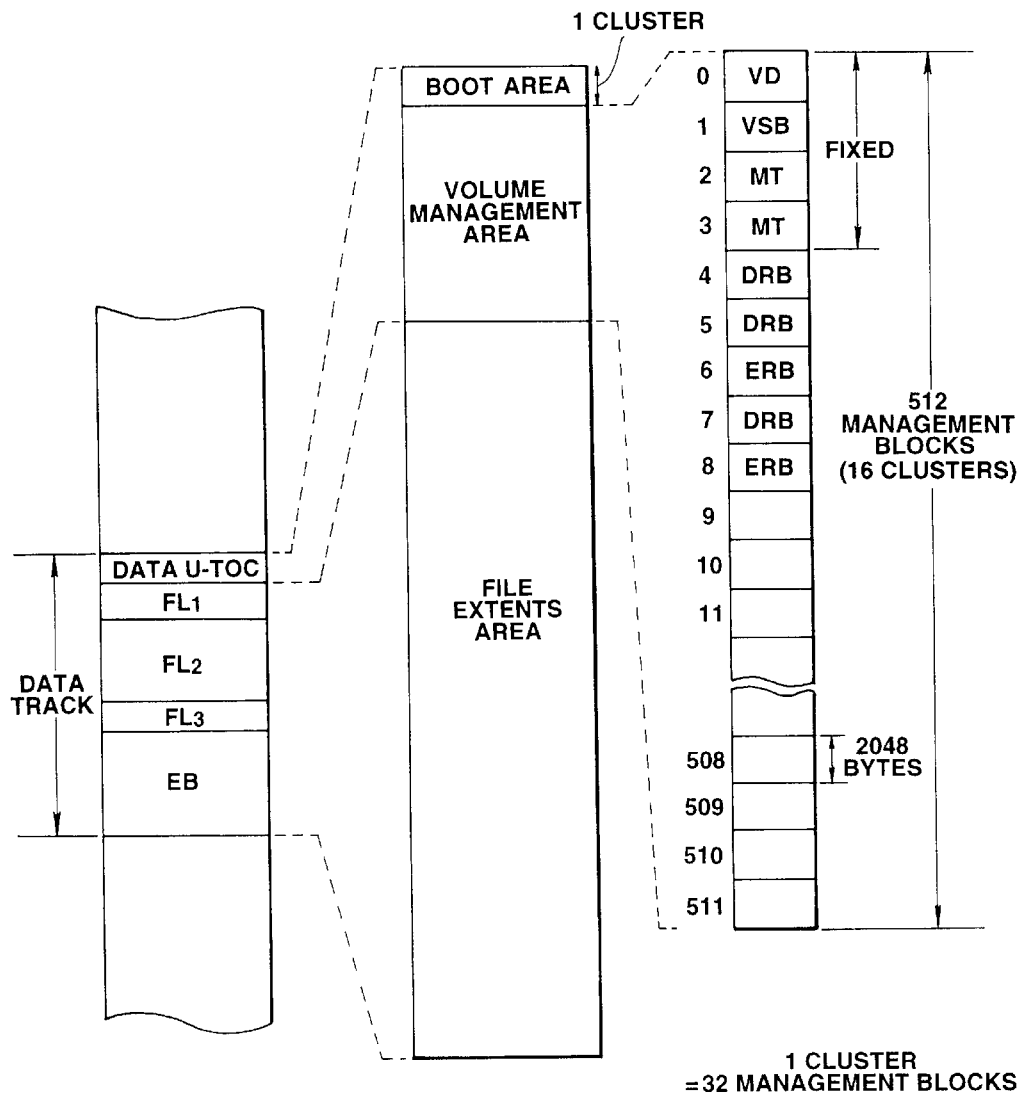
FIG. 10 is a view for explaining management block formed in data U-TOC.

As shown in FIG. 10(a), the data U-TOC is recorded at the physically leading position of the data track. Namely, data U-TOC is recorded at the position closer to the innermost disc inner circumferential side within the data track. In the case where the data track is separated into plural parts, data U-TOC is recorded at the leading portion of the parts located at the innermost disc inner circumferential side.

This data U-TOC consists of boot area of one (1) cluster and volume management area of sixteen (16) clusters as shown in FIG. 10(b). Moreover, the area succeeding to the data U-TOC is caused to be file extents area. In this file extents area, data files FL1 to FL3 including picture data, etc. are recorded as shown in FIG. 10(a). Moreover, data files can be further recorded in the unrecorded or not yet recorded block "EB".

The volume management area consists of 512 management blocks of 0 to 511 as shown in FIG. 10(c). Data area in one management block is 2048 bytes. Further, respective data recorded in the management block are caused to serve as management information for recording/reproduction (playback) of the data file.

Namely, in respective 512 management blocks, block numbers of 0 to 511 are attached thereto. Moreover, the management block of the block number 0 is used as "volume descriptor VD". In this case, "volume" is unit including all parts where general data including picture data are recorded. Further, management block of the block number 1 is used as "volume space bitmap VSB", and management blocks of the block numbers 2 and 3 are used as the "management table MT". Management block of the block number 4 and management blocks succeeding thereto are used as "directory record block DRB", and "extents record block ERB" in dependency upon use mode (form), etc. of the file extents area.

Respective management blocks of the management area have size of one logical block (which is the area where data are actually recorded within one sector and consists of 2048 bytes. For example, 32 sectors become 32 logical blocks.). In the case where data is recorded into the management area and is reproduced therefrom, this logical block (management block) is caused to be minimum unit for recording/reproduction, and is caused to be management unit within the management area.

On the other hand, in the case of recording picture data into the file extents area, allocation block of one logical cluster size is caused to be minimum unit for recording/ reproduction, and is caused to be management unit within the file extents area.

It is to be noted that "logical block" is 32 sectors in terms of unit actually used as the data recording area within 1 cluster, and is the same area as the main data area. Moreover, "allocation block" indicates the same data unit as the logical cluster. In the case of this example, one logical cluster size is represented as one allocation block. Accordingly, the number of clusters and the number of allocation blocks on the disc are in correspondence with each other. In addition, positions of files on the disc are all designated by allocation block No. of the allocation block.

3-4 [Volume descriptor]

Figure 11:
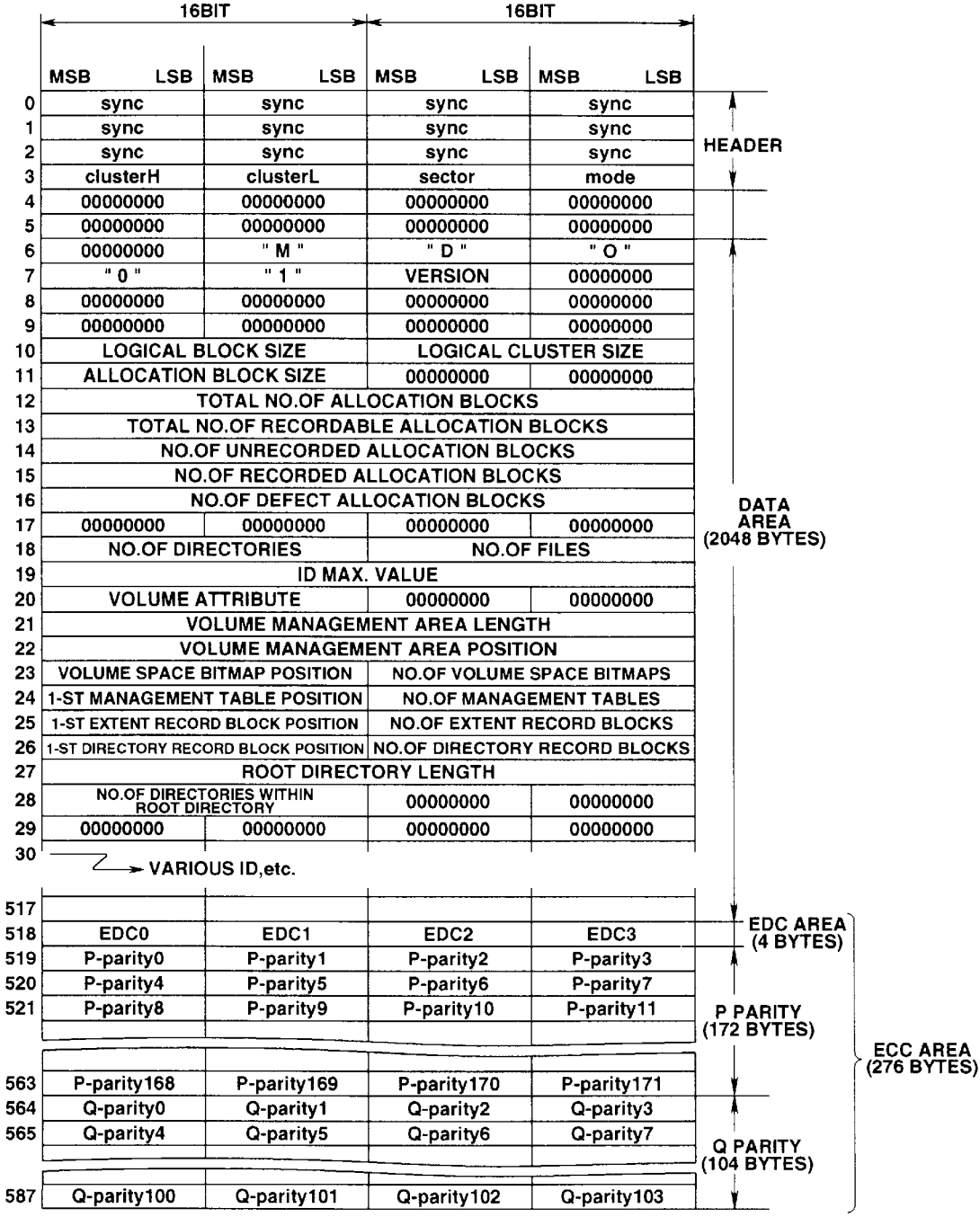
FIG. 11 is a view for explaining sector structure of volume descriptor.

The leading management block in the volume management area is used as volume descriptor VD. This volume descriptor VD serves to carry out basic management of data track (volume) on the disc, and consists, as shown in FIG. 11, of header where synchronization pattern and address are recorded and data area of 2048 bytes where various management information are recorded.

At the portion from the second byte to the sixth byte of the data area of the volume descriptor VD, character data of "PIC_MD" is recorded, e.g., by ASCII code, as identification information (ID) indicating that corresponding sector is sector of volume descriptor. Succeedingly to the identification information, version ID of this system, logical block size, logical cluster size and allocation block size are recorded.

In more practical sense, as "logical block size", byte length indicating actual data area within the sector of the data track is recorded. The sector of the data track is 2352 bytes, and 2048 bytes thereof is allocated as the data area. For this reason, as the logical block size, "2048" which is the byte length of the logical block is recorded. It is to be noted that this logical block is caused to serve as minimum recording unit for carrying out recording/reproduction within the management area.

Moreover, as the "logical cluster size", the number of logical blocks of the logical cluster which is the cluster where management information and/or data are actually recorded is recorded. One cluster consists of 36 sectors, and 32 sectors (32 logical blocks) among these sectors are allocated for data recording. For this reason, "32" which is block length of the logical cluster is recorded as the logical cluster size.

The number of logical blocks in the allocation block is recorded as the "allocation block size". The allocation block indicates the same data unit as the logical cluster, and is the portion in which management information and/or data file are actually recorded in the data track. For example, the area of 32 sectors as the logical cluster in the volume management area or the file extents area shown in FIG. 10(b) corresponds to one allocation block. It is to be noted that this allocation block is caused to be minimum unit for recording/ reproduction within the file extents area.

Subsequently to the allocation block size, "total number of allocation blocks" indicating total number of allocation blocks within the volume is recorded. It is to be noted in the case of the so-called hybrid disc where audio data and picture data are mixed, total number of allocation blocks including the number of allocation blocks in the pit area is recorded as the total number of allocation blocks.

Moreover, the "number of allocation blocks" is recorded subsequently to the total number of allocation blocks. This number of allocation blocks indicates total number of recordable allocation blocks, and the number of allocation blocks in the recordable area is recorded. In the case where the optical disc 20 is the premastered disc, "0" (zero) is recorded as the number of allocation blocks.

Moreover, "number of unrecorded allocation blocks" which have not yet been recorded is recorded subsequently to the number of allocation blocks. The number of unrecorded allocation blocks indicates the number of allocation blocks which have not yet been recorded of the recordable allocation blocks within the volume.

Further, "number of recorded allocation blocks" which have been already recorded is recorded subsequently to the number of unrecorded allocation blocks. This number of recorded allocation blocks indicates the number of allocation blocks which have been already recorded of the recordable allocation blocks within the volume.

Furthermore, "number of defect allocation blocks" is recorded subsequently to the number of recorded allocation blocks. This number of defect allocation blocks indicates the number of allocation blocks including defect such as crack or flaw, etc. on the disc.

In addition, "number of directories" indicating number of directories within the volume and "data file" indicating the number of data files within the volume are respectively recorded subsequently to the number of defect allocation blocks.

Subsequently to the number of directories and the data file, "ID maximum value" is recorded. This ID maximum value indicates maximum value of ID numbers attached in such an order that directories or data files are formed.

Subsequently to the ID maximum value, "volume attribute" is recorded. This volume attribute indicates attribute of data recorded in the volume management area. For example, volume attribute data indicating whether or not volume management area is recorded in the mirror mode, whether or not corresponding file is invisible file (secret file), whether or not the present state is in the write protect state (protection of write), whether or not back-up is required, and the like are recorded.

Subsequently to the volume attribute, "volume management area length" is recorded. This volume management area length indicates length of the volume management area, and byte length of the volume management area is recorded.

Subsequently to the volume management area length, "volume management area position" is recorded. This volume management area position indicates position of the volume management area on the disc, and first allocation block No. of the volume management area is recorded.

Subsequently to the volume management area position, there are recorded other management blocks formed as the result of the fact that management block within the volume management area is used. In more practical sense, as other management blocks, "volume space bitmap position" indicating position of the first allocation block of volume space bitmap VSB, "number of volume space bitmaps" indicating the number of allocation blocks of the volume space bitmap VSB, "first management table position" indicating position of the first allocation block of the management table MT, and "number of management tables" indicating the number of allocation blocks of the management table MT are recorded. Moreover, "first extent record block position" indicating position of the first allocation block of the extent record block ERB, "number of extent record blocks" indicating the number of allocation blocks of the extent record block ERB, "first directory record block position" indicating position of the first allocation block of the directory record block DRB, and "number of directory record blocks" indicating the number of allocation blocks of the directory record block are recorded.

Thus, it is possible to retrieve position of the first directory by detecting block No. of the allocation block recorded as the "first directory record block".

Subsequently to the respective management blocks, "root directory length" indicating byte length of directory and "number of root directories" indicating the number of subdirectories within the directory are respectively recorded. Subsequently thereto, various ID and character set codes, etc. are recorded. As the various ID and the character set codes, e.g., boot system ID, volume ID, publisher ID, data prepare ID, application ID and character set codes of the respective ID are recorded. In addition to the above, volume formation date, volume updating date, expiring date, and effective date, etc. are recorded.

Subsequently such data area of 2048 bytes, EDC area of 4 bytes and ECC area of 276 bytes are provided. In the ECC area, P parity of 172 bytes and Q parity of 104 bytes based on the so-called cross interleaving system are recorded.

In this example, the data area is an area of 2048 bytes, and the area of 1024 to 2047 bytes of the data area of 2048 bytes is used as system extension area for system extension.

3-5 [Volume space bitmap]

Management block of the block No. 1 in the volume management area is used as volume space bitmap VSB. This volume space bitmap VSB indicates recording state of the file extents area in all allocation block units of the data track.

Figure 12:
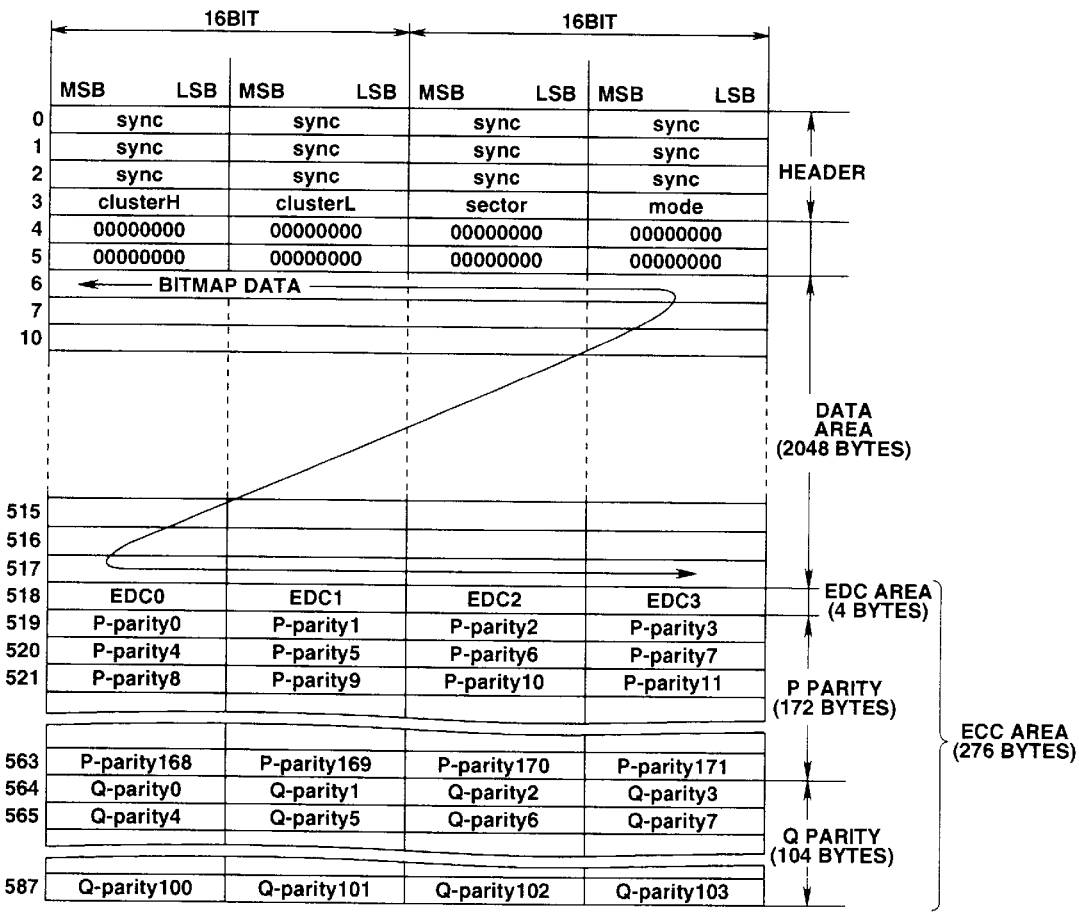
FIG. 12 is a view for explaining sector structure of volume space bitmap.

The volume space bitmap VSB consists, as shown in FIG. 12, of header in which synchronization pattern (Sync) and address are recorded, data area of 2048 bytes, and ECC area of 276 bytes in total of P parity of 172 bytes and Q parity of 104 bytes.

Allocation blocks and types of respective allocation blocks are recorded in the data area.

Figures 13A, 13B:
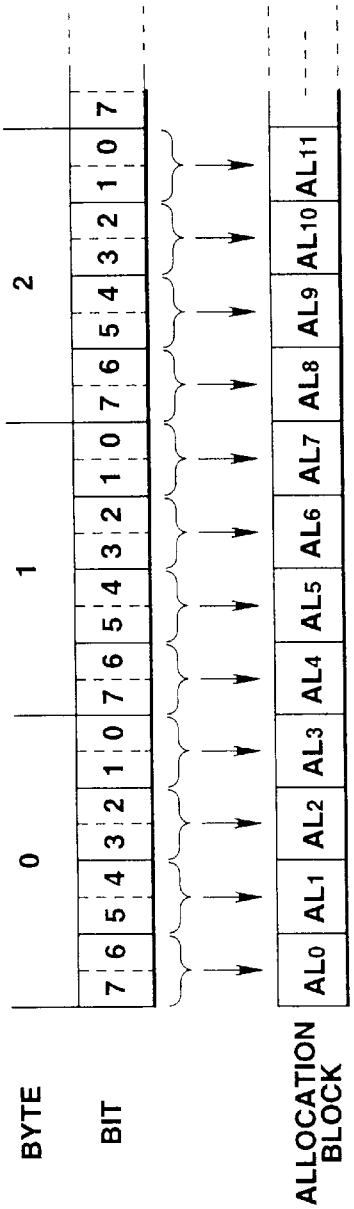
FIG. 13 is a view for explaining the configuration of allocation block.

In more practical manner, as shown in FIG. 13(a), allocation block numbers (AL0, AL1, AL2 . . . ) are respectively attached in order of number 0, number 1, number 2 . . . to the respective allocation blocks of the data track. The seventh and sixth bits of the 0-th byte which is the first byte of the data area of the volume space bitmap VSB are allocated to the allocation block AL0 of No. 0. Moreover, 2 bits are respectively allocated every respective allocation blocks in such a manner that the fifth bit and the fourth bit of the 0-th byte are respectively allocated to allocation block AL1, the third bit and the second bit are allocated to the allocation block AL2 of the number 2, the first bit and the 0-th bit are allocated to the allocation block AL3 of the number 3, and the seventh bit and the sixth bit of the first byte are allocated to the allocation block AL4 of the number 4.

The information of 2 bits respectively allocated every respective allocation blocks indicate types of respective allocation blocks, and are as shown in FIG. 13(b) such that "00" is recorded in the case where corresponding allocation block is unrecorded or not yet recorded allocation blocks, "01" is recorded in the case where it is already recorded allocation blocks, "10" is recorded in the case where it is defect allocation blocks, and "11" is recorded in the case where it is undefined or not yet defined allocation blocks.

It is to be noted that, with respect to the remainder area in the data area, i.e., area in which corresponding block does not exist, "11" is recorded into corresponding bit.

In addition, the optical disc 20 has data area of 2200 clusters so that information can be recorded in allocation blocks from AL0 up to AL8191. However, in practice, information are recorded by using allocation blocks of AL0 up to AL2199 thereof.

3-6 [Management table]

Management blocks of the block No. 2 and the block No. 3 in the volume management area are used as the management table MT.

Figure 14:
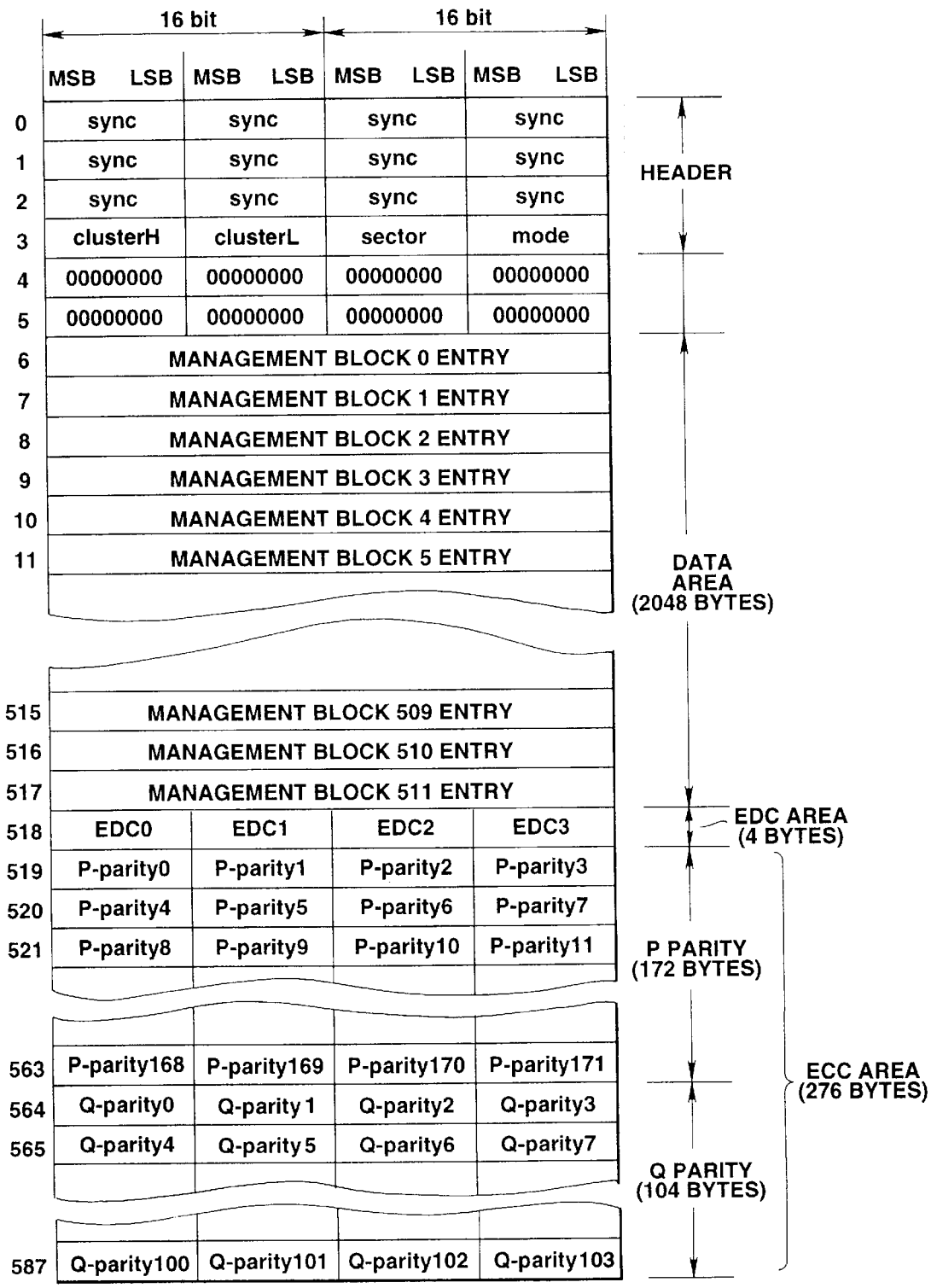
FIG. 14 is a view for explaining sector structure of management table.

This management table MT indicates use mode (form) of respective management blocks in the volume management area, and is composed, as shown in FIG. 14, of header in which synchronization pattern and address are recorded, data area of 2048 bytes, EDC area of four bytes, and ECC area of 276 bytes.

In the data area of 2048 bytes, respective management block 0 entry to the management block 511 entry to which 4 bytes are respectively allocated are recorded. Thus, use contents of 512 management blocks of the volume management area are respectively indicated and are caused to undergo management.

Figure 15:
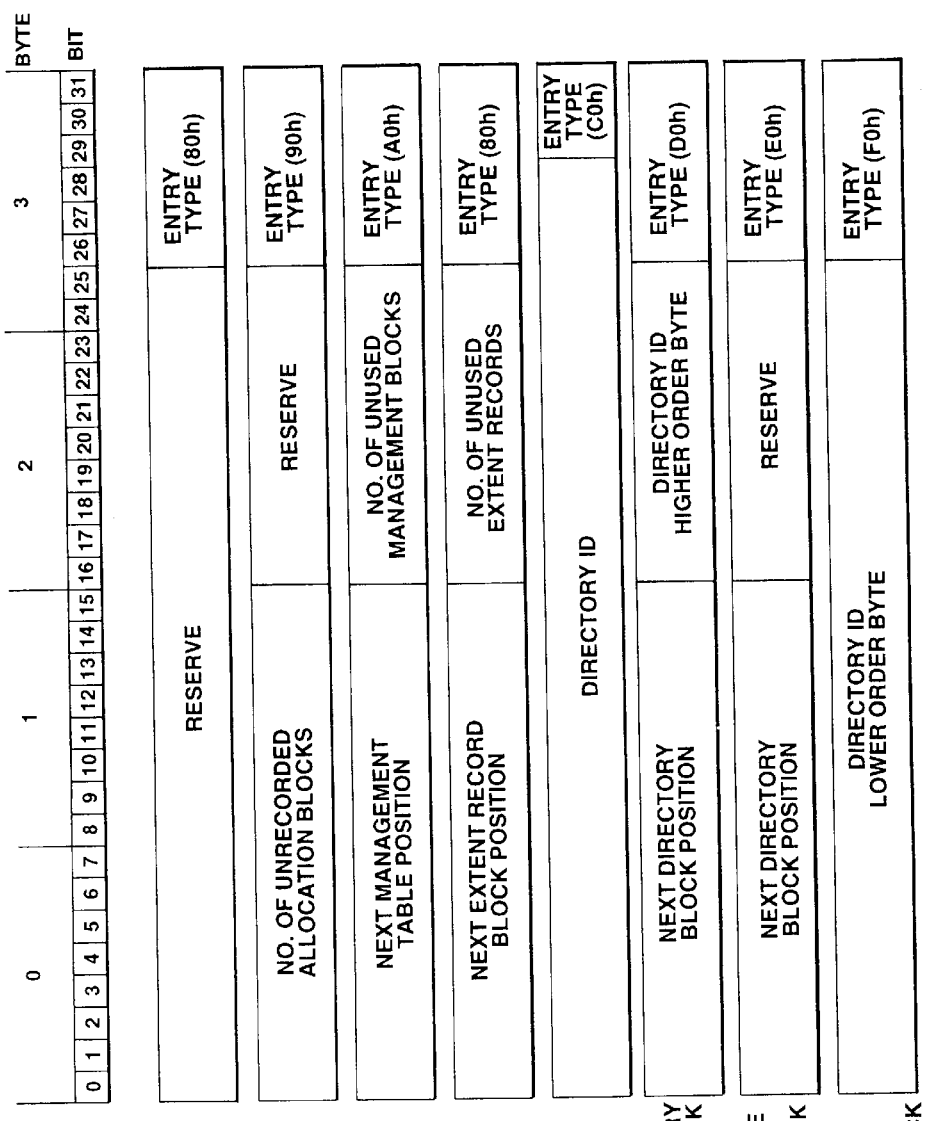
FIG. 15 is a view for explaining respective data recorded into management table.

The data content of respective entries having 4 bytes (0 entry to 511 entry) is as shown in FIG. 15.

Initially, the first management block (management block 0 entry) is used as the volume descriptor as shown in FIG. 15(a), and the 0-th byte to the second byte are reserved. Further, as entry type for indicating that the management block 0 entry is volume descriptor, e.g., "80h" is recorded at the third byte.

Moreover, the second management block (management block 1 entry) is used as the volume space bitmap as shown in FIG. 15(b). The number of unrecorded allocation blocks is recorded in the area of the 0-th byte to the first byte, and the second byte is reserved. In addition, as entry type for indicating that the management block 1 entry is volume space bitmap, e.g., "90h" is recorded at the third byte.

In the management block used as the management table, as shown in FIG. 15(c), position of the next management table is recorded in the area of 0-th byte to the first byte, and the number of unused or not yet used management blocks is recorded at the second byte. Further, as entry type for indicating that corresponding management block is management table, e.g., "A0h" is recorded at the third byte.

In the management block used as extents record block, as shown in FIG. 15(d), position of the next extent record block is recorded in the area from the 0-th byte to the first byte, and the number of unused or not yet used extent record blocks is recorded at the second byte. In addition, as entry type for indicating that corresponding management block is extent record block, e.g., "B0h" is recorded at the third byte.

As the directory record block, there exist "single directory record block" completed by directory record unit recorded by one management block and used by itself, and "plural directory record blocks" used in the state where there are recorded plural directory record blocks which are plural management blocks obtained by dividing directory record units constituting a single directory.

In the case where the management block is used as single directory record block, in the corresponding management block, as shown in FIG. 15(e), directory ID is recorded in the area of 0-th to 29-th bits. Moreover, e.g., "00h" is recorded in the last 2 bits (in the area of the 30-th bit to the 31-th bit) as entry type for indicating that corresponding management block is single directory record block.

Moreover, in the case of plural directory record blocks, information as shown in FIGS. 15(f) to 15(h) are respectively recorded in respective management blocks.

Namely, in the case where corresponding management block is "first directory record block (first directory record block)" of the plural directory record blocks, as shown in FIG. 15(f), position of the next directory record block is recorded in the area of the 0-th byte to the first byte, and higher order byte of directory ID is recorded at the second byte. In addition, as entry type for indicating that corresponding management block is the first directory record block, "D0h" is recorded at the third byte.

In the case where corresponding management block is the "last directory record block" of the plural directory record blocks, as shown in FIG. 15(h), lower order byte of directory ID is recorded in the area of the 0-th byte to the second, byte. In addition, as entry type for indicating that corresponding management block is the last directory record block, "F0h" is recorded at the third byte.

In the case where corresponding management block is intermediate directory record blocks (directory record block except for the first and last directory record blocks) of plural directory record blocks, as shown in FIG. 15(g), position of the next directory record block is recorded in the area from the 0-th byte to the first bytes, and the second byte is reserved. In addition, as entry type for indicating that corresponding management block is the intermediate directory record block, "E0h" is recorded at the third byte.

3-7 [Directory record block]

Management block of the block No. 3 and management blocks succeeding (subsequent) thereto in the volume management area are used as "directory record block DRB". In the directory record block DRB, one or plural directory record units are recorded.

As the directory record unit, there are "directory record unit for directory" for constituting directory and "directory record unit for file" for designating, in correspondence with certain data file, the position thereof. In the directory record block, in accordance with file and subdirectory formed within the directory, directory record unit for file and directory record unit for directory are recorded in the mixed state.

Figure 16:
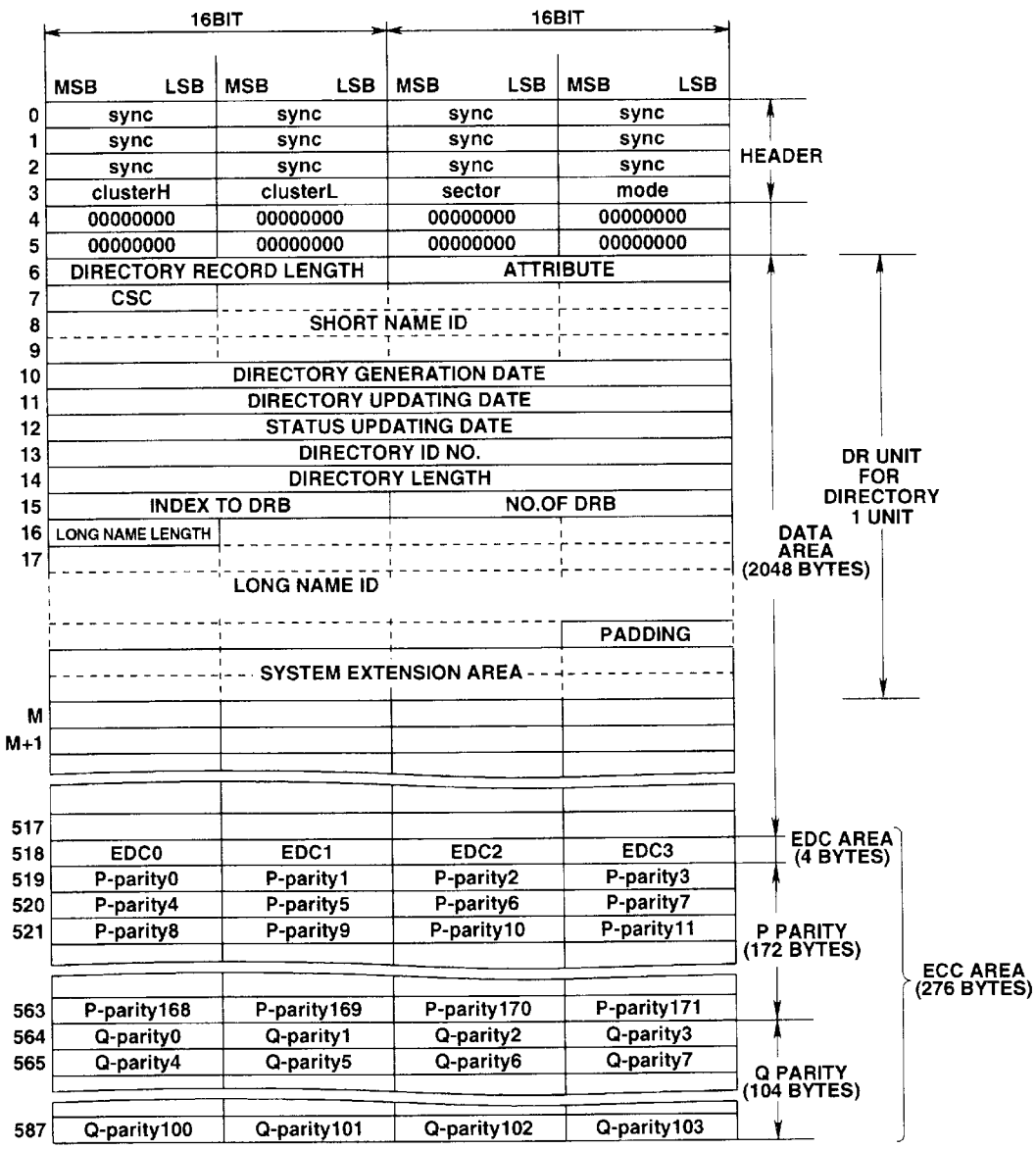
FIG. 16 is a view for explaining sector structure of directory record for directory.

The directory record block DRB in which directory record unit for directory constituting directory is composed, as shown in FIG. 16, of header in which synchronization pattern and address are recorded, data area of 2048 bytes, EDC area of 4 bytes, and ECC area of 276 bytes.

Into one directory record unit, directory record length indicating byte length of corresponding directory record unit is first recorded. The data length of one directory record unit is caused to be variable length.

Subsequently to the directory record length, attribute of directory is recorded. In more practical sense, as this attribute of directory, information indicating various attributes, such as, for example, whether or not corresponding directory record unit is directory record unit for directory, and/or whether directory included in corresponding directory record unit is invisible directory or system directory, etc. are recorded. Thus, whether or not position of data file is indicated by using extents record block which will be described later is indicated.

Subsequently to the attribute of directory, character set code (CSC) indicating kind of character of short name ID and the short name ID are recorded. The short name ID is recorded by ASCII code of 11 bytes. Directory name of 11 characters or less can be recorded there into.

Subsequently to the short name ID, directory formation date and directory updating date are recorded, and updating date of the directory record unit is recorded as status updating date. Further, directory ID No. and directory length are recorded. Subsequently thereto, "Index to DRB" and "No. of DRB" are recorded.

The index to DRB indicates position within the volume management area in the first directory record block DRB in which the content of the designated subdirectory is recorded. For this reason, as the index to DRB, any one value of management numbers 0 to 511 is recorded.

As the No. of DRB, number of directory record blocks for indicating the designated directory is recorded by the number of management blocks.

Subsequently to the number of DRB, "long name ID" is recorded. This long name ID is variable length, and its data length is recorded. It is to be noted that while there are instances long name ID is not recorded, "00h" is recorded as the long name ID in that case. Moreover, in the case where length of long name ID is even bytes, "00h" is recorded as padding for filling excess byte. Byte subsequent to the long name ID is utilized as system extension area.

Directory record unit corresponding to directory is constituted as stated above, and plural directory record units are provided within data area of 2048 bytes.

Figure 17:
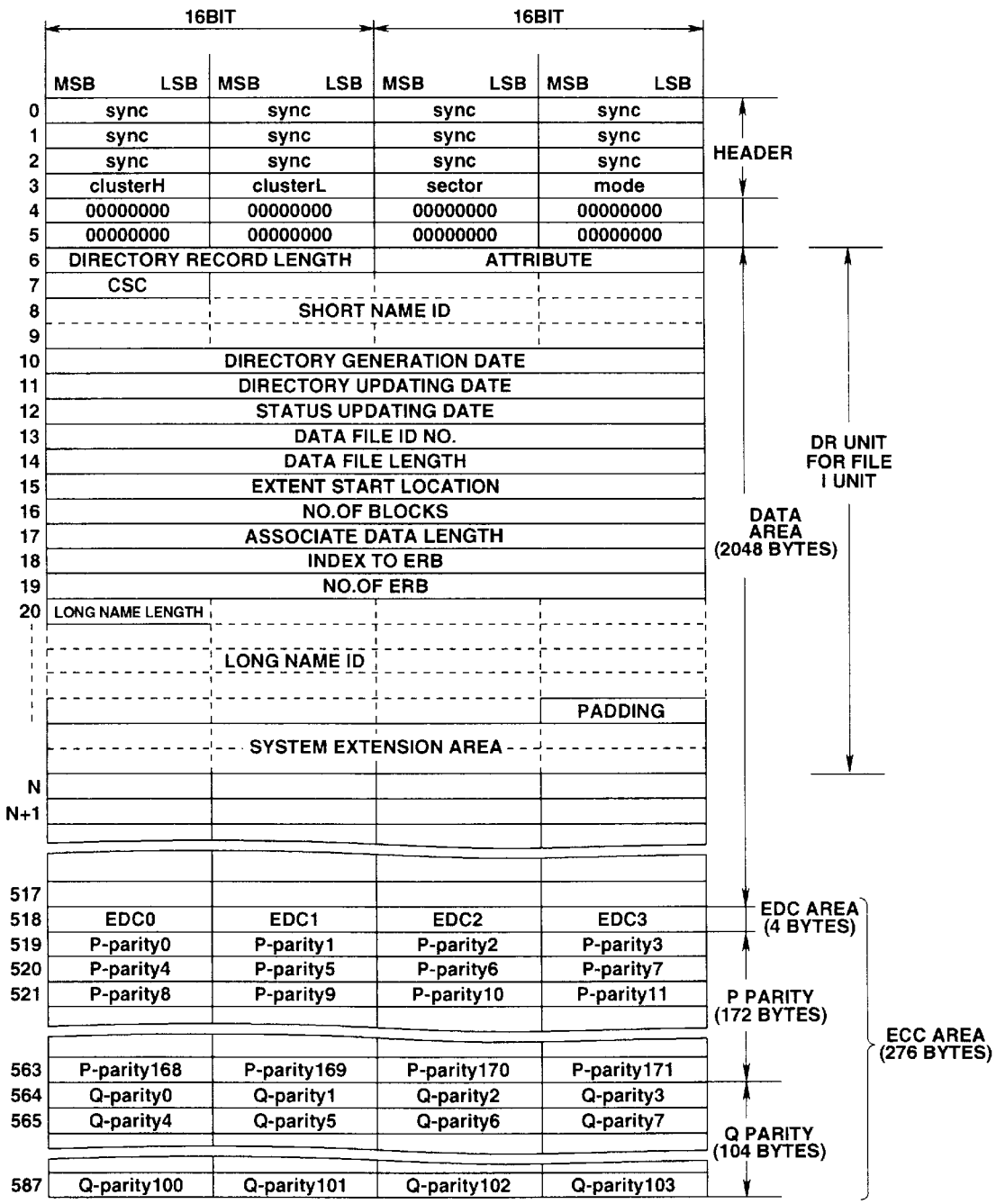
FIG. 17 is a view for explaining sector structure of directory record for file.

The directory record block DRB in which directory record unit for file corresponding to a certain data file is composed, as shown in FIG. 17, of header consisting of synchronization pattern and address, data area of 2048 bytes, EDC area of 4 bytes, and ECC area of 276 bytes.

In the data area of 2048 bytes, one or plural directory record units respectively corresponding to data files can be recorded.

Into one directory record unit, similarly to the directory record unit in FIG. 16, directory record length is first recorded and attribute is subsequently recorded. By this attribute, various attributes, such as, for example, whether or not corresponding directory record unit corresponds to directory, whether or not corresponding data file is invisible file and/or system file, or whether or not corresponding data file position is designated by extent record unit, etc. are indicated.

Subsequently to the attribute, similarly to the directory record unit shown in FIG. 16, character set code (CSC), short name ID for recording file name, directory formation (preparation) date, directory updating date and status updating date are recorded. As the short name ID, data file name is recorded by ASCII code of 11 characters or less.

Subsequently to the short name ID, data file ID No. and data file length, extent start location, No. of blocks, and associate data length are recorded.

This extent start location indicates position of file recorded in the file extent area by allocation block No. Moreover, No. of blocks indicates the number of allocation blocks used from the start position designated by extent start location.

Subsequently to the associate data length, "index to ERB" and "No. of ERB" are recorded.

This index to ERB indicates position within volume management area of extents record block including data for indicating respective distributed positions of data file recorded in a distributed manner, and management block numbers of 0 to 511 are recorded.

The No. of ERB indicates the number of extents record blocks for indicating the data files recorded in distributed manner, i.e., dispersely recorded data file, and is recorded by the number of management blocks.

Subsequently to the No. of ERB, long name ID which is variable length is recorded by the data length thereof. In the case where no long name ID is recorded, "00h" ID is recorded as the long name ID. In the case where long name ID is even bytes, "00h" is recorded as padding in order to fill excess or remainder bytes.

Additionally, bytes subsequent to the long name ID are utilized as system extension area.

Directory record unit corresponding to the data file is constituted as stated above, and such plural directory record units may be provided within the data area of 2048 bytes.

In recording data file such as picture file, etc. onto the disc, there are two kinds of cases as described below. The method of designating position of data file changes in dependency upon respective cases.

The first case is the case where continuous space areas corresponding to data of picture files to be recorded can be ensured on the disc. In this case, picture file is recorded into physically continuous areas as one file. In more practical sense, in this case, picture file is recorded so that one picture file is constituted by allocation block where respective one picture files are continuous. Ordinarily, position of data file is indicated by allocation block No. recorded in physically continuous areas in this way and recorded as extent start location within corresponding directory record unit for file.

The second case is the case where continuous space areas corresponding to data of picture files to be recorded cannot be ensured on the disc. In this case, one picture file is recorded, in a distributed manner, in the areas distributed on the disc. In more practical sense, one picture file is recorded so that it is constituted by plural separate allocation blocks. In this case, position within the management area of extents record block which will be described later is designated by the management block No. recorded as index to ERB included within the directory record unit for file, and positions of respective distributed areas are designated on the basis of data included within the extents record block.

It is to be noted that no data of index ERB is recorded in the first case, and no extent start location is recorded in the second case.

3-8 [Extent record block]

Management block of the block No. 4 and management blocks succeeding (subsequent) thereto within the volume management area are used as extent record block ERB. This extent record block ERB is used in the case where one picture file is recorded into distributed areas designated by separate allocation blocks as in the above-described second case. Moreover, data for indicating allocation block positions of the respective distributed areas are recorded in the extent record block ERB.

In the extent record block ERB, 64 extent record units (ER units) at the maximum can be recorded.

This ER unit consists of ER unit for index of 32 bytes and ER unit for descriptor of 32 bytes.

The ER unit for index is recorded as the leading unit of plural ER units within the extent record block ERB, and thus serves to carry out management of use state (situation) of the second ER unit and ER units succeeding thereto. The second ER unit and ER units succeeding thereto are used as ER unit for descriptor, and recording positions of respective distributed areas are indicated by allocation block number by data included within these units.

Figure 18:
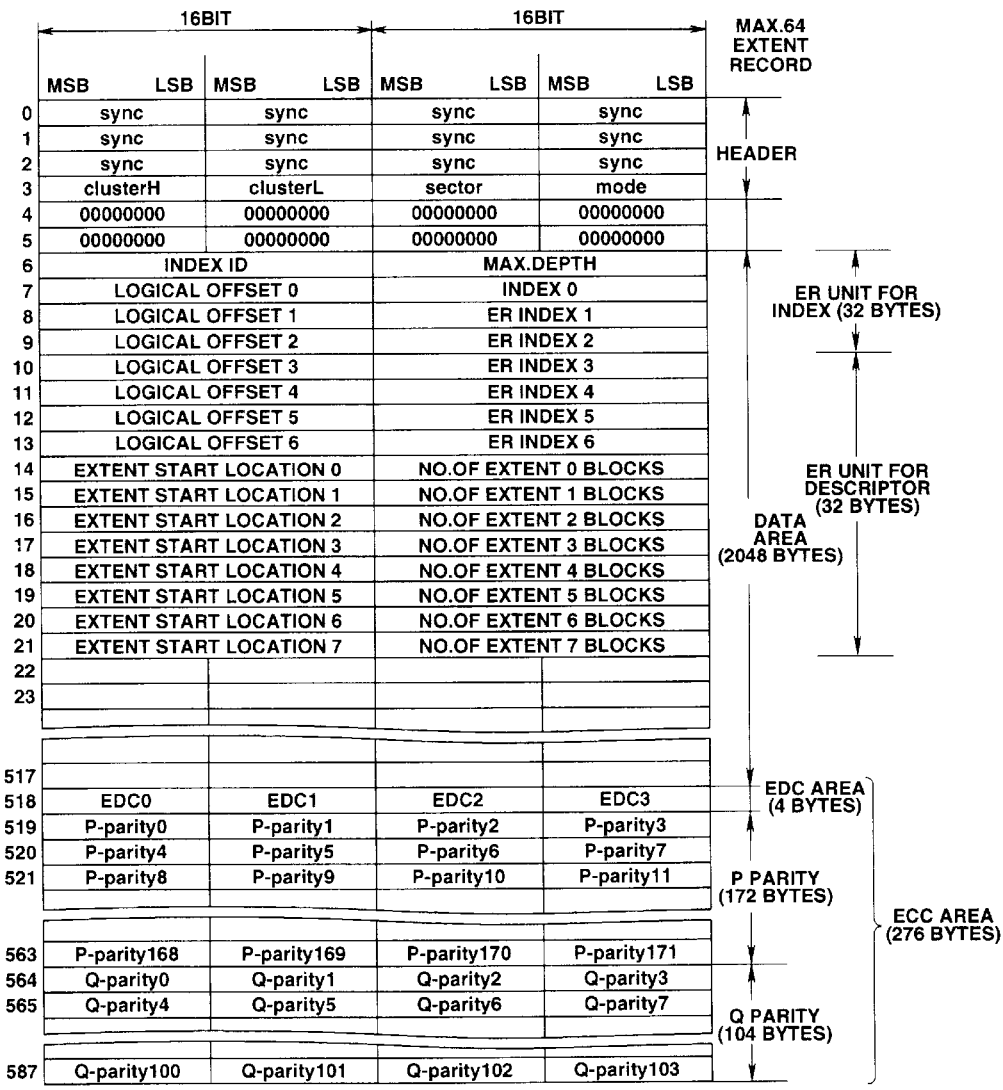
FIG. 18 is a view for explaining sector structure of extent record block.

Namely, the extent record block ERB consists, as shown in FIG. 18, of header in which synchronization pattern and address are recorded, data area of 2048 bytes, EDC area of 4 bytes, and ECC area of 276 bytes.

In the data area of 2048 bytes, 64 extent record units can be recorded. In this example, one extent record unit is constituted by the 32 bytes.

FIG. 18 shows the example where extent record unit of the first 32 bytes of the data area is used as extent record unit for index.

In the extent record unit for index, index ID is first recorded. In this case, as the index ID, "FFFF" indicating that corresponding extent record unit is used as extent record unit for index is recorded.

Subsequently to the index ID, maximum depth is recorded. Tree structure of extent record is formed by the extent record unit for index, and the maximum depth indicates subtree hierarchy designated by the extent record unit. For example, in the case where the extent record unit including extent descriptor is designated by extent record unit for index (in the case of the lowest layer (level)), "0000h" is recorded as the maximum depth. Subsequently thereto, logical offsets and ER indices can be recorded by seven at the maximum.

The ER index represents which one of 64 ER units recorded within the extent record block corresponds to data indicating distributed area. Moreover, any one of ER unit numbers of 0 to 63 is recorded in the ER index. Further, in the logical offset, data indicating that ER unit indicated by the ER index corresponds to which ER unit of ER units for constituting data file is recorded.

In the example of FIG. 18, the second ER unit and ER units succeeding (subsequent) thereto are used as ER unit for descriptor.

In the ER unit for descriptor, eight extent start locations at the maximum and the number of allocation blocks are recorded.

As the extent start location, allocation block No. indicating recording position of one distributed area is recorded. Moreover, as the allocation block No., data indicating the number of allocation blocks constituting corresponding distributed area is recorded. For this reason, one distributed area is designated by one extent start location and one allocation block number. Accordingly, eight extent start locations and the number of allocation blocks can be recorded in one DR unit for descriptor. For this reason, eight distributed areas at the maximum can be designated by one DR unit for descriptor.

Moreover, in the case where eight distributed areas or more are designated, it is sufficient that the third ER unit is newly used as ER unit for descriptor to link ER unit for descriptor succeeding (subsequent) to the ER unit for descriptor recorded in the second ER unit and ER unit for descriptor newly recorded in the third ER unit by using the ER unit for index.

Explanation will now be given in connection with the case where positions of picture files recorded in plural distributed areas are designated by extent record block ERB in this way.

Initially, position within the management block area of extent record block ERB is designated by index to ERB recorded within DR unit for file in directory record block DRB. Subsequently, data of "FFFF" indicating that corresponding extent record unit is used as extent record unit for index is recorded at the leading portion of the first ER unit of ERB. For this reason, by reproducing this data, the first ER unit can be judged as ER unit for index.

Further, in order to retrieve the first ER unit constituting the data file, an approach is employed to retrieve data of logical offset expressed as "0000" to retrieve data of ER index corresponding to data of the logical offset of "0000". As described above, eight distributed areas are respectively designated by eight extent start locations and the number of allocation blocks recorded in the ER unit for descriptor indicated by the data of the ER index. For this reason, positions of respective picture files distributed on the disc can be detected by data within the management area. Accordingly, there is no necessity of retrieving the disc in reading out picture file. Thus, high speed reproduction (playback) can be carried out.

4 Description of File and the Hierarchical Structure of File

As the file used in this still picture (playback) system, there are management file, picture file, and index picture file, etc.

Expander (Expanding Operator) of file name of the management file is "PMF". When it is detected that this expander is PMF, corresponding file is discriminated as management file. As the management file, there are overall information management file (OV_INF. PMF), picture data management file (PIC_INF. PMF), print data management file (PRT_INF. PMF), and reproduction (playback) control management file (PMS_INF. PMF), etc.

Moreover, expanders of file names of respective picture files are "PMP". When it is detected that this expander is "PMP", corresponding file is discriminated as picture file. As the picture file, there are high resolution picture file for recording high resolution picture data HD, and intermediate resolution picture file for recording intermediate resolution picture data SD.

As the intermediate resolution picture file, there are "PSNnnnnn. PMP file" having picture data of 640 pixels× 480 pixels of aspect ratio of 4:3 and "PSWnnnnn. PMP file" having picture data of 848 pixels×480 pixels of aspect ratio of 16:9.

As the high resolution picture file, there are "PHPnnnnn. PMP file" having picture data of 1536 pixels×1024 pixels of aspect ratio of 3:2, and "PHWnnnnn. PMP file" having picture data of 1920 pixels×1080 pixels of aspect ratio of 16:9. Moreover, as file for recording ultra (super) high resolution picture data HD as one of high resolution picture files, there is "PUPnnnnn. PMP file" having picture data of 3072 pixels×2048 pixels of aspect ratio of 3:2.

It is to be noted that with respect to the file name of the picture file in which the expander is caused to be "PMP", the leading three characters (e.g., PHP, etc.) are determined by kind of picture, and five characters (nnnnn) succeeding (subsequent) thereto are determined by picture numbers given in order of formation of picture files.

Figure 19:
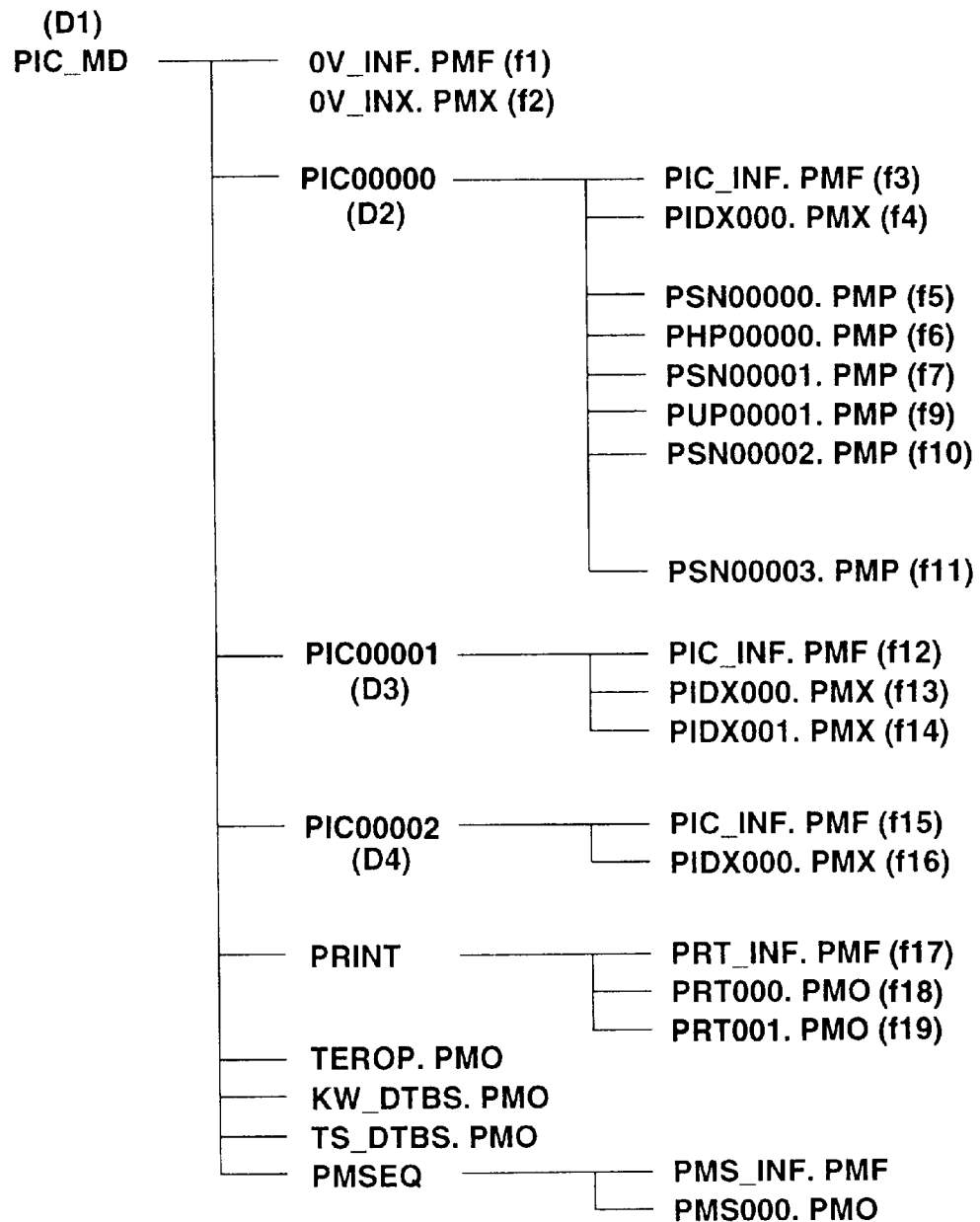
FIG. 19 is a view for explaining hierarchical directory structure for carrying out management of picture data every respective resolutions in the still picture system.

This still picture system carries out management of picture data recorded on the optical disc by the hierarchical directory structure. This hierarchical directory structure is as shown in FIG. 19, for example, wherein directory D1 (PIC_MD) for recording picture data is provided so that file management is carried out therewithin.

There are provided, within the directory D1, overall information management file f1 (OV_INF. PMF) for carrying out management of the entire information, overall index file f2 (OV_IDX. PMX) for carrying out management of the entire index file, and picture directories D2 to DIC4 (PIC00000 to PIC00002) of respective albums.

In this example, as the picture directory, respective picture directories (PIC00000) to (PIC00002) of directory numbers of "00000" to "00002" are provided. Five characters subsequent to "PIC" of respective picture directories are given as directory numbers in order of formation of respective picture directories. Thus, picture directory name is indicated.

Moreover, there are provided, within the directory (PIC_MD), print directory (PRINT) for carrying out management of print control data such as hue (tint) of print, print size, and rotation, etc., Telop directory (TERO. PMO) for carrying out management of Telop such as title, etc. of picture subjected to monitor display, key word retrieval directory (KW_DTBS. PMO) attached to picture numbers of respective pictures or the respective pictures, time stamp directory (TS_DTBS. PMO) for carrying out management of recording date, etc. of picture, and reproduction (playback) control directory (PMSEQ) for carrying out management of a program reproduction such that only designated picture is reproduced.

In the picture directory D2 (PIC00000), picture data management file f3 (PIC_INF. PMF) for carrying out management of plural picture files designated by directory No. of "00000", and picture index file f4 (PIDX000. PMX) in which index pictures of the corresponding picture directory D2 are collected are recorded. Moreover, in the picture directory D2, intermediate resolution picture file f5 (PSN00000. PMP) and high resolution picture file f6 (PHP00000. PMP) formed on the basis of picture data designated by "00000" of picture number are recorded. Further, intermediate resolution picture file f7 (PSN00001. PMP) and super high resolution picture file f9 (PUP00001. PMP) formed on the basis of picture file data designated by "00001" of picture number are recorded. In addition, intermediate resolution picture file f10 (PSN00002. PMP) formed on the basis of picture data designated by "00002" of picture number and intermediate resolution picture file f11 (PSN00003. PMP) formed on the basis of picture data designated by "00003" of picture number are recorded.

In the picture directory (PIC00001) designated by "00001" of directory number, the above-described picture data management file (PIC_INF. PMF) and two index files (PIDX000. PMX, PIDX001. PMX) for carrying out management of index pictures of the respective pictures are recorded. It is to be noted that index picture corresponding to picture file recorded in the picture directory (PIC00001) is caused to undergo management by the two picture index files, and these two index files are used formally in the state where they are linked with each other.

In the print directory (PRINT), print data management file (PRT_INF. PMF) for carrying out management of plural print data files and print data file (PRT000. PMO to PRT nnn. PMO) caused to undergo management by the print data management file are recorded.

In the reproduction (playback) control directory (PMSEQ), reproduction control management file (PMS_INF. PMF) for carrying out management of reproduction control data file recorded in the reproduction control directory (PMSEQ) and plural reproduction control data files (PMS000. PMO to PMS nnn. PMO) for controlling the picture sequence are recorded.

As has been explained with reference to the FIG. 10(c) mentioned above, block numbers of 0 to 511 are attached to the management blocks, and volume descriptor VD, volume space bitmap VSB, management table MT, management table MT, directory record block DRB, directory record block DRB, extents record block ERB, directory record block DRB, extents record block ERB . . . are allocated in order from the block No. 0.

The directory record block DRB for indicating directory DI (PIC_MD) is adapted so that it can be discriminated by data of the volume descriptor VD that this block is the fourth block of the management block.

Namely, in FIG. 20, in the directory record block DRB recorded in the fourth block of the management block, two DR units for file for indicating recording positions of the overall information management file f1 and the overall index file f2 shown in FIG. 19 mentioned above are provided succeedingly (subsequently) to the header.

The DR unit for file recorded in the first unit indicates allocation block position of the overall information management file f1 by the allocation block No. recorded as Extent Start Location. Moreover, the DR unit for file recorded in the second unit indicates allocation block position of the overall index file f2 by the allocation block No. recorded as Extent Start Location.

It is to be noted that since the overall information management file f1 and the overall index file f2 are recorded in allocation blocks continuous on the optical disc 20, they are not recorded in Index to ERB.

In the third and fourth units which are units succeeding to the two DR unit for file, two DR units for directory for respectively indicating picture directory D2 of the directory No. of "00000" and picture directory D3 of the directory No. of "00001" are provided.

In more practical sense, in this DR unit for directory, relative position within the management block of DRB corresponding to picture directory D2 is indicated by management block numbers of 0 to 511 recorded as "Index to DRB". In this example, in data of Index to DRB within the DR unit for directory of the third unit, "005" is recorded as data indicating block position within the management block of index to DRB of the picture directory D2. Similarly, in data of Index to DRB of DR unit for directory of the fourth unit, "007" is recorded as data indicating block position within the management block of index to DRB of the picture directory D3.

As described above, block position of index to DRB of the fifth block of the management block is designated by DR unit for directory which is the third unit in index to DRB of the fourth block of the management block.

The index to DRB of the fifth block is block in which data relating to picture directory D2 is recorded, and eight DR units for file are provided succeedingly (subsequently) to the header. In seven DR units for file of in the first to seventh units, data for indicating recording positions of picture data management file f3, picture index file f4, intermediate resolution picture data file f5, high resolution picture data file f6, intermediate resolution picture data file f7, super high resolution picture data file f9, and intermediate resolution picture data file f10 are recorded. Similarly to the above-described DR unit for file, in respective DR units for file, recording positions of the picture data management file f3, the picture index file f4, the intermediate resolution picture data file f5, the high resolution picture data file f6 and the intermediate resolution picture data file f7 are respectively indicated by allocation block numbers recorded as Extent Start Location.

In the DR unit for file provided at the seventh unit, data for indicating recording position of the super high resolution picture data file f9 is recorded. This super high resolution picture data file is recorded into continuous areas by data length, e.g., 18 clusters. In the case where continuous space areas corresponding to 18 clusters do not exist on the optical disc 20, this super high resolution picture file is recorded in the state distributed into allocation blocks which are not continuous. In the case where one file is recorded in the distributed state in this way, an approach is adopted such that, with respect to data of extent start location of DR unit for file, extent record block ERB is provided between directory record block DRB and picture file f9 to be designated without directly designating respective distributed areas of the file thus to designate positions of respective distributed areas of picture file by data of the extent record block ERB.

As has been explained with reference to the FIG. 18 mentioned above, in the extent record block ERB, four extent record units (ER units) are provided succeedingly (subsequently) to the header. In this example, 64 ER units can be provided at the maximum.

The first ER unit is used as ER unit for index and the second and third ER units are used as ER unit for descriptor. In the ER unit for index, index data relating to the second ER unit and ER units succeeding thereto are recorded. Moreover, in the ER unit for index, data of ER index and logical offset are recorded by the number of ER units used.

ER index is data indicating which any one of 64 ER units exists, and is indicated by any one of ER unit Nos. of 0 to 63.

Moreover, the logical offset is data indicating that ER unit indicated by ER index is data indicating which any of ER units that constitute one file.

In the ER unit for descriptor, eight Extent Start positions and eight numbers of Extent blocks can be recorded.

The extent start position is data for indicating start position of the distributed area, and is represented by allocation block No. Moreover, the number of Extent blocks is data for indicating data length of the distributed area, and is represented by the number of allocation blocks. For this reason, it is possible to designate eight distributed areas on the basis of data of Extent start position and the number of Extent blocks by one ER unit for descriptor.

Figure 21:
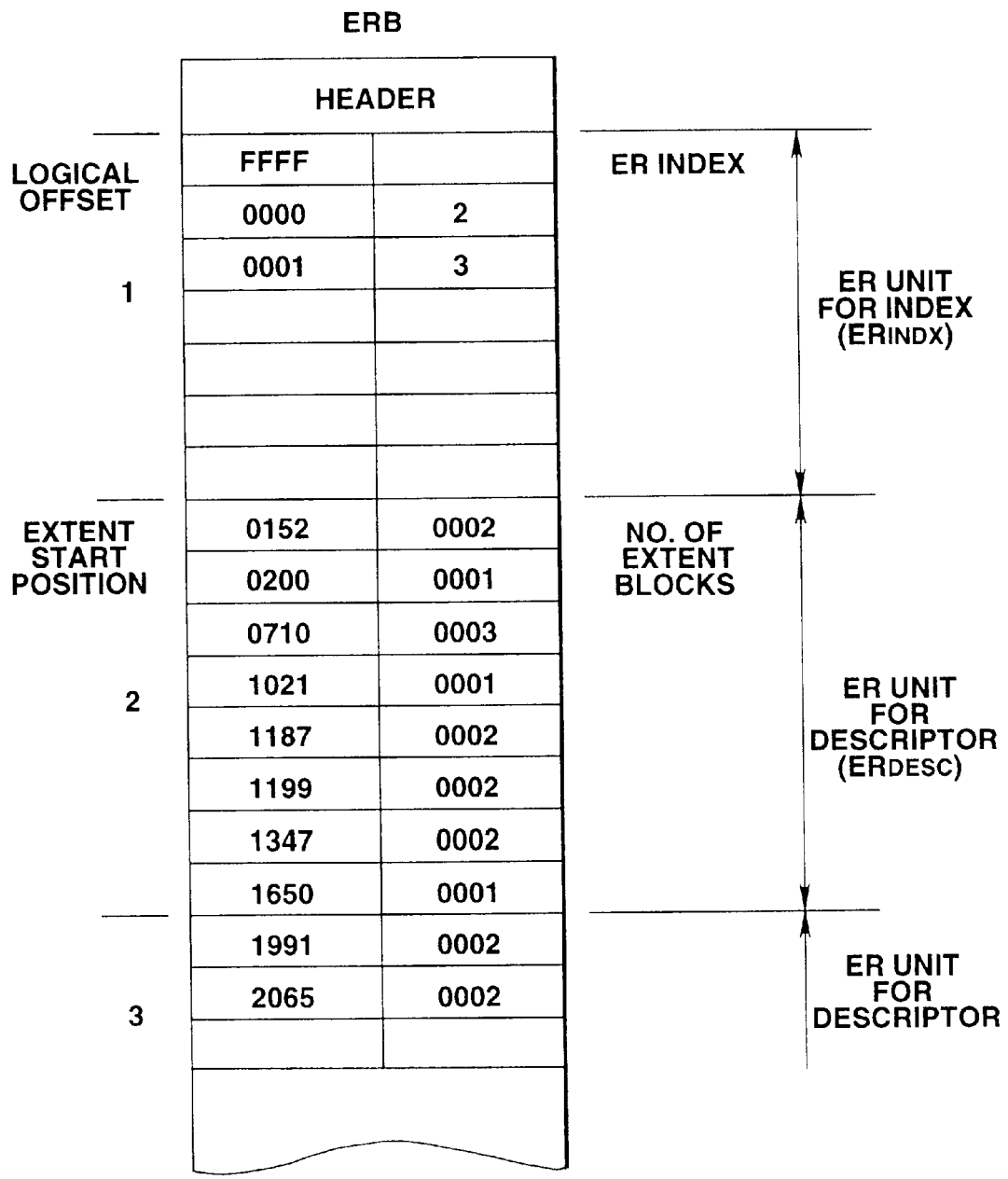
FIG. 21 is a view for explaining the configuration of ERB constituting the management block.

Namely, in the case of this example, as shown in FIG. 21, data of "FFFF" indicating ER unit for index is recorded at the leading portion of the first ER unit. In order to retrieve the first ER unit constituting data of the super high resolution picture data file f9, it is sufficient to retrieve the portion where data of the logical offset is expressed as "0000". Since "2" is recorded as data of ER index corresponding to "0000" of the logical offset is recorded in the ER unit for index, it is possible to detect that the second ER unit is the first ER unit constituting data of the file f9.

When reference is made to the second ER unit (ER unit for descriptor), it is seen that the start position of the first divisional area of the file f9 is "0152" in terms of the allocation No., and data length of the first divisional area is "0002" in terms of the number of allocation blocks. Similarly, in the ER unit for descriptor, data relating to the second divisional area to the eighth divisional area are recorded in succession.

Then, "0001" which is the next data of the logical offset "0000" in the index for index is retrieved as data subsequent to the ER unit for descriptor which is the second ER record. Since data of the ER index in which logical offset is expressed as "0001" is recorded as "3", it is indicated that the third ER unit exists as data continuous to the second ER unit.

When reference is made to the third ER unit (ER unit for descriptor), allocation block Nos. indicating start positions of the ninth distributed area and the tenth distributed area and the number of allocation blocks indicating data length are respectively recorded.

As stated above, respective allocation block positions of distributed areas distributed into 10 areas are indicated by the ER unit for descriptor of extent record block ERB. For this reason, even in the case where one file is recorded in distributed manner, it is possible to grasp positions of respective distributed areas within the management block having extent record block ERB. For this reason, also in the case where distributed respective areas are continuously reproduced from the optical disc 20 as one file, there is no necessity of individually retrieving, on the disc, respective distributed areas on the disc. Thus, high speed reproduction (play back) can be made.

It is to be noted that such distribution recording of picture file is not limited to the time of recording of the above-described super high resolution picture file, but may be carried out also in the case where the unrecorded area on the disc is reduced as the result of the fact that recording of picture file is repeated, so continuous space areas of predetermined number of clusters corresponding to picture files of respective resolutions cannot be ensured.

5 Configuration of File

The respective files consist of header and data body. Start address of the data body is prescribed (provided) by the header. The data body starts from, e.g., address of multiple of 4. With respect to data of 2 bytes or more, preference is given to higher order byte. Moreover, the data size is caused to be multiple of 4 except for respective picture data which have been caused to fixed length encoding (including dummy data of 00h added when the above-described low resolution picture data is subjected to raster/block conversion), and character train is terminated with null data (00h). It is to be noted that there may be employed a configuration in which space area is provided between the header and the data body.

5-1 [Configuration of the header]

The header consists of a plurality of tables. "Format table" indicating what corresponding file is allocated to the leading portion, and option tables such as the picture processing information, etc. are allocated in an arbitrary order subsequently (succeedingly) thereto. Moreover, respective tables are started from, e.g., address of multiple of 4, and the interval between the table and the next table is 256 bytes or less. It is to be noted that there may be employed a configuration in which space data exists between the table and the next table.

In more practical sense, as kind of the table, there exist format table (10h), name table (11h), comment table (12h), disc ID table (14h), picture parameter table (20h), recording information table (21h), color management parameter table (22h), and option table (90h), etc. (symbol within the parenthesis represents ID of each table).

5-2 [Format table]

The format table consists, as shown in FIG. 22, of table ID (1 byte), next table pointer (1 byte), format version (2 bytes), file form (1 byte), file form version (1 byte), the number of all tables (1 byte), space area (reserved: 1 byte), data start address (4 bytes), data size (4 bytes), and space area (reserved: 4 bytes). They are all recorded in binary (B) data form.

Moreover, as "file form" recorded by 1 byte, the above-described overall information management file is recorded by "00h", the picture data management file is recorded by "01h", the print data management file is recorded by "03h", the reproduction control management file is recorded by "05h", the picture data file is recorded by "10h", the overall index file is recorded by "11h", and the picture index file is recorded by "12h". Moreover, the print data file is recorded by "30h", Telop data file is recorded by "32h", the key word retrieval data file is recorded by "33h", the time stamp retrieval data file is recorded by "34h", and the reproduction control data file is recorded by "35h".

5-3 [Picture parameter table]

This picture parameter table is recorded into the headers of respective picture files for recording high resolution picture data and intermediate resolution picture file data, and the picture processing information relating to the original picture data which provide basis of the high resolution picture data and the intermediate resolution picture data are recorded as parameter.

In this still picture system, high resolution picture data and intermediate resolution picture data are formed on the basis of original picture data taken in from scanner, etc., and are recorded as high resolution picture file and intermediate resolution picture file. However, since the original picture itself is not recorded on the disc by any means, there is no possibility that the original picture data is left. However, it is possible to grasp, on the basis of data of the picture parameter table recorded in the header of this picture file, how in what state the original picture which provides basis of the high resolution picture data is recorded, and how it is processed so that high resolution picture data and intermediate resolution picture data are formed. Accordingly, in order to allow information relating to the original picture data to be left, data of these picture parameter tables are recorded into the header of the picture file along with the picture data, and are not caused to undergo rewrite operation.

In the picture parameter table, as shown in FIG. 23, table ID of 1 byte, next table pointer of 1 byte, picture size (lateral size) of 2 bytes, picture size (longitudinal size) of 2 bytes, picture component of 1 byte, length and breadth discrimination of 1 byte, wide ID of 1 byte, compression rate of corresponding picture data of 1 byte, copyright/editorial right of 1 byte, and input equipment ID information of 1 byte are recorded. In addition, space area (reserved) of 3 bytes and information indicating presence or absence of the dummy data of 1 byte, etc. are recorded.

The "Picture size" is information indicating size of the number of pixels of picture. Moreover, the "Picture component" is such that "00h" is recorded in the case where the ratio between luminance (Y), color difference (Cr) and color difference (Cb) is 4:2:0, "01h" is recorded in the case of "orthogonal" case of 4:2:0, "0h" is recorded in the case of 4:2:2 and "20h" is recorded in the case of orthogonal of 4:2:2. It is to be noted that "orthogonal" indicates that Y data and C data of the leading portion are in correspondence with each other.

Moreover, the "length and breadth discrimination" is rotation information (in counterclockwise direction) for displaying picture, and is such that "00h" is recorded in the case of ordinary lateral display, "01h" is recorded in the case of the longitudinal display rotated by 90 degrees with respect to the lateral display, "02h" is recorded in the case of lateral display rotated by 180 degrees with respect to the lateral display, and "03h" is recorded in the case of longitudinal display rotated by 270 degrees with respect to the lateral display. Additionally, "FFh" is undefined at present.

These respective information are all reproduced so that they can be displayed. For this reason, user displays this picture parameter table on monitor unit 9, thereby making it possible to simply recognize parameters of corresponding picture.

5-4 [Overall information management file]

The overall information management file is management file for synthetically carrying out management of all data files recorded in the directory (PIC_MD).

The overall information management file consists of header and data body as shown in FIG. 24(a). In the header, format table (10h), name table (11h), comment table (12h), disc ID table (14h), and option table (90h) are recorded as described above.

In the data body, total number of pictures of 2 bytes, next picture directory No. of 2 bytes, total number of picture directories of 2 bytes, information indicating presence or absence of reproduction control directory of 1 byte, the number of reproduction control files of 1 byte, the number of print data files of 1 byte, and information indicating presence or absence of Telop data file of 1 byte are recorded. In addition, information indicating presence or absence of retrieval information file of 1 byte, automatic start file No. of 1 byte, last access picture directory No. of 2 bytes, last access picture No. of 2 bytes, pass word of 8 bytes, narration language information of 6 bytes, space area (reserved) of 2 bytes, and picture directory information unit of 48 bytes are recorded by N (N is the number of picture directories). It is to be noted that these respective information are all recorded in binary data form.

The "Total number of pixels" is information indicating the total number of pixels of picture of ordinary resolution (intermediate resolution picture data) of aspect ratio of 3:4, "Next picture directory No." is information in which 1 is added to the last No. of the picture directory, and "Total number of picture directories" is information indicating the number (N) of picture directories. In addition, "presence or absence of the number of files of telop data is such that "00h" is recorded in the case where no telop data exists and "01h" is recorded in the case where telop data exists.

As described above, picture directory information unit consisting of 48 bytes is recorded in a manner caused to be in correspondence with index picture recorded in the overall index file. In this overall index file, respective one index pictures that user has selected of index pictures included in respective picture directories are recorded in order of the picture directories. Accordingly, since respective one index pictures are taken out from the picture directories, index pictures having the same number (N) as that of the picture directories are recorded.

Moreover, one picture directory information unit corresponds to one index picture recorded in the overall index file, and picture directory information unit corresponding to index picture recorded in the m-th overall index file is recorded as the m-th unit. Namely, these picture directory information units are recorded in the same order as the recording order of the index picture of the overall index file and by the same number as above.

Respective picture directory information units consist, as shown in FIG. 24(b), of directory No. of 2 bytes, index picture No. of 2 bytes, the number of pictures within directory of 2 bytes, index picture individual information of 1 byte, character ID code of 1 byte, directory name of 36 bytes, and space area of 4 bytes. While information are all recorded in binary data form except for the "directory name", the "directory name" is recorded by ASCII code (A).

It is to be noted that the "directory name" is recorded by codes except for ASCII code, such as, for example, ISO code or JIS code, etc., its data form becomes "C".

In the directory No., directory No. for indicating picture directory including picture file corresponding to index picture is recorded. In the index picture No., picture No. for indicating No. of picture file corresponding to index picture is recorded. Accordingly, when the m-th index picture of the overall index file is designated by user, reference is first made to the m-th picture directory information unit from the leading picture directory information. Subsequently, what picture directory includes designated picture index is retrieved by data of directory No. recorded in the picture directory information unit to which reference has been made. In addition, in the index picture individual information, rotation information, etc. in displaying index picture on the monitor is recorded. In displaying the index picture, display is carried out on the basis of such information.

5-5 [Picture data management file]

Respective one picture data management files are necessarily provided in the picture directories, and data for carrying out management of respective pictures stored in the directory is recorded.

The picture data management file consists of header and data body as shown in FIG. 25(a). In the header, format table (10h), name table (11h), comment table (12h), disc ID table (14h) and option table (90h) are recorded as described above.

Moreover, in the data body, link ID of 1 byte, space area (reserved) of 3 bytes, next picture No. of 2 bytes, No. of pictures of 2 bytes, space area (reserved) of 2 bytes, No. of picture index files of 1 byte, next picture index file No. of 1 byte, index file information of 4×256 bytes, and picture information units of 16 bytes are recorded by N (the number of pictures). It is to be noted that these respective information are recorded in binary data form.

The "No. of pictures" is information indicating total number of pictures (N) in the picture directory. Moreover, "index file information" are arranged (allocated) in accordance with display order, and, e.g., 256 entries are prepared irrespective of the number of actually existing index files.

Further, the picture information unit of 16 bytes is recorded in a manner caused to be in correspondence with index picture recorded in picture index file which will be described later. In the picture index file, index pictures for indicating all picture files included in the picture directory are recorded in order of display. For this reason, N number of index pictures which have the same number as the total number N of pictures in the picture directory are recorded in the picture index file.

Moreover, one picture information unit corresponds to one index picture recorded in the picture index file, and picture information unit corresponding to the m-th index picture recorded in this picture index file is recorded as the m-th unit. Namely, these picture information units are recorded in the same order as the recording order the index pictures of picture index files and by the same number as above.

In the "picture information unit", as shown in FIG. 25(*b*), directory No. of 2 bytes, picture No. of 2 bytes, picture kind information of 1 byte, picture individual information of 1 byte, No. of links of 1 byte, narration information of 1 byte, key word retrieval data No. of 2 bytes, time stamp retrieval data No. of 2 bytes, Telop No. of 2 bytes, and space area (reserved) of 2 bytes are recorded. It is to be noted that these information are respectively recorded in the binary data form.

In the directory No., directory No. for indicating picture directory including picture file corresponding to index picture is recorded. In the picture No., picture No. for indicating number of picture file corresponding to the index picture is recorded. Thus, when the m-th index picture of the picture index file is designated by user, reference is first made to the m-th picture information unit from the leading portion. Namely, which picture directory includes the designated picture index is retrieved by data of the directory No. recorded in the picture information unit to which reference has been made. Then, which picture file of that picture directory is retrieved by picture No.

In addition, data indicating picture kind such as "PSN" representing intermediate resolution picture file and "PHP" representing high resolution picture file, etc. are recorded in the picture kind information. In designating the high resolution picture file and the intermediate resolution picture file by the index picture, file name (leading three characters) is designated on the basis of the picture kind information.

5-6 [Print data management file]

Figures 26A, 26B:
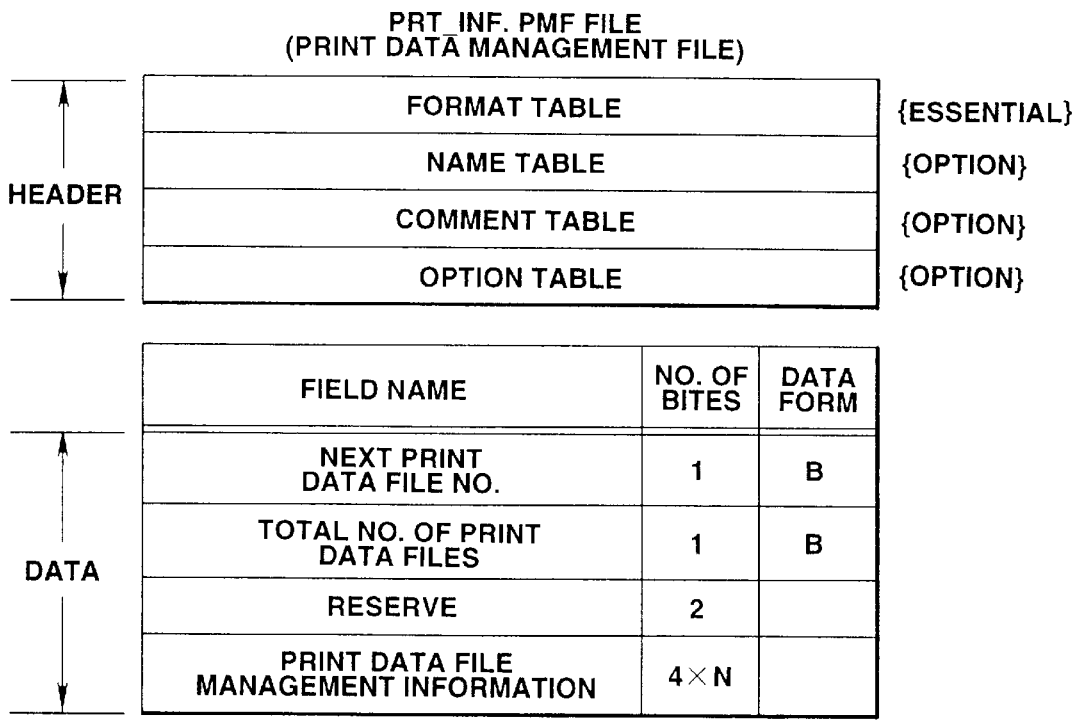
FIG. 26 is a view for explaining print data management file in the hierarchical directory structure.

The print data management file consists of header and data body as shown in FIG. 26(*a*). Format table (10h), name table (11h), comment table (12h), and option table (90h) are recorded in the header.

Next print data file No. of 1 byte, total No. of print data files of 1 byte, space area (reserved) of 2 bytes, and print data file management information unit of 4×N (number of pictures) bytes are recorded in the data body.

As the "next print data file No.", value obtained by adding 1 to No. of the last print data file is recorded. As the "total No. of print data files", total number of the print data files is recorded. As the "print data file management information unit", the number of print data files is recorded.

In the "print data file management information unit", as shown in FIG. 26(*b*), print data file No. of 1 byte, print execution ID of 1 byte, and space area (reserved) of 2 bytes are recorded.

The print data file No. is information indicating number of print data file. As shown in FIG. 19, numbers corresponding to three characters "000" subsequent to PRT of print data file PRT000. PM0 are recorded. In addition, as the "print execution ID", "01h" is recorded in the case where no print is carried out by print data file designated by corresponding print data file number, and "00h" is recorded in the case where print is carried out by print data file designated by corresponding print data file.

5-7 [Picture data file]

Figure 27:
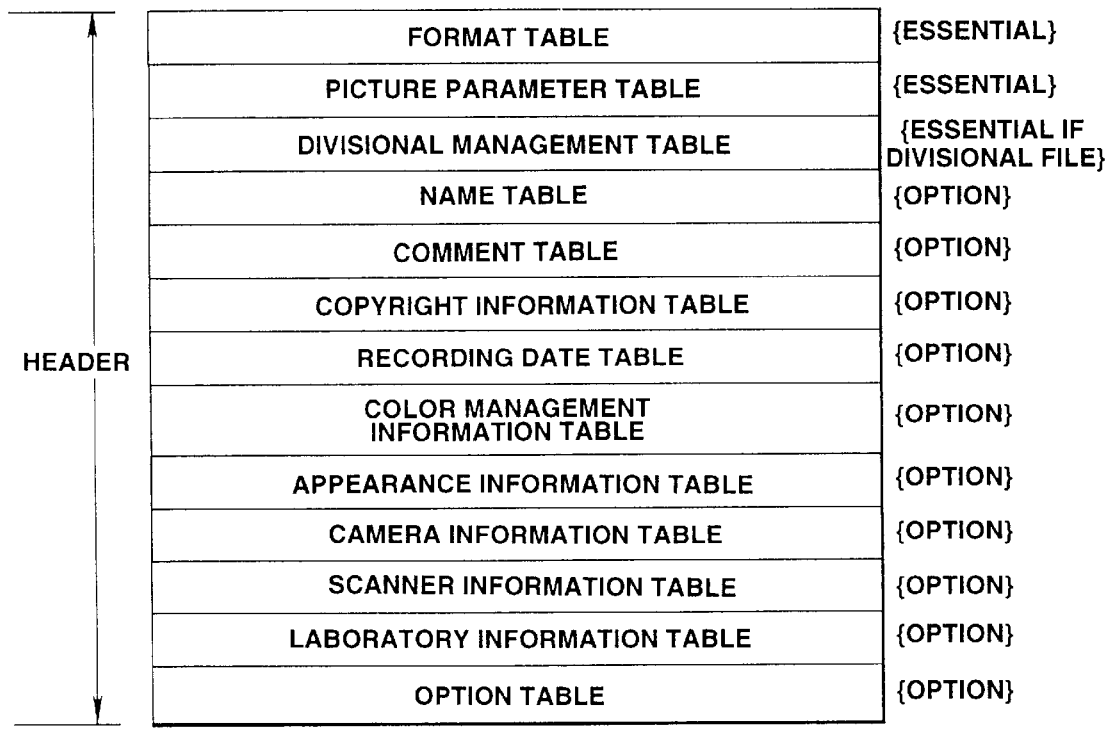
FIG. 27 is a view for explaining picture data file in the hierarchical directory structure.

The picture data file consists of header and data body as shown in FIG. 27. Format table, picture parameter table, divisional management table, name table, comment table, copyright information table, recording date table, color management information table, appearance information table, camera information table, scanner information table, laboratory information table, and option table are recorded in the header. It is to be noted that the "format table" and the "picture parameter table" are essential (inevitable) recording matter in the case of constituting the system, and other tables are optional matter.

Data recorded in these respective tables are picture processing information, etc. indicating condition in processing original picture data to form high resolution picture data or intermediate resolution picture data. Thus, there is no possibility that data recorded in these tables are rewritten at the time of ordinary recording/reproduction.

Additionally, the data body is adapted so that high resolution picture data or intermediate resolution picture data which has been caused to undergo fixed length encoding is recorded thereinto.

5-8 [Overall index file]

Respective one index pictures that user has selected of plural index pictures included in respective directories are recorded into the overall index file in the order displayed on the monitor. Accordingly, the same number of index pictures as that of respective picture directories are recorded in the overall index file.

The overall index file is set of index picture data (low resolution picture data), and no header is provided in the file itself. The number of index pictures is recorded as the "total number of directories" by the above-described overall information management file. In addition, respective indices are arranged (allocated) in the same order as the order of the management files.

In more practical sense, the overall index file consists of only data body of index picture data 0 to N each having 4096 bytes as shown in FIG. 28(*a*). The respective index picture data consist of header and data body as shown in FIG. 28(*b*). Format table is recorded in the header. It is to be noted that space area is provided succeedingly (subsequently) to the format table so that arbitrary information of user can be recorded. Index picture data (low resolution picture data) which has been caused to undergo fixed length encoding is recorded into the data body. It is to be noted that space area is provided in the data body succeedingly (subsequently) to the index picture data.

5-9 [Picture index file]

In the picture index file, index picture for indicating all picture files included in the picture directory is recorded in order of display order. Accordingly, N index pictures having the same number as the total number of pictures in the picture directory are recorded in the picture index file.

Figures 29A, 29B:
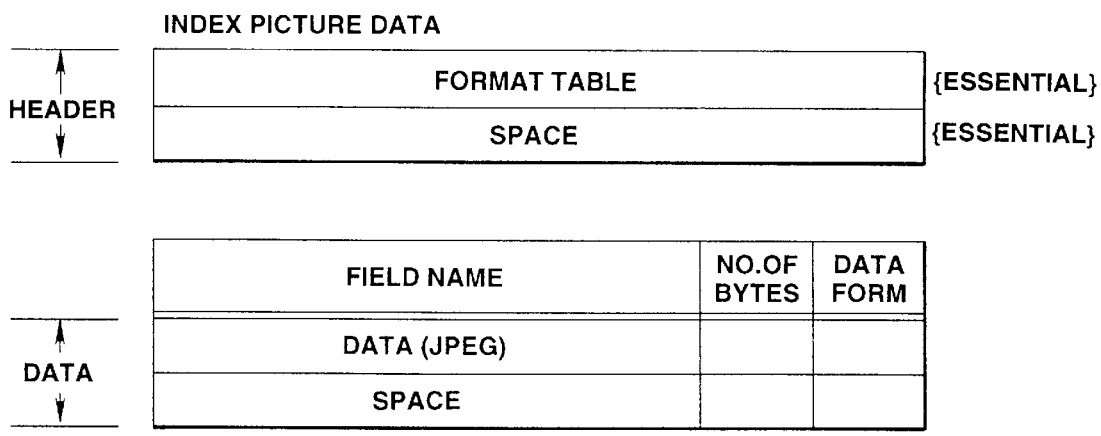
FIG. 29 is a view for explaining picture index file in the hierarchical directory structure.

Moreover, the picture index file is set of index picture data (low resolution picture data). This picture index file is of a structure as shown in FIG. 29(a) in which it includes no header of the file itself, and instead includes headers every respective index picture data. The number of index pictures is recorded as the total number of directories by the overall information management file. In addition, respective indices are arranged (allocated) in the same order as the order of the management files.

In more practical sense, as shown in FIG. 29(b), the respective index picture data consist of header including format table and space area, and data body including low resolution picture data which has been caused to undergo fixed length encoding and space area. The total capacity of the header and the low resolution picture data is, e.g., 4096 bytes. In addition, the header is fixed capacity of 256 bytes including space area as well.

5-10 [Print Data File]

Figure 30:
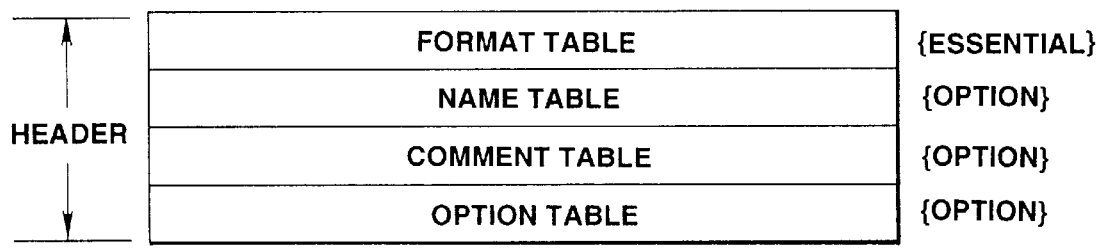
FIG. 30 is a view for explaining print data file in the hierarchical directory structure.

The print data file consists of header and data body as shown in FIG. 30. Format table, name table, comment table, and option table are recorded in the header. Moreover, total number of prints of 2 bytes, space area (reserved) of 2 bytes, and print information unit of 40 bytes are recorded by N (number of pictures) in the data body.

In the "total number of prints", information indicating total number of pictures subjected to print is recorded. In the "print information unit", data indicating picture data subjected to print and print control data for controlling the printer 2 in printing out the picture by the printer 2, etc. are recorded.

It is to be noted that these information are respectively recorded in binary data form.

In the "print information unit", as shown in FIG. 31, as data indicating picture data, respective data indicating picture directory number of 2 bytes, picture number of 2 bytes, and picture kind of 1 byte are recorded.

Moreover, in the "print information unit", as print control data, data indicating the number of prints of 1 byte, reserve of 1 byte, extraction ID of 1 byte, extraction start position of 2 bytes (picture lateral direction=X direction), extraction start position of 2 bytes (picture longitudinal direction=Y direction), extraction size of 2 bytes (longitudinal direction=X direction), and extraction size of 2 bytes (lateral direction=Y direction) are recorded. Further, respective data of rotation ID of 1 byte, mirror ID of 1 byte, print size ID of 1 byte, regular shape designation of 1 byte, non-regular (shape) size designation of 2 bytes (lateral direction=X direction), non-regular (shape) size designation of 2 bytes (longitudinal direction=Y direction), multi (multiple) ID of 1 byte, multi (multiple) mode of 1 byte, caption ID of 1 byte, caption kind of 1 byte, and color processing ID of 1 byte are recorded. In addition, respective data indicating red (R) gain of 1 byte, green (G) gain of 1 byte, blue (B) gain of 1 byte, contrast of 1 byte, brightness of 1 byte, sharpness of 1 byte, saturation of 1 byte, and hue of 1 byte (rotational angle of color coordinates) are recorded.

The print control data of the "number of prints" is data indicating the number of prints of the same picture. Moreover, the print control data of the "extraction ID" is data indicating whether or not desired portion extracted from high resolution picture data recorded on the disc is subjected to print. In the case where high resolution picture data recorded on the disc is subjected to print as it is, "00h" is recorded as the extraction ID. In the case where desired portion is extracted and is subjected to print, "01h" is recorded as the extraction ID.

The print control data indicating the "extraction start position" is data for designating respective extraction start positions in the lateral direction (X direction) and the longitudinal direction (Y direction) of picture in the case where desired portion is extracted from high resolution picture data recorded on the disc to print it, and these data are respectively recorded in pixel units.

The "mirror ID" is data for designating whether corresponding high resolution picture data is subjected to print in the normal state, or is subjected to print in inverted (reversed) state. In the case where print in the normal state is designated, "00h" is recorded as the mirror ID. In the case where print in the inverted state is designated, "01h" is recorded as the mirror ID. The "print size ID" is data for designating whether print is carried out at the regular shape size which will be described later, or print is carried out at the non-regular shape size arbitrarily designated. In the case where print of the regular shape size is designated, "00h" is recorded as the print size ID. In the case where print at the non-regular shape size is designated, "01h" is recorded.

The "regular shape designation" is data for s electing desired print size from existing print sizes. In the case where the so-called E type print size is selected, "00h" is recorded. In the case where the L type print size is selected, "01h" is recorded. In the case where the K type print size is selected, "02h" is recorded. In the cabinet (LL size) is selected, "03h" is recorded. In the case where one-sixth size is selected, "04h" is recorded. In the case where quarter (one-fourth) size is selected, "05h" is recorded. Moreover, in the case where A6 size is selected, "10h" is recorded. In the case where A5 size is selected, "11h" is recorded. In the case where A4 size is selected, "12h" is recorded. In the case where A3 size is selected, "13h" is recorded.

It is to be noted that in the case where print at the non-regular shape size is designated by the "print size ID", "FFh" is recorded as the print control data of the "regular shape designation".

The print control data of the "non-regular (shape) size designation" is data for allowing user to arbitrarily designate print size except for the above-described regular (shape) size, and these data can be set in mm units in the longitudinal direction (X direction) and the lateral direction (Y direction). In the case where user selects regular shape by the "print size ID" to select desired print size from the respective sizes, "FFFFh" is recorded as print control data of the "non-regular (shape) size designation".

The print control data of the "multi ID" is data indicating whether or not there is a print designation of the so-called multi-screen to divide a picture on screen into plural portions to respectively display the same pictures. In the case where print of the multi-screen is not carried out, "00h" is recorded on the basis of the judgment that "multi processing is not carried out". In the case where print of the multi-screen is carried out, "01h" is recorded on the basis of the judgment that "multi processing is carried out".

The print control data of the "multi mode" is data for designating the number of divisions of one picture on screen in the case where print of the multi screen is carried out. In the case where one picture on screen is divided into two portions (halved), "00h" is recorded. In the case where one picture is divided into four portions (quartered), "01h" is recorded. In the case where one picture on screen is divided into six portions, "02h" is recorded. In the case where one picture on screen is divided into eight portions, "03h" is recorded. In the case where one picture on screen is divided into sixteen portions, "04h" is recorded.

The print control data of the "caption ID" is data for designating whether or not, e.g., characters such as caption (title) or recording date, etc. attached to corresponding picture are also subjected to print together at the lower (or upper) portion of the picture subjected to print. The characters such as title and recording date, etc. are recorded by the ASCII code of 244 bytes as described above, and can be recorded by 244 (characters) (122 (characters) if Kanji is used). Further, in the case where print of picture is carried out along with the caption and recording date, etc., "01h" is recorded as the caption ID. In the case where print of picture is not carried out along with the caption and recording date, etc., "00h" is recorded.

The print control data of the "caption kind" is data for designating whether or not respective data constituting the header of picture data file which has been described with reference to FIG. 27 are subjected to print. This caption kind is such that in the case where designation is made so that name data included in "name table" is printed out along with picture data, "11h" is recorded thereinto as table ID of the name table; in the case where designation is made so that comment data included in the "comment table" is printed out along with picture data, "12h" is recorded thereinto as table ID of the comment table, and in the case where designation is made so that recording date data included in the "recording date table" is printed out along with picture data, "14h" is recorded thereinto as table ID of the recording date table.

The print control data of the "color processing ID" is data indicating whether or not user implements color processing to emphasize red, etc. to a portion that user desires with respect to corresponding picture. In the case where no color processing is implemented, "00h" is recorded. In the case where the color processing is implemented, "01h" is recorded.

The print control data of the "respective gains of R, G, B" are data indicating gains of respective color data. The respective color data are adapted so that gains of magnification of 0 to 5 can be respectively adjusted at 1/256 (8 bits) intervals. As the print control data of the respective gains, data indicating gains thus adjusted are recorded.

The print control data of the "contrast" is data indicating contrast of picture subjected to print, and can be adjusted at 1/256 intervals similarly to the above-mentioned gain. Further, value indicating contrast thus adjusted is recorded as the print control data.

The print control data of the "brightness" and "hue" are data indicating brightness of picture subjected to print, and are recorded by percentage in the + direction and in the − direction with 128 indicated by 8 bits being as ±0.

The print control data of the 8 sharpness" is data indicating edge emphasis rate (degree) of picture adjusted between magnification of 0 to 5, and value adjusted at 1/256 (8 bits) interval is recorded.

In addition, the print control data of the "saturation" is such that value adjusted at 1/256 (8 bits) intervals between magnification of 0 to 5 is recorded.

6 Recording Operation

The recording operation of the still picture system will now be described with reference to the flowcharts of FIGS. 32 and 33 in a manner based on the premise of the hierarchical directory structure and the respective file configurations.

Figure 32:
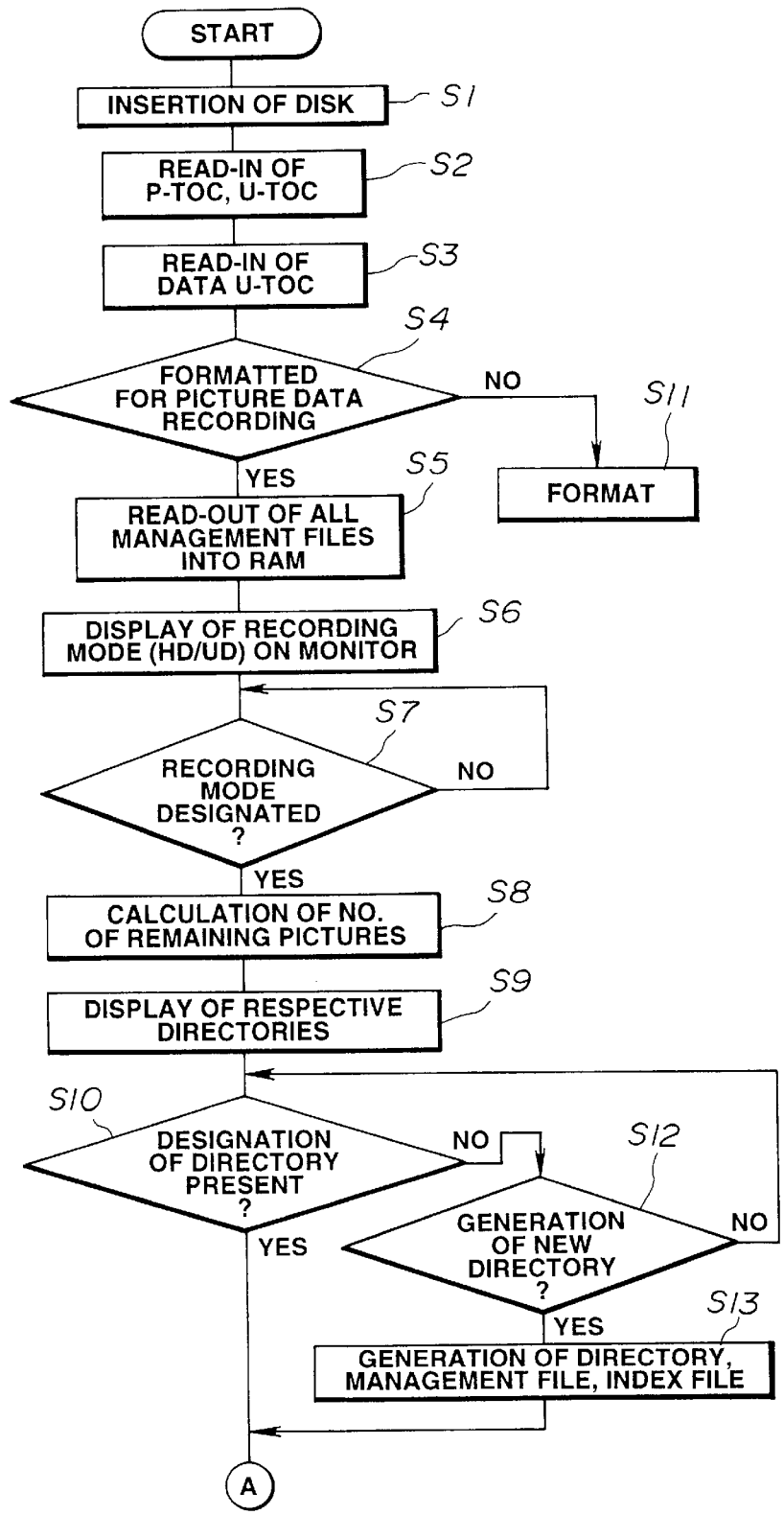
FIG. 32 is a flowchart for explaining recording operation of the first half in the still picture system.

Initially, in the flowchart shown in FIG. 32, when user allows power supply key 31 shown in FIG. 8 to be turned ON, storage unit 5 is brought into stand-by state. Thus, the processing operation by this flowchart starts to proceed to step S1.

At the step S1, user inserts an optical disc 20 into a disc insertion hole 30 shown in FIG. 8. The processing operation then proceeds to step S2. Thus, the optical disc 20 inserted through the disc insertion hole 30 is loaded into the storage unit 5, resulting in the state where picture data can be recorded.

At the step S2, system controller 6 controls the disc recording/reproducing section 5*c* so as to read P-TOC and U-TOC on the optical disc 20 shown in FIG. 9(*a*) through the storage unit controller 5*d* shown in FIG. 6. Then, the section 5*c* transfers respective data of the P-TOC and the U-TOC thus read out to system controller 6 shown in FIG. 1. The system controller 6 detects respective data of the P-TOC and the U-TOC thus transferred to thereby confirm whether or not data U-TOC exists, and confirms recording position of the U-TOC.

In more practical sense, it is impossible to carry out, by the U-TOC, management of the area where data file is formed. For this reason, the system controller 6 judges, in the case where the data file exists, that U-TOC exists at the leading portion of the data file. Thus, the processing operation proceeds to step S3.

At the step S3, the system controller 6 controls the disc recording/reproducing section 5*c* so as to read the data U_TOC on the optical disc 20 shown in FIG. 9(*a*) through the storage unit controller 5*d*. Then, the section 5*c* transfers data of the data U-TOC to RAM 6*a* of the system controller 6. The system controller 6 temporarily stores the data of the transferred data U-TOC into the RAM 6*a* to read out it therefrom to thereby grasp positions of respective directories and respective files. Thus, the processing operation proceeds to step S4. It is to be noted that retrieval of memory position of file will be described in detail at the chapter of [Description of operation at the time of retrieval] which will be described later.

At the step S4, the system controller 6 discriminates, on the basis of the data of the data U-TOC stored in the RAM 6*a*, whether or not directory (PIC_MD) and overall information management file exist to thereby discriminate whether or not the optical disc 20 is formatted for recording of picture data. In the case of Yes, the processing operation proceeds to step S5. In the case of No, the processing operation proceeds to step S11.

At the step S11, since the optical disc 20 is not formatted for picture data, the system controller 6 formats the optical disc 20 for recording of picture data. Then, the entire routine shown in FIGS. 32 and 33 is once completed. The system is brought into standby state until recording is designated for a second time.

On the other hand, at the step S5, the system controller 6 controls the disc recording/reproducing section 5*c* so as to read out all management files through the storage section controller 5*d*, and temporarily stores, into the RAM 6*a*, all the management files which have been read out. Thus, the processing operation proceeds to step S6.

At the step S6, the system controller 6 carries out display control of monitor unit 9 so as to display picture to select the recording mode of picture to be recorded from now. In more practical sense, select picture of the HD recording mode for recording picture of high resolution of 1024 pixels×1536 pixels and select picture of the UD recording mode for recording picture of super high resolution of 2048 pixels× 3072 pixels are displayed on the monitor unit 9.

It is to be noted that while the picture of intermediate resolution is recorded at fixed data length of 2 clusters as described above, there may be employed an approach in which recording mode for recording the picture of intermediate resolution by fixed data length of 1 cluster is provided so that any one of the fixed length encoding at the data length of 2 clusters and fixed length encoding at the data length of 1 cluster can be selected by the user's intention. Thus, when the recording mode of fixed data length of 2 clusters is selected, intermediate resolution picture data of higher resolution can be recorded. On the other hand, when the recording mode of the fixed data length of 1 cluster is selected, recording in which the number of pictures is increased can be made although resolution is somewhat poor.

At the step S7, the system controller 6 detects operation state of the operation unit 10 to thereby discriminates whether any one of the HD recording mode and the UD recording mode is selected. In the case of No., the step S7 is repeated until the above-mentioned selection is made. In the case of Yes, the processing operation proceeds to step S8.

At the step S8, the system controller 6 calculates, on the basis of the total number of recorded pictures (total number of pictures of intermediate resolution picture data) in the overall management file stored in the RAM 6a, and the number of pictures and picture kind information of picture information in the picture data management file, the number of recordable pictures in the HD recording mode or the UD recording mode designated by user.

In more practical sense, recording of about 200 pictures can be carried out by combination of only intermediate resolution picture data of 2 clusters and high resolution picture data of 8 clusters, and recording of about 100 pictures can be carried out by combination of only intermediate resolution picture data of 2 clusters and super high resolution picture data of 18 clusters. For this reason, when the recorded capacity is subtracted from recordable capacity of the entirety of the optical disc 20, the number of recordable pictures in the case where the HD recording mode is selected and the number of recordable pictures in the case where the UD recording mode is recorded are respectively calculated.

Subsequently, at step S9, the system controller 6 reads out picture directory information unit in the overall management file from the RAM 6a to allow the monitor unit 9 to undergo display control so as to display data of directory name, directory No. and the number of pictures within the directory, etc. Thus, the processing operation proceeds to step S10.

At the step S10, the system controller 6 detects operation state of the operation unit 10 to thereby discriminate whether or not designation of picture directory for recording corresponding data is made from user. In the case of No., the processing operation proceeds to step S12. In the case of Yes, the processing operation proceeds to step S14 shown in FIG. 33.

At the step S12, since designation of picture directory is not made from user, the system controller 6 detects operation state of the operation unit 10 to thereby discriminate whether or not formation of new picture directory except for the existing picture directories is designated. In the case of No, the step S10 and the step S12 are repeated until formation of the new directory is designated. In the case of Yes, the processing operation proceeds to step S13.

At the step S13, since formation of the new directory is designated, the system controller 6 judges the number of the existing picture directories by the overall information management file to attach directory No. of the new picture directory, and to form picture data management file and picture index file in the directory. Thus, the processing operation proceeds to the step S14 sown in FIG. 33.

Figure 33:
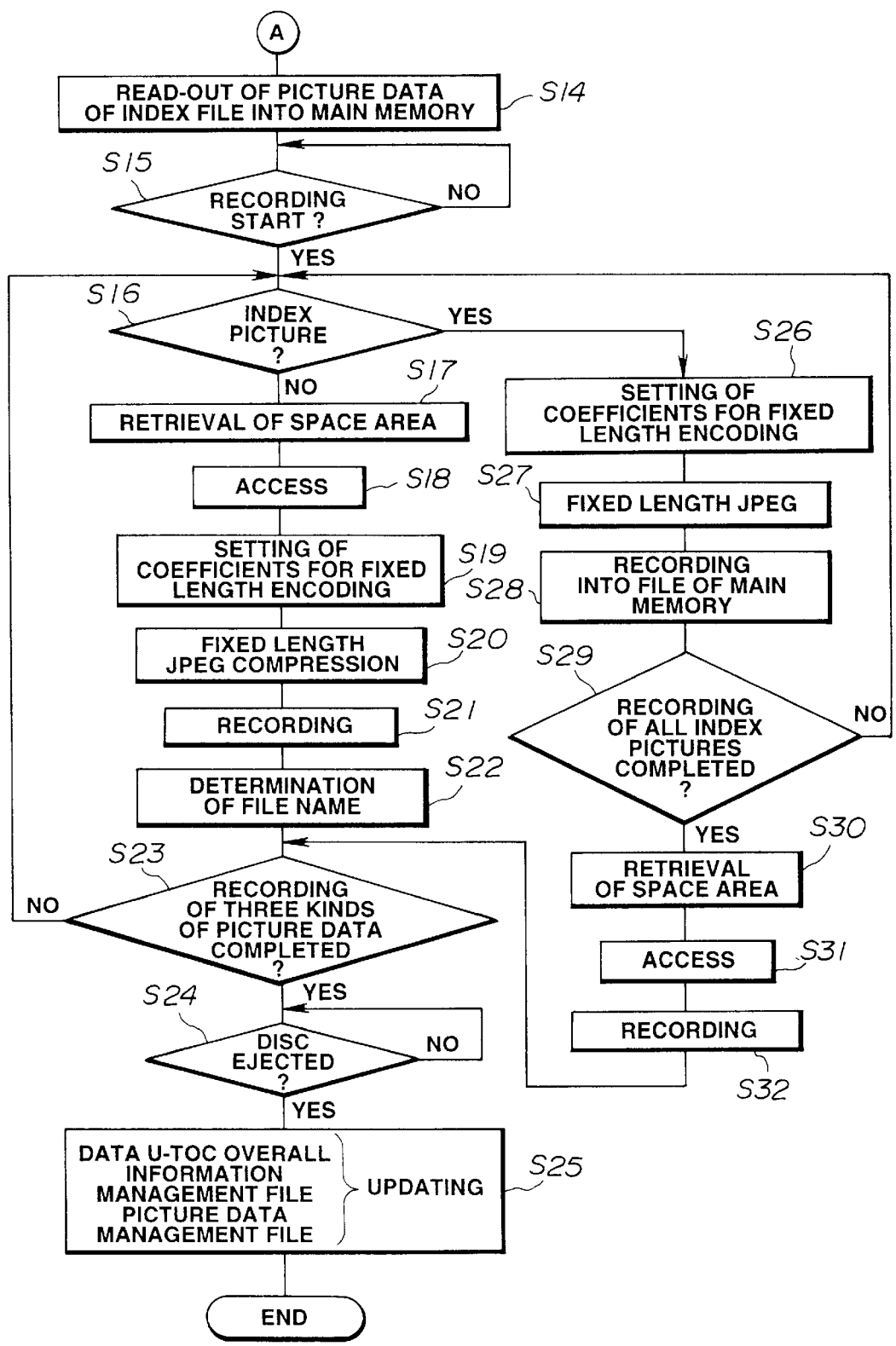
FIG. 33 is a flowchart for explaining recording operation of the latter half in the still picture system.

At the step S14 shown in FIG. 33, the system controller 6 controls the disc recording/reproducing section 5c through the storage unit controller 5d so as to read out all the picture data recorded in the index file of the designated picture directory, and to conduct a control to transfer the picture data of the index file to the main memory 11a shown in FIG. 4. Thus, the processing operation proceeds to step S15. It is to be noted that the picture data recorded after undergone fixed length encoding along with the header is read out as it is without allowing it to undergo expansion decoding processing to transfer it to the main memory 11a. In addition, when no picture data is recorded in the index file, there is no possibility that picture data is read out into the main memory.

At the step S15, the system controller 6 detects operation state of the operation unit 10 to thereby discriminate whether or not designation of recording start is made from user. In the case of No, the step S15 is repeated until designation of the recording start is made. In the case of Yes, the processing operation proceeds to step S16.

At the step S16, the system controller 6 discriminates whether or not picture to be recorded from now on is index picture. In the case of No, the processing operation proceeds to step S17. In the case of Yes, the processing operation proceeds to step S26.

At the step S26, the system controller 6 delivers data indicating that picture to be recorded from now on is index picture to the thinning and contraction/expansion controller 4i shown in FIG. 5. The thinning and contraction/expansion circuit 4i is operative so that when the data is delivered thereto, it sets fixed length encoding coefficients for index picture at the contraction/expansion circuit 4h. Thus, the processing operation proceeds to step S27.

At the step S27, the system controller 6 controls the compression/expansion circuit 4h so as to implement compression encoding processing to the picture data which has been caused to undergo thinning processing into 1/4 on the basis of the set fixed length encoding coefficients through the thinning and compression/expansion controller 4i to thereby form index picture which has been caused to undergo fixed length encoding so that the fixed data length has 1/15 clusters. The processing operation proceeds to step S28.

At the step S28, the system controller 6 controls the memory controller 13 so as to record index picture of 4096 bytes in total in which header is added to index file stored in the main memory 11a shown in FIG. 4. Thus, the processing operation proceeds to step S29.

At the step S29, the system controller 6 discriminates whether or not all index pictures are recorded into the main memory 11a. In the case of No, the processing operation returns to the step S16. In the case of Yes, the processing operation proceeds to step S30.

At the step S30, the system controller 6 retrieves the portion where entry of 2 bits (code indicating available allocation block) of the allocation block No. of volume space bitmap VSB in the data U-TOC stored in the RAM 6a is "00" to thereby detect space area. Thus, the processing operation proceeds to step S31.

At the step S31, the system controller 6 controls the disc recording/reproducing section 5c so as provide access to the space area detected on the optical disc 20 through the storage unit controller 5d. Thus, the processing operation proceeds to step S32.

At the step S32, the system controller 6 controls the disc recording/reproducing section 5c so as to record index file having the index picture into the space area on the optical disc 20 through the storage unit controller 5d. Thus, the processing operation proceeds to the step S23.

Namely, in the still picture system, in the case where the index picture is caused to undergo fixed length encoding to record it onto the optical disc 20, an approach is employed to temporarily record, before a predetermined number of index picture which have been caused to undergo fixed length encoding are recorded onto the optical disc 20, such picture in order into the main memory 11a to thereby form single index file from the predetermined number of index pictures in the main memory 11a thereafter to record it into physically continuous areas on the optical disc 20.

On the other hand, one index picture is caused to undergo fixed length encoding so that data length is 1/15 clusters as described above. For this reason, in order to record the picture data of data length of 1/15 clusters onto the optical disc 20, it is necessary to add dummy data corresponding to 14/15 clusters with respect to the picture data of 1/15 clusters so that data length of one cluster is provided. Accordingly, if picture data are recorded onto the disc every time the picture data of 1/15 clusters are formed, the recording area for the dummy data is greater than the recording area for picture data for index, thus failing to effectively utilize the recording area on the disc.

For this reason, in this still picture system, such an approach is employed to temporarily record a predetermined number of picture data for index into the main memory 11a as index file to record the index file which has been recorded in the main memory 11a onto the disc after taking-in operations of all index picture data are completed.

Namely, in the case where, e.g., index file having 25 index pictures is recorded, 15 index pictures (15 . 1/15 clusters) are recorded in the area of 1 cluster and the remaining 10 index pictures (10×1/15 clusters) and dummy data of 5/15 clusters are recorded in the area of the next 1 cluster. Thus, data quantity of dummy data recorded onto the disc can be lessened. As a result, the recording area on the disc can be effectively used. Moreover, in the still picture system, since such an approach is employed to temporarily record plural index pictures which have been caused to undergo fixed length encoding into the main memory 11a to thereby form one index file by a predetermined number of index pictures in the main memory 11a to record this index file into the physically continuous areas on the disc, index files recorded onto the disc can be necessarily continuous files. For this reason, in the case of reading out the index files from the optical disc 20, those files can be read out at a high speed because they are continuously recorded on the disc.

It is to be noted that in the case where new index picture is supplemented to the index file, as described above, prior to recording, data of the index file is read out into the main memory 11a. In recording, new index picture is recorded in the area immediately after the index picture recorded last after dummy data added after the index picture recorded last is deleted (erased) (There is no necessity of deletion in the case where there is no dummy data).

On the other hand, when discrimination result is No at the step S16, the processing operation proceeds to step S17. At the step S17, the system controller 6 detects space area on the optical disc 20 for recording picture of intermediate resolution or picture of high resolution. Thus, the processing operation proceeds to step S18.

In more practical sense, the system controller 6 retrieves the portion where entry of 2 bits (code indicating available allocation block) of the allocation block No. of the volume space bitmap VSB in the data U-TOC stored in the RAM 6a is "00" to thereby to carry out detection of the space area.

At the step S18, the system controller 6 detects optimum space area of space areas retrieved at the step S17 to control the disc recording/reproducing section 5c through the storage unit controller 5d so that access thereto is provided.

In this case, it is the most desirable that the optimum recording position (area) is an area after the recorded file (file recorded last) recorded in order under the same directory and an area where areas of pictures (corresponding to several clusters) to be recorded are physically continuous.

However, in the case where large capacity data such as high resolution picture data (8 clusters) or super high resolution picture data (18 clusters) are recorded, and in the case where unrecorded area of the optical disc 20 is small, there are instances where it is impossible to ensure areas physically continuous in the area after the file recorded last of the same directory. In such a case, extent record block ERB is formed within the management block to link, by this ERB, distributed plural areas which are not continuous to record one file.

At step S19, the system controller 6 sets fixed length encoding coefficients corresponding to the high resolution picture data or the super high resolution picture data at the thinning and compression/expansion controller 4i. Thus, the processing operation proceeds to step S20.

At the step S20, the thinning and compression/expansion controller 4i controls the compression/expansion circuit 4h so as to form high resolution picture data of 8 clusters or super high resolution picture data of 18 clusters on the basis of the set fixed length encoding coefficients. Thus, the processing operation proceeds to step S21.

At the step S21, the system controller 6 controls the disc recording/reproducing section 5c so as to record the picture data which has been caused to undergo fixed length encoding into the detected optimum area on the optical disc 20 through the storage unit controller 5d. Thus, the processing operation proceeds to step S22.

At the step S22, the system controller 6 carries out recording control of the picture data, and determines, in succession, data of picture data management file of the designated directory and file names corresponding to resolutions of respective picture data. Thus, the processing operation proceeds to step S23.

In more practical sense, e.g., recording in the HD recording mode of first to sixth pictures which have been read from the negative film into the picture directory "PIC00001" is as follows.

Namely, since the number of pictures recorded in the HD recording mode can be judged to be zero from data of the picture data management file in the RAM 6a before recording, high resolution (HD) of the first picture is caused to be PHP00000. PMP, and the intermediate resolution (SD) thereof is caused to be PSN00000. PMP. Accordingly, when the six pictures have been all recorded, films of PHP00000. PMP to PHP00005. PMP as high resolution and PSN00000. PMP to PSN0005. PMP as intermediate resolution are formed.

It is to be noted that in the case where index pictures of these six pictures are recorded, these six index pictures are recorded in order into the PIDX000. PMX which has been read into the main memory 11a. For this reason, new index file is not formed. It is to be noted that in the case where the number of index pictures recorded in one index file is above the number of index pictures set in advance (e.g., 25 in this description), second index file such as PIDX001. PMX, etc. is newly formed.

At step S23, the system controller 6 discriminates whether or not picture data of three kinds of resolutions of low resolution picture data (index picture), intermediate resolution picture data and high resolution picture data (or super high resolution picture data) have been all recorded. In the case of No, the processing operation returns to the step S16 to record picture data of resolutions which have not yet recorded. In the case of Yes, the processing operation proceeds to step S24.

At the step S24, the system controller 6 detects whether or not eject key 32 of the operation unit 10 is turned ON. In the case of No, the step S24 is repeated. In the case of Yes, the processing operation proceeds to step S25.

At the step S25, the system controller 6 updates data of the data U-TOC, the overall information management file and the picture data management file recorded on the disc by respective data of data U-TOC, overall information management file and picture data management file recorded in the RAM 6a to complete the entire routine according to the recording operation shown in FIGS. 32 and 33.

In more practical sense, in the data U-TOC, respective data such as Volume Descriptor (VD), Volume Space Bitmap (VSB), Management Table (MT), Directory Record Block (DRB) and Extents Record Block (ERB), etc. are mainly rewritten.

Namely, in the VD, data relating to allocation block (recordable allocation block, etc.), No. of directories (in the case where formation of new directory is designated), No. of files, data relating to directory record block DRB (in the case where directory or file is newly formed), and data relating to extent record block ERB (in the case where newly formed file is recorded at physically discontinuous position and is linked by extent record block ERB), etc. are rewritten. Moreover, in the volume space bitmap VSB, codes of 2 bits indicating attribute of respective allocation blocks, etc. are rewritten.

Further, in the management table MT, when directory record block DRB and extent record block ERB are newly formed, management table MT is entried. It is to be noted that in the case where one directory record unit in the existing directory record block DRB is supplemented, management table MT is not updated.

Further, in the directory record block DRB, in the case where directory is newly formed, directory record unit for directory is supplemented by one. Similarly, in the case where file is formed, directory record unit for file is supplemented by one per each file.

In addition, in the extent record block ERB, in the case where files are designated by the directory record block DRB and those files are not physically continuous, that ERB is formed. It is to be noted that the ERB is not formed at the time of format.

In the overall management information file, data such as total number of pictures, next picture directory number, total number of picture directories, and picture directory information unit, etc. are mainly rewritten. With respect to the picture directory information unit, when picture directory is newly formed, one unit is formed.

Moreover, with respect to the picture data management file, when picture directory is newly formed, picture data management file is newly formed in the newly formed picture directory. Further, data such as No. of pictures, No. of picture index files, next picture index file number, index file information, and picture information unit, etc. are mainly updated. With respect to the index file information, when index file is newly formed, that information is updated. Moreover, with respect to the number of indices, when No. of indices in the index file is supplemented, that No. of indices is updated. Further, since picture information units are provided in correspondence with respective index pictures, the number of picture information units is increased by the increased number of pictures. In the ordinary recording, data in the picture information unit is not updated. However, when switching of order of index pictures is carried out, switching of picture No. is carried out so that the data subjected to switching is updated.

7. Description of Another Recording Operation

Another recording operation for picture data of respective resolutions will now be described with reference to the flowchart of FIG. 34. When the routine of the step S1 to the step S13 of the flowchart which has been described with reference to FIG. 32 is completed, the processing operation by the flowchart of FIG. 34 starts to proceed to step S41.

At the step S41, the system controller 6 reads out all picture data which have been recorded in the index file of the designated directory. Thus, the processing operation proceeds to step S42.

At step S42, the system controller 6 detects operation state of the operation unit 10 to thereby detect whether or not recording start from user is designated. In the case of No, this step S42 is repeated until recording start is designated. In the case of Yes, the processing operation proceeds to step S43.

Figure 34:
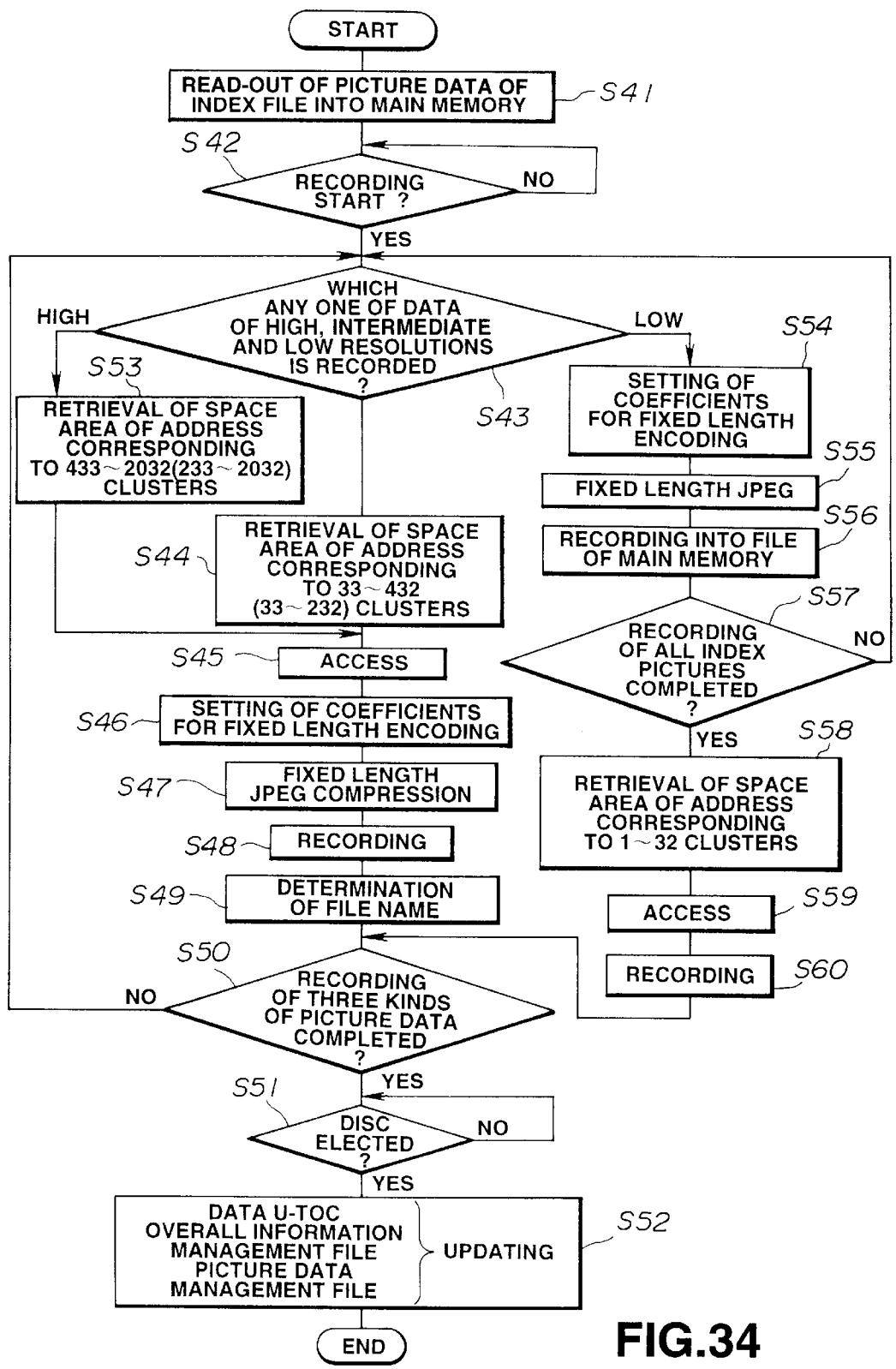
FIG. 34 is a flowchart for explaining recording operation of picture data every respective resolutions in the still picture system.

It is to be noted that steps S41 and S42 shown in FIG. 34 are steps respectively corresponding to steps S14 and S15 which have been described with reference to FIG. 33.

At the step S43, the system controller 6 discriminates whether picture data to be recorded is high resolution picture data (HD or UD), intermediate resolution picture data (SD) or low resolution picture data (index picture data). When current recording operation is discriminated as recording of low resolution picture data, the processing operation proceeds to step S54. When the current recording operation is discriminated as recording of intermediate resolution picture data, the processing operation proceeds to step S44. When the current recording operation is discriminated as recording of high resolution picture data, the processing operation proceeds to step S53.

Steps 54 to 60 to which the processing operation proceeds after the current recording operation is discriminated as recording of low resolution picture data at the step S43 respectively correspond to the steps S26 to S32 shown in FIG. 33.

Namely, at the step S54, the system controller 6 delivers data indicating that picture to be recorded from now on is index picture to the thinning and compression/expansion controller 4$i$ shown in FIG. 5. The thinning and compression/expansion controller 4$i$ is operative so that when the data is delivered thereto, it sets fixed length encoding coefficients for index picture at the compression/expansion circuit 4$h$. Thus, the processing operation proceeds to step S55.

At the step S55, the system controller 6 controls the compression/expansion circuit 4$h$ on the basis of the set fixed length encoding coefficients so as to implement compression encoding processing to the picture data which has been caused to undergo thinning processing into 1/4 through the thinning and compression/expansion controller 4*i* to thereby form index picture which has been subjected to fixed length encoding so as to have fixed data length of 1/15 clusters. Thus, the processing operation proceeds to step S56.

At the step S56, the system controller 6 controls memory controller 13 so as to record index picture of 4096 bytes in total in which header is added to the file stored in the main memory 11*a* shown in FIG. 4. Thus, the processing operation proceeds to step S57.

At the step S57, the system controller 6 discriminates whether or not all of index pictures have been recorded into the main memory 11*a*. In the case of No, the processing operation returns to the step S43. In the case of Yes, the processing operation proceeds to step S58.

At the step S58, the system controller 6 retrieves the portion where entry of 2 bits (code indicating available allocation block) of allocation block No. of volume space bitmap VSB in data U-TOC stored in the RAM 6*a* is "00" to thereby detect space area. Thus, the processing operation proceeds to step S59.

At the step S59, the system controller 6 controls the disc recording/reproducing section 5*c* so as to provide access to the detected space area on the optical disc 20 through the storage unit controller 5*d*. Thus, the processing operation proceeds to step S60.

At the step S60, the system controller 6 controls the disc recording/reproducing section 5*c* so as to record the index picture into the space area on the optical disc 20 through the storage unit controller 5*d*. Thus, the processing operation proceeds to step S50.

At the step S58, space area for low resolution picture data is detected. At the step S44, space area for intermediate resolution picture data is detected. At the step S53, space area for high resolution picture data (or for ultra high resolution picture data) is detected. This space area detection is carried out by retrieving the portion where entry of 2 bits (code indicating available allocation block) of allocation block No. of volume space bitmap VSB in the data U-TOC stored in the RAM 6*a* as described above is "00". In this instance, designations of addresses to be retrieved are carried out in correspondence with recording of picture data of respective resolutions.

Namely, the case of recording of low resolution picture data (step S58) will be described below. In the ordinary use, as far as 200 index pictures at the maximum can be recorded in the HD recording mode. In both the case where HD recording mode is selected and the case the UD recording mode is selected, since the index picture has fixed data length of 1/15 clusters, the area necessary as the area for index picture consists of 200×1/15 clusters=13.33 clusters. However, when the number of picture directories is increased, there may also exist picture directories where only one or two index pictures are recorded within one picture director. Since the maximum number of picture directories is set to 20, capacity necessary for recording as index picture is required to the maximum degree in such a case. As a result, at least 32 clusters are required. For this reason, the system controller 6 carries out, in detecting space area at the time of recording index picture, retrieval of code of allocation blocks designated by addresses corresponding to 1 to 32 clusters from the disc inner circumference to detect space area. It is to be noted that detection of other space areas is not carried out in this case.

The case of recording of the intermediate resolution picture data (step S44) will be described below. In the ED recording mode, 200 pictures can be recorded at the maximum. Since the picture of intermediate resolution (SD) is recorded by fixed data length of 2 clusters, 2 clusters×200= 400 clusters are required as the picture area of the intermediate resolution. For this reason, the system controller 6 carries out, in detecting space area at the time of recording picture of intermediate resolution, retrieval of code of allocation blocks of areas of 400 clusters succeeding to the area (1 to 32 clusters) of index picture from the disc inner circumference, i.e., areas designated by addresses corresponding to 33 to 432 clusters to detect space area. Thus, the processing operation proceeds to step S45.

Similarly, in the UD recording mode, as far as 100 pictures at the maximum can be recorded. Since picture of intermediate resolution (SD) is recorded by fixed data length of 2 clusters, 2 clusters×100=200 clusters are required as the picture area of the intermediate resolution. For this reason, the system controller 6 carries out, in detecting space area at the time of recording picture of the intermediate resolution, retrieval of code of allocation block of area of 200 clusters succeeding to the area (1 to 32 clusters) of the index picture from the disc inner circumference, i.e., area designated by addresses corresponding to 33 to 232 clusters to detect space area. Thus, the processing operation proceeds to step S45.

The case of recording of high resolution picture data and ultra high resolution picture data (step S53) will now be described. Initially, in the HD recording mode, 200 pictures at the maximum can be recorded, and high resolution picture data is caused to have fixed data length of 8 clusters. For this reason, 8 clusters×200 (pictures)=1600 clusters are required in the picture area for the high resolution picture data. From facts as above, the system controller 6 carries out, at the step S53, retrieval of code of allocation block of area of 1600 clusters succeeding to the area of index picture (1 to 32 clusters) and the area of picture of intermediate resolution (33 to 432 clusters) from the disc inner circumference, i.e., area designated by address corresponding to 433 to 2032 clusters to detect space area. Thus, the processing operation proceeds to step S45.

Similarly, in the UD recording mode, 100 pictures at the maximum can be recorded, and the ultra high resolution picture data is caused to have fixed data length of 18 clusters. Accordingly, space area of 18 clusters×100=1800 clusters is required as the picture area for the ultra high resolution. For this reason, the system controller 6 carries out, in detection of space area at the time of recording picture of the ultra high resolution, retrieval of code of allocation block of area of 1800 clusters succeeding to the index picture area (1 to 32 clusters) and the intermediate resolution picture area (33 to 232 clusters) from the disc inner circumference, i.e., area designated by addresses corresponding to 233 to 2032 clusters to detect space area. Thus, the processing operation proceeds to step S45.

When such retrieval of space area is completed, the system controller 6 controls, at the step S45, the disc recording/reproducing section 5*c* through the storage unit controller 5*d* so as to provide access to an optimum area of the retrieved space areas. Thus, the processing operation proceeds to step S46. As an optimum recording position in this case, there may be employed a method of respectively carrying out space area retrievals irrespective of the directory to record, in order, respective data at the positions where space area first exists. Accordingly, recorded data are recorded in order from the leading portions of respective areas.

At the step S46, the system controller 6 sets fixed length encoding coefficient corresponding to high resolution picture data or ultra high resolution picture data at the thinning and compression/expansion controller 4i. Thus, the processing operation proceeds to step S47.

At the step S47, the system controller 6 controls the compression/expansion circuit 4h so as to form high resolution picture data of 8 clusters or ultra high resolution picture data of 18 clusters on the basis of the set fixed length encoding coefficients through the thinning and compression/expansion controller 4i. Thus, the processing operation proceeds to step S48.

At the step S48, the system controller 6 controls the disc recording/reproducing section 5c so as to record the picture data which has been caused to undergo fixed length encoding into the detected optimum area on the optical disc 20 through the storage unit controller 5d. Thus, the processing operation proceeds to step S49.

At the step S49, the system controller 6 carries out recording control of the picture data, and successively determines file names corresponding to data of picture data management file of the designated directory and resolutions of respective picture data. Thus, the processing operation proceeds to step S50.

At the step S50, the system controller 6 discriminates whether or not picture data of three kinds of resolutions of low resolution picture data (index picture), intermediate resolution picture data and high resolution picture data (or ultra high resolution picture data) have been all recorded. In the case of No, the processing operation returns to step S43 to record picture data of resolution which has not been yet recorded. In the case of Yes, the processing operation proceeds to step S51.

At the step S51, the system controller 6 detects whether or not the eject key 32 of the operation unit 10 is turned ON. In the case of No, this step S51 is repeated. In the case of Yes, the processing operation proceeds to step S52.

At the step S52, the system controller 6 updates related data of the data U-TOC, the overall management information file and the picture data management file recorded on the disc into respective data of the data U-TOC, the overall management information file and the picture data management file recorded in the RAM 6a. Thus, the entire routine according to another recording operation shown in FIG. 34 is completed.

It is to be noted that these steps S45 to S52 respectively correspond to the above-described steps S18 to S25 shown in FIG. 33.

In such another recording operation, retrieval areas of low resolution, intermediate resolution and high resolution (or ultra high resolution) are respectively designated by addressing of allocation block in the VSB stored in the RAM 6a. Namely, by only reading out data the VSB of the RAM 6a, the recording area on the disc is divided by addressing. For this reason, detection of space area can be made at a high speed.

For example, it is conceivable to physically determine recording positions of respective areas on the disc to carry out recording. However, since area quantities used in the HD recording mode and the UD recording mode (area of intermediate resolution and area of high resolution) are different from each other in this case, it is necessary to ensure the area in advance on the assumption that the area quantity is required to the maximum degree. Namely, it is necessary to ensure respective areas of 400 clusters at the time of HD recording mode in the intermediate resolution area and 1800 clusters at the time of UD mode in the high resolution area. For this reason, it is impossible to effectively utilize the recording area.

In addition, while it has been described that addresses for retrieval of space area are designated as addresses for index, intermediate resolution and high resolution from the disc inner circumferential side, addresses for retrieval of space area may be designated as addresses for index, intermediate resolution and high resolution from the disc outer circumferential side in a manner opposite to the above. Such addressing method may be suitably changed in accordance with design.

As stated above, an approach is employed to form intermediate resolution picture data and low resolution picture data on the basis of high resolution picture data which has been read out from the frame memory 11 to record picture data of different resolutions of the same picture onto the optical disc 20, thereby making it possible to select and reproduce, at the time of reproduction, picture data of resolution corresponding to output equipment of picture data or use purpose thereof.

Namely, when only the high resolution picture data is recorded as picture data recorded onto the optical disc 20, in the case where picture is displayed on the monitor unit, the number of pixels is too great with the high resolution picture data. For this reason, suitable thinning processing is implemented thereto to deliver such data to the monitor unit. However, the three kinds of picture data are recorded, thereby making it possible to directly intermediate resolution picture data for monitor. For this reason, the time until picture image corresponding to picture data is displayed can be reduced.

Moreover, since picture data of the required resolution can be directly read out, there is no necessity of carrying out thinning processing, etc. in dependency upon equipment. Thus, the circuit for thinning processing can be omitted.

Further, since the two kinds of picture data are formed on the basis of high resolution picture data from the frame memory 11, the time required for taking thereinto picture data can be reduced as compared to the case where three kinds of picture data are separately (independently) delivered. In addition, since it is sufficient to carry out, only once, read-out control of the frame memory 11, constraint time of the frame memory 11 can be reduced.

Further, since the picture data of respective resolutions are recorded after respectively undergone fixed length encoding, the recording/read-out times can be fixed, and respective numbers of pictures (to be recorded) can be fixed. In addition, since data size to be handled is fixed, the configuration of the file management system can be simplified.

When the picture data of respective resolutions are recorded into suitable space area, picture data of respective resolutions are recorded at random on the optical disc 20. The specification of the storage unit 5 is such that, e.g., the minimum recording unit is 1 cluster (64 bytes), the data recording rate (speed) is 150K bytes/sec., the recording time per each cluster is 64K/150K ≠0.43 sec., and the maximum seek time is 0.5 sec. The maximum seek time is longer than the recording time per each cluster. For this reason, when picture data of respective resolutions are recorded onto the optical disc 20 at random, it is necessary to carry out, plural times, desired picture data to carry out recording/reproduction. As a result, it takes much time in recording/reproduction.

Moreover, when picture data of respective resolutions are recorded at random, in the case where work for erasing or editing picture data, etc. is carried out, space areas of data sizes corresponding to respective resolutions take place on the disc. For this reason, retrieval of space area becomes difficult.

For this reason, e.g., the recording area of the optical disc 20 is trisected from the inner circumferential side to the outer circumferential side so that the area corresponding to 32 clusters is caused to be recording area for low resolution picture data, the area corresponding to 200 clusters is caused to be recording area for intermediate resolution picture data, and the area corresponding to 1800 clusters is caused to be recording area for high resolution picture data to respectively record the picture data of respective resolutions into the respective recording areas. Accordingly, at the time of recording/reproduction, it is sufficient to carry out seek to the recording area of corresponding resolution to carry out recording/reproduction. Thus, the recording/reproduction time can be shortened.

Moreover, even if space areas of data sizes corresponding to respective resolutions take place on the disc as the result of the fact that working for erasing/editing picture data is carried out, picture data of the same data size is recorded into corresponding space area. For this reason, retrieval of space area can be facilitated. This can contribute to reduction of the recording time.

Even when recording of picture data is carried out in the state divided into recording areas of respective resolutions in this way, even if such picture data are recorded in order of reproduction within the recording area, in the case where there is necessity of continuously reading out pictures, such as, for example, at the time of automatic playback to continuously automatically read out recorded pictures one by one, or at the time of browsing to allow the automatic playback to be carried out at a higher speed, much time is similarly required for seek.

For this reason, an approach is employed to continuously record, in recording picture data of respective resolutions, those picture data in order of reproduction into respective divided recording areas of the optical disc 20, thereby making it possible the continuously read out picture data without seek at the time of automatic playback or at the time of browsing. Accordingly, the automatic playback and/or browsing can be facilitated, and those operations can be conducted at a higher speed.

8 Operation for Forming Overall Index-file

The operation in which the system controller 6 records, onto the optical disc 20, high resolution picture data and intermediate resolution picture data, and records index picture data into overall index file (OV INDX. PMX).

This overall index file is caused to undergo management by overall information management file, and is file in which what index pictures are recorded in respective directories are edited as a single file.

For example, in this example, in the case where five directories including 25 index pictures are formed, respective one index pictures of the leading portions of respective directories are taken out to record respective pictures in order to form overall index file consisting of five index pictures. In addition, in the case where the number of picture directories is set to smaller value, leading five pictures of index pictures may be respectively taken out from respective directories to form overall index file.

This overall index file is formed at the time of format for picture data. For this reason, such overall index file is already formed in recording picture.

Figure 35:
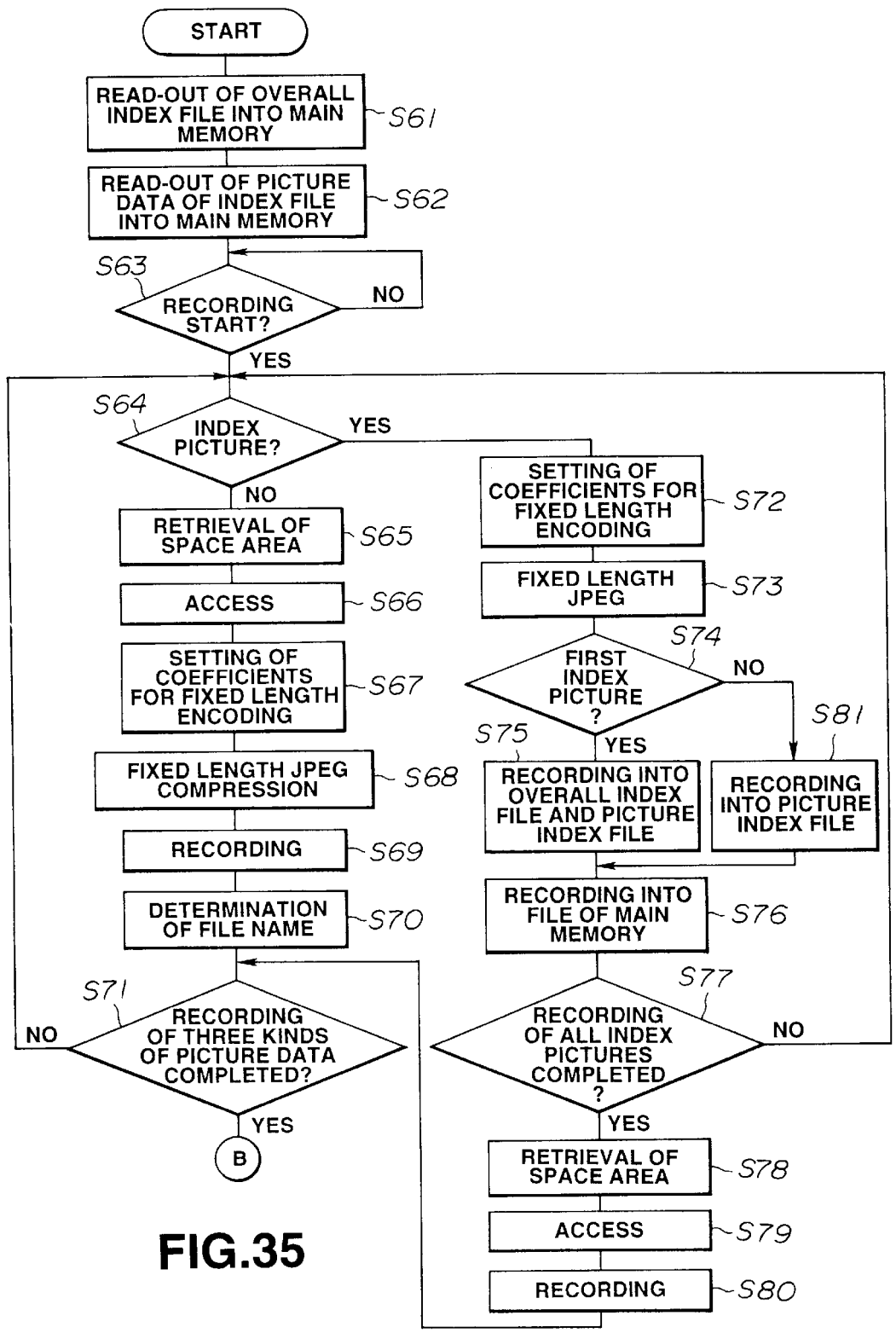
FIG. 35 is a flowchart for explaining forming operation of the first half of overall index file in the still picture system.

The operation for forming the overall index file is as indicated by the flowchart of FIG. 35. The processing operation by the flowchart shown in FIG. 35 starts when discrimination result of Yes is provided at step S10 of FIG. 32. Thus, the processing operation proceeds to step S61. It is to be noted that the routine before the step S10 is entirely the same, their description is omitted.

At step S61, the system controller 6 reads out (processing routine by) the overall index flowchart into the main memory 11a. Thus, the processing operation proceeds to step S62.

At the step S62, the system controller 6 controls the disc recording/reproducing section 5c through the storage unit controller 5d so as to read out all picture data recorded in the index file of the designated directory, and carries out a control for transferring picture data of the picture index file into the main memory 11a shown in FIG. 4. Thus, the processing operation proceeds to step S63.

It is to be noted that picture data recorded after undergone fixed length encoding along with header is read out as it is from the index file and the overall index file without allowing it to undergo expansion decoding processing to transfer it into the main memory 11a. In addition, when no picture data is recorded within the picture index file and the overall index file, there is no possibility that picture data is read out into the main memory.

At the step S63, the system controller 6 detects operation state of the operation section 10 to thereby whether or not designation of recording start is made from user. In the case of No, this step S63 is repeated until designation of the recording start is made. In the case of Yes, the processing operation proceeds to step S64.

At the step S64, the system controller 6 discriminates whether or not picture to be recorded from now on is index picture. In the case of No, the processing operation proceeds to step S65. In the case of Yes, the processing operation proceeds to step S72.

At the step S72, the system controller delivers data indicating that picture to be recorded from now on is index picture to the thinning and compression/expansion controller 4i shown in FIG. 5. When the data is delivered, the compression/expansion controller 4i sets fixed length encoding coefficients for index picture at the compression/expansion circuit 4h. Thus, the processing operation proceeds to step S73.

At the step S73, the system controller 6 controls the compression/expansion circuit 4h so as to implement compression encoding processing to the picture data which has been caused to undergo thinning processing into 1/4 on the basis of the set fixed length encoding coefficients through the thinning and compression/expansion controller 4i to thereby form index picture which have been caused to undergo fixed length encoding so as to have fixed data length of 1/15 clusters. Thus, the processing operation proceeds to step S74.

At the step S74, the system controller 6 discriminates on the basis of data of the overall information management file stored in the RAM 6a, whether or not the index picture which has been caused to undergo fixed length encoding at the step S74 is the index picture first recorded in the designated picture directory. In the case of No, the processing operation proceeds to step S81. In the case of the index picture, the processing operation proceeds to step S75.

At the step 81, the system controller 6 records the index picture which has been caused to undergo fixed length encoding into the picture index file. Thus, the processing operation proceeds to step S76.

At the step S75, the system controller 6 records the first index picture into the overall index file and the picture index. Thus, the processing operation proceeds to step 76.

At the step S76, the system controller 6 controls the memory controller 13 so as to record index picture of 4096 bytes in total in which headers are added into respective index files stored in the main memory 11a shown in FIG. 4. Thus, the processing operation proceeds to step S77.

At the step S77, the system controller 6 discriminates as to whether or not all index pictures are recorded into the main memory 11a. In the case of No, the processing operation returns to the step S64. In the case of Yes, the processing operation proceeds to step S78.

At the step S78, the system controller 6 retrieves the portion in which entry of 2 bits (code indicating available allocation block) of allocation block No. of Volume Space Bitmap VSB in the data U-TOC stored in the RAM 6a is "00" to thereby detect space area. Thus, the processing operation proceeds to step S79.

At the step S79, the system controller 6 controls the disc recording/reproducing section 5c so as to provide access to the detected space area on the optical disc 20 through the storage unit controller 5d. Thus, the processing operation proceeds to step S80.

At the step S80, the system controller 6 controls the disc recording/reproducing section 5c so as to recorded the index picture into the space area on the optical disc 20 through the storage unit controller 5d. Thus, the processing operation proceeds to step S71.

As described above, in the case where the index picture is caused to undergo fixed length encoding to record them onto the optical disc 20, before the index pictures which have been caused to undergo fixed length encoding are recorded onto the optical disc 20, they are temporarily recorded in order into the main memory 11a to thereby form one index file from all the index pictures in the main memory 11a thereafter to record it into physically continuous area s on the optical disc 20.

On the other hand, when the discrimination result is No at the step S64, the processing operation proceeds to step S65. At the step S65, the system controller 6 detects space area on the optical disc for recording picture of intermediate resolution or picture of high resolution. Thus, the processing operation proceeds to step S66.

In more practical sense, the system controller 6 retrieves the portion in which entry of 2 bits (code indicating available allocation block) of allocation block No. of Volume Space Bitmap VSB in the data U-TOC stored in the RAM 6a is "00" to thereby carry out detection of the space area.

At the step S66, the system controller 6 detects optimum space area of space areas retrieved at the step S65 as described above to control the disc recording/reproducing section 5c through the storage unit controller 5d so as to provide access thereto. Thus, the processing operation proceeds to step S67.

At the step S67, the system controller 6 sets fixed length encoding coefficients corresponding to high resolution picture data or ultra high resolution picture data at the thinning and compression/expansion controller 4i. Thus, the processing operation proceeds to step 68.

At the step S68, the thinning and contraction/expansion controller 4i controls the compression/expansion circuit 4h so as to form high resolution picture data of 8 clusters or ultra high resolution picture data of 18 clusters on the basis of the set fixed length encoding coefficients. Thus, the processing operation proceeds to step S69.

At the step S69, the system controller 6 controls the disc recording/reproducing section 5c so as to record the picture data which has been caused to undergo fixed length encoding into the detected optimum area on the optical disc 20. Thus, the processing operation proceeds to step S70.

At the step S70, as described above, the system controller 6 carries out recording control of the picture data, and successively determines data of picture data management file of the designated directory and file names corresponding to resolutions of respective picture data. Thus, the processing operation proceeds to step S71.

At the step S71, the system controller 6 discriminates whether or not picture data of three kinds of low resolution picture data (index picture), intermediate resolution picture data and high resolution picture data (or ultra high resolution picture data) have been all recorded. In the case of No, the processing operation returns to step S64 to record picture data of resolution which has not yet been recorded. In the case of Yes, the processing operation proceeds to step S91 shown in FIG. 36.

When recording of picture to be record is completed in this way, it is possible to carry out switching of data of overall index picture by user. Since setting is made such that first index pictures of respective directories are recorded in advance, e.g., in the overall index file formed simultaneously with formation of files of respective pictures of high resolution, intermediate resolution and index, only the first index pictures of respective directories are recorded. However, in the case where user has a desire, it is possible to carry out switching between the first index picture and any other index picture registered in the overall management file.

Figure 36:
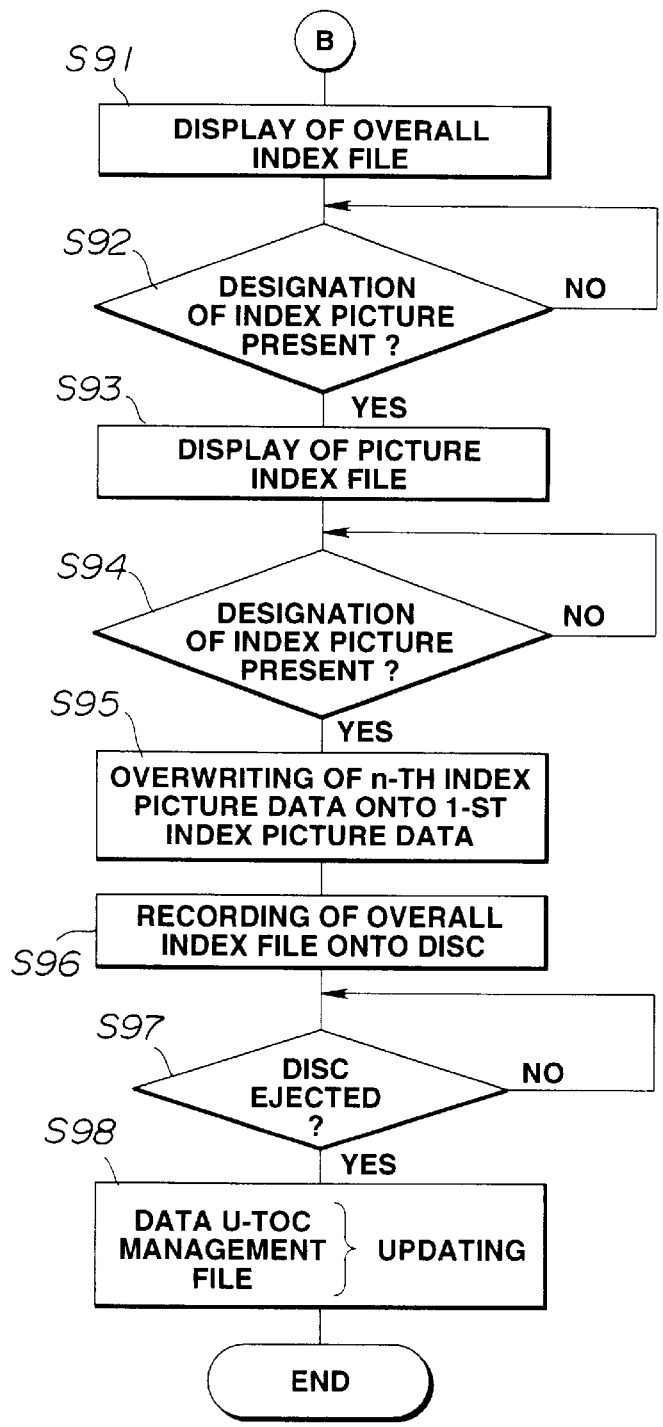
FIG. 36 is a flowchart for explaining forming operation of the latter half of the overall index file in the still picture system.

The switching operation of the desired index picture is as indicated by the routine of the step S91 and steps subsequent thereto of FIG. 36.

Namely, at the step S91 of FIG. 36, the system controller 6 carries out display control of the overall index picture. Thus, the processing operation proceeds to step S92.

At the step S92, the system controller 6 detects operation state (situation) of the operation unit 10 to thereby discriminate whether or not designation of index picture that user desires is made. In the case of No, this step S92 is repeated. In the case of the index picture, the processing operation proceeds to step S93.

Namely, at this step S92, desired index picture is designated from the overall index file. This indicates that picture directory corresponding to the designated index picture is designated. It is to be noted, in the following description, the designated picture directory is picture directory recorded at the n-th position.

At the step S93, the system controller 6 carries out a control to reproduce picture index file of the n-th picture directory designated at the step S92 to display it on the monitor unit. Thus, the processing operation proceeds to step S94.

At the step S94, the system controller 6 detects operation state (situation) of the operation unit 10 to thereby discriminate whether or not the desired index picture is designated from a predetermined number of index pictures of the picture index file displayed on the monitor unit. In the case of No, this step S94 is repeated. In the case of Yes, the processing operation proceeds to step S95.

Namely, at this step S94, desired index picture is designated from the n-th picture index file. Namely, this indicates that index picture recorded in place of the first index picture is designated. It is to be noted, in the following description, this designated index picture is assumed to be index picture recorded at the m-th position of the picture index file.

At the step S95, the system controller 6 controls the memory controller 13 so as to overwrite the m-th index picture data recorded in the picture index file of the n-th picture directory in the main memory at the position where the n-th index picture data recorded in the overall index file is recorded. At the same time, in the RAM 6a, index picture number "00001" recorded in the picture directory information unit corresponding to the n-th picture directory, i.e., the n-th picture directory information unit by picture number "0000m" corresponding to the newly switched (replaced) index picture. Thus, the processing operation proceeds to step S96.

At the step S96, the system controller 6 controls the disc recording/reproducing section 5c so as to record overall information management file onto the optical disc 20. Thus, the processing operation proceeds to step S97.

At the step S97, the system controller 6 detects whether or not the eject key 32 of the operation unit 10 is turned ON. In the case of No, this step S97 is repeated. In the case of Yes, the processing operation proceeds to step S98.

At the step S98, the system controller 6 updates related data of the data U-TOC, the overall management information file and the picture data management file recorded on the disc into respective data of the data U-TOC, the overall management information file and the picture data management file recorded in the RAM 6a. Thus, the entire routine is completed.

It is to be noted that while the above-described overall index file is adapted so that while first one index pictures of respective directories are recorded at the data recording time, an approach may be employed such that in the case where the number of directories is reduced, first five index pictures of respective directories are registered. For example, an example in which four directories are formed to resister five index pictures thereof will now be described. As described below, it is sufficient to form 20 units or less so that picture directory information unit correspond to 5 (pictures)×4 directories=20 (pictures) of the number of index pictures within the overall index file.

|  | Directory No. | Index Picture No. |
| --- | --- | --- |
| First picture directory information | 00 | 00 |
| second picture directory information | 00 | 01 |
| Third picture directory information | 00 | 02 |
| Fourth picture directory information | 00 | 03 |
| Fifth picture directory information | 00 | 04 |
| Sixth picture directory information | 01 | 00 |
| Seventh picture directory information | 01 | 01 |
| Eighth picture directory information | 01 | 02 |
| Ninth picture directory information | 01 | 03 |
| Tenth picture directory information | 01 | 04 |
| Eleventh picture directory information | 02 | 00 |
| Twelfth picture directory information | 02 | 01 |
| Thirteenth picture directory information | 02 | 02 |
| Fourteenth picture directory information | 02 | 03 |
| Fifteenth picture directory information | 02 | 04 |
| . |  |  |
| . |  |  |
| . |  |  |

9. Recording of Album Name, etc.

Album is defined so that one picture directory formed at the lower level (layer) of directory is caused to be one album. In this still picture system, when recording operations of picture data of respective resolutions are completed as stated above, album names every respective albums, picture names every pictures of respective albums, key word for retrieving desired picture, and disc name can be inputted.

In this case, user allows write key 53 provided on the operation unit 10 to be turned ON. When the write key 53 is turned ON, the system controller 6 detects such ON operation, resulting in the write mode for carrying out input of character information.

Then, user operates cross key 54. The system controller 6 allows the display section 26 to undergo display control so as to display, in order, e.g., characters of album name, picture name, key word and disc name every time the cross key 54 is operated once. User looks at characters displayed on the display section 26 to determine what information is inputted from now on to allow EXEC key 55 provided on the operation unit 10 to be turned ON. Thus, the system controller 6 recognizes information to be inputted from now on.

Then, user operates the ten key provided on the operation unit 10. Thus, the system controller 6 allows the display section 26 to undergo display control so as to display characters corresponding to the operation of the ten key. Then, user allows the EXEC key to be turned ON for a second time when album name, etc. displayed on the display section 26 is in correspondence with desired album name, etc.

When the EXEC key 55 is turned ON for a second time, the system controller 6 detects such ON operation to complete the write mode, and to control the disc recording/reproducing section 5c so as to record inputted character information such as album name, etc. onto the optical disc 20 as the so-called ASCII code.

In more practical sense, in the case where recording of a desired picture name is carried out, user allows the write key to be turned ON to cause the system controller 6 to be in write mode, and to allow the cross key 54 to be turned ON to select "Picture Name" which is information to be inputted from now on. Then, user operates the ten key 50 to input picture name of that picture. Thus, the system controller 6 forms ASCII codes corresponding to the inputted characters to deliver them to the disc recording/reproducing section 5c. Thus, the disc recording/reproducing section 5c records the ASCII codes corresponding to the picture name onto the optical disc 20.

In this example, the number of characters which can be inputted as the picture name is set to, e.g., 16 (characters), and the number of characters which can be inputted as the album name is set to 32 (characters), wherein they can be inputted with alphabet, katakana and/or kanji, etc. Namely, input of 432 characters (16 characters×25 pictures+32 characters for album name) can be inputted with respect to one picture on screen.

10. Description of Reproducing (playback) Operation

The reproducing (playback) operation of the still picture system in the case where picture data and recorded on the optical disc 20 in this way are reproduced (played back) to display them on the monitor unit 9 will now be described.

In this case, user initially operates album key 33 provided on the operation unit 10. The system controller 6 detects, every time the album key 33 is turned ON once, this ON operation to control the recording/reproducing section 5c and the display section 26 so as to reproduce album name of that album to display it. Four albums are recorded onto the optical disc 20. Every time the album key 33 is turned ON, four album names are displayed in order on the display section 26.

Then, user selects desired album from the four albums thereafter to allow first index key 38a to be turned ON. The system controller 6 detects, when the first index key 38a is turned ON, such ON operation to control the disc recording/ reproducing section 5c so as to reproduce picture data of low resolution for index of the selected album and ASCII code (album name, picture name, etc.).

One album consists of, e.g., 50 picture data. While such 50 pictures may be displayed on display screen at a time, display area of one picture necessarily becomes narrow, resulting in the possibility that selection of desired picture by user may become difficult. For this reason, the system controller 6 allows the disc recording/reproducing section 5c to undergo read-out control so as to read out picture data for lower resolution corresponding to 25 pictures by single designation. Thus, the disc recording/reproducing section 5c initially reads out, from the inner circumferential side of the optical disc 20, picture data for low resolution corresponding to 25 pictures, ASCII codes of album names, and ASCII codes of respective pictures to deliver the picture data to the compression/expansion circuit 4h shown in FIG. 5 through EFM circuit 21, and to deliver the ASCII codes directly to the buffer circuit 4b.

The compression/expansion circuit 4h implements expansion processing for low resolution to the picture data to deliver it to the buffer circuit 4b through raster/block converting circuit 4g and selector 4f. The buffer circuit 4b temporarily stores thereinto the picture data and the ASCII codes.

When the low resolution picture data and the ASCII codes are stored into the buffer circuit 4b in this way, the thinning and contraction/expansion controller 4i allows the buffer circuit 4b to undergo read-out control so that the ASCII codes stored in the buffer circuit 4b are transferred at a high speed along with the picture data. Thus, the ASCII codes are transferred at high speed to the video memory 11b shown in FIG. 4 without intervention of the system controller 6 through the interface 4a along with the picture data.

The memory area of the video memory 11b has longitudinal and lateral sizes of 2048 pixels×2048 pixels as a whole. The memory area of 1024 pixels×1536 pixels (length×breadth) thereof is the memory area for picture data (picture data area), and the memory area of 16 pixels×32 pixels (corresponding to 512 bytes) of the remainder area except for the area for picture data is command area which is the memory area for ASCII code.

When picture data and ASCII codes are transferred at a high speed from the buffer circuit 4b, the memory controller 13 conducts a control to write the picture data into the picture data area of the video memory 11b, and to conduct a control to write the ASCII codes into the command area.

When picture data and the ASCII codes are written into respective memory areas of the video memory 11b in this way, the memory controller 13 reads out the ASCII code written in the command area to interpret the ASCII codes. Then, the memory controller 13 allows the video memory 11b to undergo write control so as to write thereinto characters of the interpreted ASCII code as picture data.

In more practical sense, in the case where ASCII code which has been read out from the command area is "41H", this ASCII code indicates character of "A" of alphabet. For this reason, the memory controller 13 forms, e.g., picture data of character of "A" of 24 pixels×24 pixels to allow the video memory 11b to undergo write-in control so that the character of "A" is displayed below that picture.

When such write operation of picture data and picture data indicating character of the ASCII code (these two picture data will be simply collectively referred to as picture data hereinafter) into the video memory 11b is completed, the memory controller 13 carries out read-out control of the picture data written in the video memory 11b. This picture data is converted into an analog picture signal through DIA converter, and is delivered to the monitor unit 9.

Figure 41:
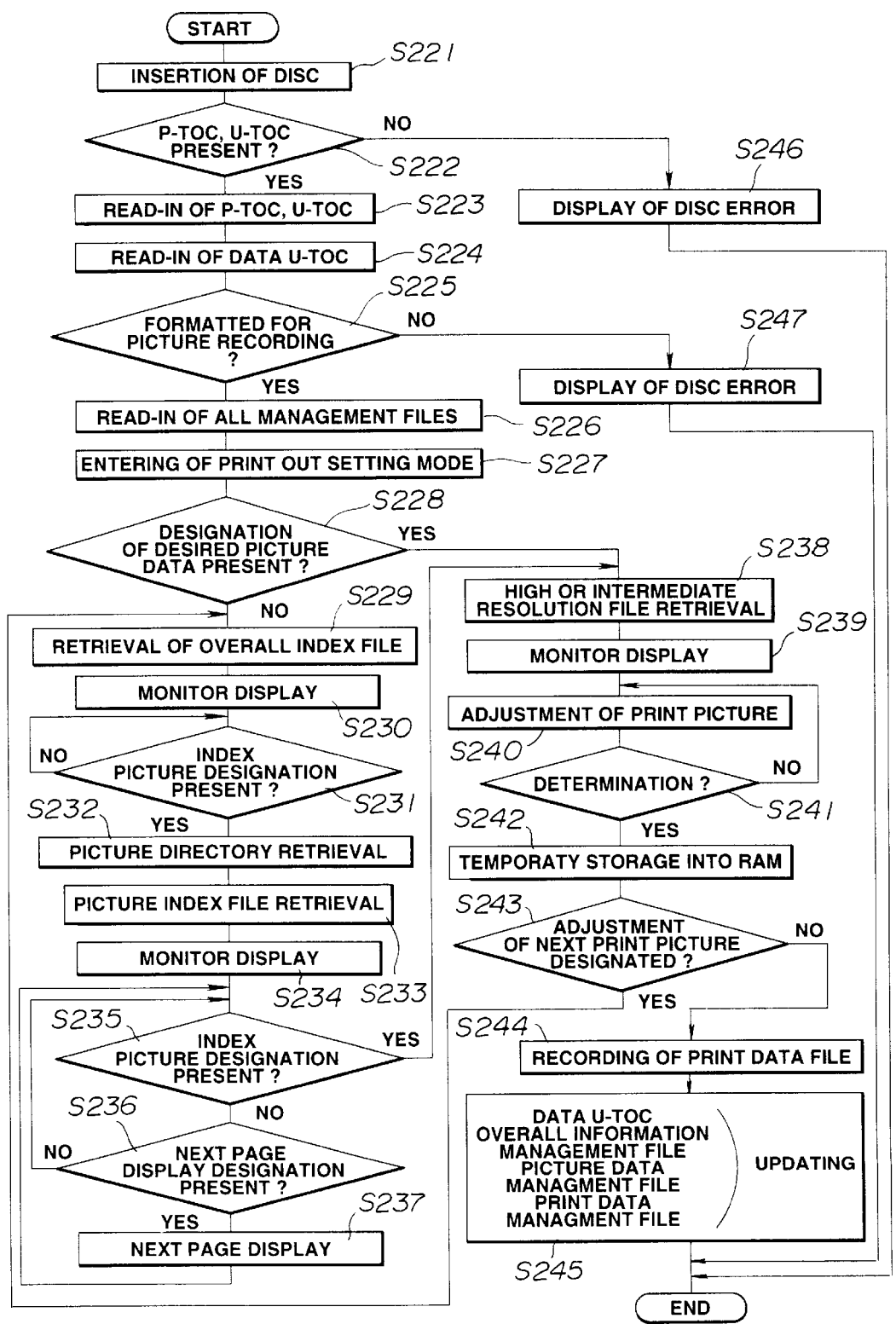
FIG. 41 is a flowchart for explaining recording/reproducing (playback) operation of the portable recording/reproducing device.

Thus, as shown in FIG. 41, 25 pictures for index and picture names of respective pictures are displayed along with the album name of the selected album on the display screen of the monitor unit 9.

Moreover, in the case where user desires to display the remaining 25 pictures of the selected album, he operates the operation unit 10 to designate display of the remaining 25 pictures. Thus, the system controller 6 controls the disc recording/reproducing section 5c so as to reproduce picture data for lower resolution of the remaining 25 pictures and ASCII codes of the respective picture data. Thus, the picture data for lower resolution of the remaining 25 pictures and the ASCII codes are transferred at high speed as described above, and the remaining 25 pictures are displayed on the monitor unit 9.

When 25 pictures are displayed as pictures for index on the monitor unit 9, user operates the operation unit 10 so as to select desired picture from these pictures.

The system controller 6 detects, when the operation unit 10 is operated so that desired picture is designated, such designation of the desired picture to control the disc recording/reproducing section 5c so as to read out, from the optical disc 20, picture data of intermediate resolution corresponding to the selected picture. Thus, the disc recording/reproducing section 5c reads out picture data having intermediate resolution for display record on the optical disc 20. The picture data of intermediate resolution is delivered to the video memory 11b as described above.

The memory controller 13 temporarily stores, when the picture data of intermediate resolution is delivered to the video memory 11b, this picture data of intermediate resolution to read out such picture data to deliver it to the monitor unit 9 through the D/A converter. Thus, the picture image selected by user is on the display screen of the monitor unit 9 in a full screen size.

In this case, the still picture (playback) system can select desired picture without displaying picture for index to display it on the monitor unit 9.

Namely, in the case where album in which desired picture is recorded and picture No. are known, user operates the ten key 50 provided on the operation unit 10 to designate that album, and to designate that picture No.

Since 50 pictures can be re corded in one album as described above, user inputs a desired picture No. by the ten key 50 to thereby select the desired picture. Then, the user selects the desired picture No. thereafter to allow reproduction (playback) key 41 to be turned ON.

When the system controller 6 detects that the reproduction key 41 is turned ON, it controls the disc recording/ reproducing section 5c so as to read out intermediate resolution picture data of picture No. of the designated album. Thus, picture data of intermediate resolution of the designated picture No. is read out from the optical disc 20, and picture image corresponding to the intermediate resolution picture data is displayed on the monitor unit 9.

Moreover, such selection of desired picture can be carried out also by using retrieval key 52 provided on the operation unit 10. Namely, when the retrieval key 52 is turned ON, the system controller 6 is brought into the retrieval mode. When the system controller 6 is placed in the retrieval mode, it allows the display section 26 to undergo display control so as to display, in order, characters of picture name, key word, recording date and recording time every time the cross key 54 is operated once. When user selects information to be inputted from the picture name, the key word, the recording date and recording time, he inputs picture name, key word, recording date or recording time of a picture to be retrieved by using the ten key 50 to allow the EXEC key 55 to be turned ON.

Thus, the system controller 6 detects that the EXEC key 55 has been turned ON to start retrieval. Then, the system controller 6 retrieves picture corresponding to the picture name and key word, etc. to allow the display section 26 to undergo display control so as to display album No., album name, picture name and picture No., etc. of the picture thus retrieved. It is to be noted that in the case where there are plural corresponding pictures, the display section 26 is caused to undergo display control so as to display, plural times, album Nos. and album names, etc.

Then, user selects desired picture from the picture names, etc. displayed on the display section 26 by using the cross key 54 to allow the reproduction key 41 to be turned ON.

The system controller 6 detects, when the reproduction key 41 is turned ON, such ON operation to control the disc recording/reproducing section 5c so as to reproduce picture data of the selected picture.

Thus, the designated picture data is read out from the optical disc 20, and is delivered to the monitor unit 9, on which it is displayed.

In such cases that user cannot recognize what album is formed within the disc to have an intention to carry out reproduction of desired picture therefrom, he allows second index key 38b of the operation unit 10 to be turned ON.

In recording low resolution picture data onto the optical disc 20, lower resolution picture data recorded at the beginning of respective albums are recorded in advance on the optical disc as respective one index files.

The system controller 6 detects, when the second index key 38b is turned ON, such ON operation to control the disc recording/reproducing section 5c so as to reproduce the index file. Thus, index file including lower resolution picture data of the picture recorded at the beginning of each album is reproduced from the optical disc 20, and is delivered to the monitor unit 9 through the video memory 11b as described above.

Thus, only the leading pictures of respective albums can be displayed on the monitor unit 9. Accordingly, user can retrieve album in which the desired picture is recorded.

The method of simultaneously displaying several pictures including the leading picture becomes more easy to select desired album rather than the method of displaying only the leading pictures of respective albums as stated above. For this reason, third index key 38c is provided at the operation unit 10.

Similarly, in recording low resolution picture data onto the optical disc 20, low resolution picture data recorded at the beginning of respective albums and low resolution picture data from the leading picture up to the fifth picture are recorded in advance on the optical disc as one index file.

When the third index key 38c is turned ON, the system controller 6 detects this ON operation to control the disc recording/reproducing section 5c so as to reproduce such index picture data.

Thus, low resolution picture data of pictures recorded at the beginning of the respective albums and low resolution picture data from the leading picture up to the fifth picture are reproduced, and are delivered to the monitor unit 9 through the video memory 11b as described above. Accordingly, pictures from the leading picture up to the fifth picture of respective albums can be displayed on the monitor unit 9. Thus, user can easily retrieve album in which desired picture is recorded.

There are instances where the method of displaying pictures of respective albums every predetermined number of picture allows the contents of respective albums to be more easily understood rather than the method of successively displaying pictures of respective albums. In order to cope with such case, fourth index key 38d is provided at the operation unit 10.

Similarly, at the time of recording low resolution picture data onto the optical disc 20, low resolution picture data recorded at the beginning of respective albums, low resolution picture data recorded succeedingly by ten pictures from the leading picture, and low resolution picture data recorded succeedingly by twenty pictures from the leading picture are recorded in advance on the optical disc as one index file.

Namely, when the fourth index key 38d is turned ON, the system controller 6 detects this ON operation to control the disc recording/reproducing section 5c so as to reproduce the index file.

Thus, picture data of lower resolution of respective albums reproduced every 10 pictures from the optical disc 20 are reproduced, and are delivered to the monitor unit 9 through the video memory 11b as described above. Thus, pictures reproduced every 10 pictures of respective albums can be displayed on the monitor unit 9. Accordingly, user can more easily retrieve album in which desired picture is recorded.

There are instances where when there is employed the method of displaying plural pictures of respective albums within a picture on screen, respective pictures are difficult to see, and are difficult to be retrieved. In order to cope with such case, first album search key 56 is provided at the operation unit 10.

Namely, when the first album search key 56 is turned ON, the system controller 6 detects this ON operation to control the disc recording/reproducing section 5c so as to continuously reproduce intermediate resolution picture data of the pictures recorded at the leading portions of respective albums.

Thus, intermediate resolution picture data of respective pictures recorded at the leading portions of the respective albums are reproduced from the optical disc 20 by the disc recording/reproducing section 5c, and are transferred into the video memory 11b as described above. The memory controller 13 immediately reads out, when the respective picture data of intermediate resolution are stored into the video memory 11b, such picture data to deliver them to the monitor unit 9.

Thus, pictures recorded at the leading portions of respective albums can be successively displayed on the monitor unit 9. Accordingly, user can retrieve desired album at a high speed.

In the case where user selects desired album from albums (pictures) successively displayed in this way, he allows the stop key 42 to be turned ON when a desired picture is displayed. The system controller 6 is operative so that when the stop key 42 is turned ON in such state, it recognizes that album to which picture displayed at the time point when the stop key 42 is turned ON belongs is designated to carry out reproduction and/or editing, etc. on the basis of the album at times subsequent thereto.

There are instances where if only leading pictures of the respective albums are successively displayed, user cannot recognize the content of corresponding album, and it is thus difficult to retrieve desired album. In order to cope with such a case, second album search key 57 is provided at the operation section 10.

Namely, when the second album search key 57 is turned ON, the system controller 6 detects this ON operation to control the disc recording/reproducing section 5c so as to successively reproduce picture data of intermediate resolution of pictures recorded at the leading portions of respective albums and picture data of intermediate resolution, e.g., up to third picture.

Thus, the intermediate resolution picture data of respective pictures recorded at the leading portions of the respective albums and the intermediate resolution picture data up to the third picture are reproduced from the optical disc 20 by the disc recording/reproducing section 5c, and are transferred to the video memory 11b as described above. The memory controller 13 immediately reads out, when the respective intermediate resolution picture data are stored into the video memory 11b, such picture data to deliver them to the monitor unit 9.

Thus, pictures recorded as pictures from the leading picture of respective albums up to the third picture can be successively displayed. As a result, user can retrieve desired album at a higher speed.

In the case where user selects desired album from albums (pictures) successively displayed in this way, he allows the stop key 42 to be turned ON when the desired picture is displayed. The system controller 6 is operative so that when the stop key 42 is turned ON in such state, it recognizes that album to which picture displayed at the time point when the stop key 42 is turned ON belongs is designated to carry out playback or reproduction and/or editing, etc. on the basis of the album at times subsequent thereto.

As stated above, a predetermined number of low resolution picture data for index are recorded onto the optical disc 20 in advance to read out the index file when the respective index keys 38a to 38d are turned ON to display the predetermined number of low resolution picture data indicating the contents of respective albums (picture directories) within one picture on screen, thereby making it possible to retrieve a desired album (picture directory) at a high speed.

Moreover, since the predetermined number of low resolution picture data are recorded as index file only picture on the optical disc 20, an approach is employed at the time of index display to retrieve one index file from the disc to read out it, thereby making it possible to display the predetermined number of low resolution picture data. Thus, index display can be carried out at a high speed.

Moreover, this still picture system can directly designate desired picture without displaying the picture for index to display it on the monitor unit 9.

Namely, in the case where album in which desired picture is recorded and picture No. are known, user operates album key 33, ten key 50, return key 39 and feed key 40 provided at the operation unit 10 as described above to input desired album and desired picture No. Then, user selects the desired picture No. thereafter to allow the reproduction key 41 to be turned ON.

The system controller 6 is operative so that when it detects that the reproduction key 41 is turned ON, it controls the disc recording/reproducing section 5c so as to read out intermediate resolution picture data of picture No. of the designated album. Thus, intermediate resolution picture data of the designated picture No. is read out from the optical disc 20, and picture corresponding to the picture data of intermediate resolution is displayed on the monitor unit 9.

Further, this still picture system can also retrieve desired picture by using retrieval key 52 provided at the operation unit 10.

Namely, when the retrieval key 52 is turned ON, the system controller 6 is brought into retrieval mode. When the system controller 6 is placed in the retrieval mode, it allows the display section 26 to undergo display control so as to display, in order, characters of picture name, key word, recording date and recording time every time the cross key 54 is operated once. When user selects information to be inputted from the picture name, the key word, the recording date and recording time, he inputs picture name, key word, recording date or recording time of picture to be retrieved by using the ten key 50 to allow the EXEC key 55 to be turned ON.

Thus, the system controller 6 detects that the EXEC key 55 has been turned ON to start retrieval. Further, this controller 6 controls the disc recording/reproducing section 5c so as to read out lower resolution picture data of the retrieved picture. It is to be noted that in the case where a plurality of pictures are retrieved by such retrieval, the system controller 6 controls the disc recording/reproducing section 5c so as to read out lower resolution picture data of the plural pictures.

Thus, the lower resolution picture data of the retrieved picture is delivered to the video memory 11b. The memory controller 13 reads out, when the low resolution picture data is stored into the video memory 11b, such data to deliver it to the monitor unit 9.

Then, user looks at the picture image displayed on the monitor unit 9 to recognize desired picture to input album No. and picture No. of this picture to allow the reproduction key 41 to be turned ON. The system controller 6 allows the disc recording/reproducing section 5c to undergo read-out control so as to reproduce intermediate resolution picture data of the designated picture No. from the designated album.

Thus, the intermediate resolution picture data of the desired picture is delivered to the monitor unit 9 through the video memory 11b, and the retrieved desired picture (image) is displayed on the monitor unit 9.

11. Playback (reproduction) and Display of Index Picture

Figure 37:
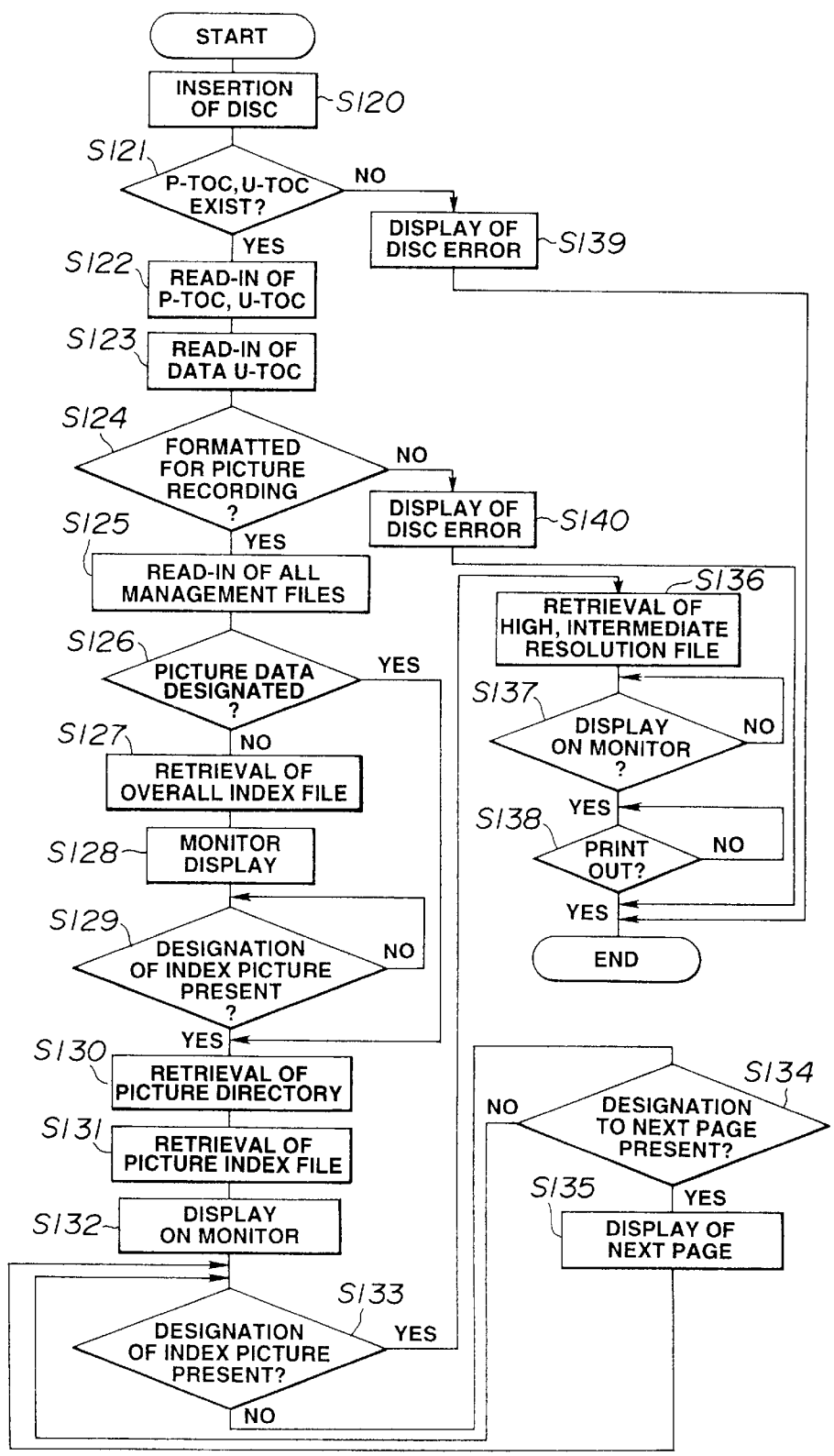
FIG. 37 is a flowchart for explaining reproducing (playback) operation in the still picture system.

The playback (reproduction) and display operations of index picture in the still picture system will now be described in more detail with reference to the flowchart of FIG. 37.

When user allows the power key 31 shown in FIG. 8 to be turned ON, the storage unit 5 is brought into stand-by state. Thus, the processing operation by the flowchart shown in FIG. 37 starts to proceed to step S120.

At the step S120, user inserts optical disc 20 into disc insertion hole 30 shown in FIG. 8. Then, the processing operation proceeds to step S121. Thus, the optical disc 20 inserted through the disc insertion hole 30 is loaded into the storage unit 5, resulting in the state where picture data can be reproduced.

At the step S121, the system controller 6 controls the disc recording/reproducing section 5c so as to read thereinto P-TOC and U-TOC recorded on the optical disc 20 to discriminate whether or not P-TOC and U-TOC exist on the optical disc 20. In the case where the respective TOC do not exist, the processing operation proceeds to step S139 to allow the display section 26 to undergo display control so as to display "disc error". In the case where the respective TOC exist, the processing operation proceeds to step S122.

At the step S122, the system controller 6 controls the disc recording/reproducing section 5c so as to read thereinto the P-TOC and the U-TOC to confirm position of data U-TOC. Thus, the processing operation proceeds to step S123. Since management of the area where data file is formed cannot be carried out by the U-TOC, in the case where data file exists, it is judged that data U-TOC exists at the leading portion thereof.

At the step S123, the system controller 6 stores data of data U-TOC into the RAM 6a to grasp positions of respective directories and files. Thus, the processing operation proceeds to step S124.

At the step S124, the system controller 6 discriminates whether or not the optical disc 20 is formatted for picture recording. In more practical sense, the system controller 6 discriminates, on the basis of data of the data U-TOC stored in the RAM 6a, whether or not directory of PIC_MD, overall information management file, (at least one) picture directory, picture data management file, and picture index file exist to thereby discriminate whether or not the optical disc 20 is formatted for picture recording. In the case of No, the processing operation proceeds to step S140 at which the display section 26 is caused to undergo display control so as to display "disc error". Then, the processing operation is completed as it is. In the case of Yes, the processing operation proceeds to step S125.

At the step S125, the system controller 6 controls the disc recording/reproducing section 5c so as to read out all management files (overall information management file, picture data management files of respective directories, print control data management file, reproduction control management file) through the storage section controller 5d, and temporarily stores, into the RAM 6a, the all management files which have been read out. Thus, the processing operation proceeds to step S126.

At the step S126, the system controller 6 discriminates whether or not designation of picture to be displayed is made. In the case of Yes, the processing operation proceeds to step S130. In the case of No., the processing operation proceeds to step S127.

At the step S127, the system controller 6 retrieves overall index file recorded on the optical disc 20. Thus, the processing operation proceeds to step S128.

Particularly, in the case where no designation of directory is made, it is necessary to display what picture data are recorded in respective directories to cause user to designate desired picture. For this reason, at the step S128, the system controller 6 controls the disc recording/reproducing section Sc so as to display overall index file recorded on the optical disc 20. Thus, the processing operation proceeds to step S129. The overall index file is file in which index picture data which are the same as an arbitrary one index picture of index picture data stored in the picture index files below (at the lower level of) respective picture directories are registered in display order of monitor. By monitor-displaying the overall index file, user can carry out designation of desired picture directory.

At the step S129, the system controller 6 detects operation state of the operation unit 10 to thereby discriminate, whether or not index picture that user desires is designated, from the monitor-displayed index picture. In the case of No., the step S129 is repeated until that designation is made. In the case of Yes, the processing operation proceeds to step S130.

At the step S130, the system controller 6 retrieves picture directory in which designated index picture is recorded. Thus, the processing operation proceeds to step S131.

Namely, picture directory information units (data of 48 bytes) in the overall information management file stored in the RAM 6a are registered by the same number as the number of index pictures (=the number of directories) displayed, and are recorded in order so as to correspond to the display order of index pictures. For example, explanation will be given by taking the example where the second index picture displayed by the overall information management file is designated. Initially, picture directory information of 48 bytes corresponding to the designated second index picture is recorded at the second position from the leading portion. In the directory No. of the second picture directory information unit, data of "00001" is recorded. By this data, it is understood (recognized) that the directory in which this index picture is recorded is directory of the second PIC0001.

At the step S131, the system controller 6 retrieves picture index file within the directory retrieved at the step S130. Thus, the processing operation proceeds to step S132.

At the step S132, the system controller 6 allows the monitor unit 9 to undergo display control so as to display the first picture index files (corresponding to 25 pictures) within the retrieved directory. Thus, the processing operation proceeds to step S133.

At the step S133, the system controller 6 detects operation state of the operation unit 10 to thereby discriminate whether or not designation of picture that user desires is made from index pictures displayed on the monitor unit 9. In the case of No., the processing operation proceeds to step S134. In the case of Yes, the processing operation proceeds to step S136.

At the step S134, the system controller 6 detects the operation state of the operation unit 10 to thereby discriminate whether or not designation of display of the next picture index file (corresponding to the remaining 25 pictures) is made. In the case of No., the processing operation returns to the above-described step S133. In the case of Yes, the processing operation proceeds to step S135.

At the step S135, the system controller 6 allows the monitor unit 9 to undergo display control so as to display picture index files corresponding to the remaining 25 pictures thereon. Thus, the processing operation returns to the above-described step S133.

On the other hand, at the step S133, in the case where it is discriminated that designation of index picture is made, the processing operation proceeds to step S136. At this step, the system controller 6 retrieves higher resolution picture file and intermediate resolution picture file corresponding to the designated index picture. Thus, the processing operation proceeds to step S137.

In more practical sense, the system controller 6 selects picture data management file corresponding to the directory in which displayed index file exists from respective picture data management files of respective directories stored in the RAM 6a. In the picture information units (16 bytes×N) of the selected picture data management file, there are registered picture information units of 16 bytes having the same number as the number (N) of indices registered in the picture index file. In addition, these picture information units are recorded in order so as to correspond to the order of displayed indices.

For example, the case where 25 index picture displayed by the picture index file is index file of the first directory and the fourth index picture is designated from the index file will be described below. Since the displayed index file is the index file of the first picture directory, the system controller 6 first makes reference to data of the first picture data management file in the RAM 6a. When the fourth index picture is designated by user, retrieval of the fourth picture information unit of the picture data file to which reference has been made is carried out. In data of the retrieved picture information unit, data of "00000" is recorded as the directory No. and data of "00003" is recorded as picture information. Accordingly, with respect to the picture file of high resolution corresponding to designated index picture, file name in the directory "PIC00000" is judged to be "PHP000003". With respect to the picture file of intermediate resolution, file name in the directory "PIC00000" is judged to be "PSN0003".

It is to be noted that when index picture is selected as described above to retrieve picture files of high resolution and intermediate resolution corresponding thereto, an approach is employed such that, on the basis of data in the picture information unit of the picture management file, picture file corresponding thereto is necessarily retrieved.

For example, when position of the index picture is changed by editing, etc. which will be described later, any difference takes place between the display order of index pictures and the picture No. of picture files. However, in the still picture system, since the display order of index pictures and picture number of picture file are in correspondence with each other, even in the case where display order of index pictures is changed, correspondence relationship between index pictures and picture files of high resolution and intermediate resolution is attained by the picture information unit of the picture data management file. The detail thereof will be described in the chapter of "Edit of picture" which will be referred to later.

At the step S137, the system controller 6 detects operation state of the operation unit 10 to thereby discriminate whether or not monitor display of the retrieved picture file of the intermediate resolution is designated. In the case of Yes, the processing operation proceeds to step S138. In the case of No., this step S137 is repeated.

At the step S138, the system controller 6 controls the disc recording/reproducing section 5c so as to read out data of the retrieved picture file of intermediate resolution to allow the monitor unit 9 to undergo display control so as to display the picture file of intermediate resolution reproduced by such a control, and to discriminate whether or not designation of print out of the retrieved picture file of high resolution. As a result, in the case of No, the step S138 is repeated. On the other hand, in the case of Yes, the system controller 6 controls the disc recording/reproducing section 5c so as to read out the retrieved picture file of high resolution to deliver it to the printer unit 2 through the main memory 11a. Thus, the entire routine of reproduction and display of the index picture shown in FIG. 37 is completed.

In this example, at the printer unit 2 to which the picture file of high resolution has been delivered, the high resolution picture data delivered as respective data of R, G, B are converted into yellow (Y), magenta (M) and cyan (C) to print these data onto the printer paper by the thermal head in order from the Y data.

12. Retrieval of File and Picture Directory

Figure 38:
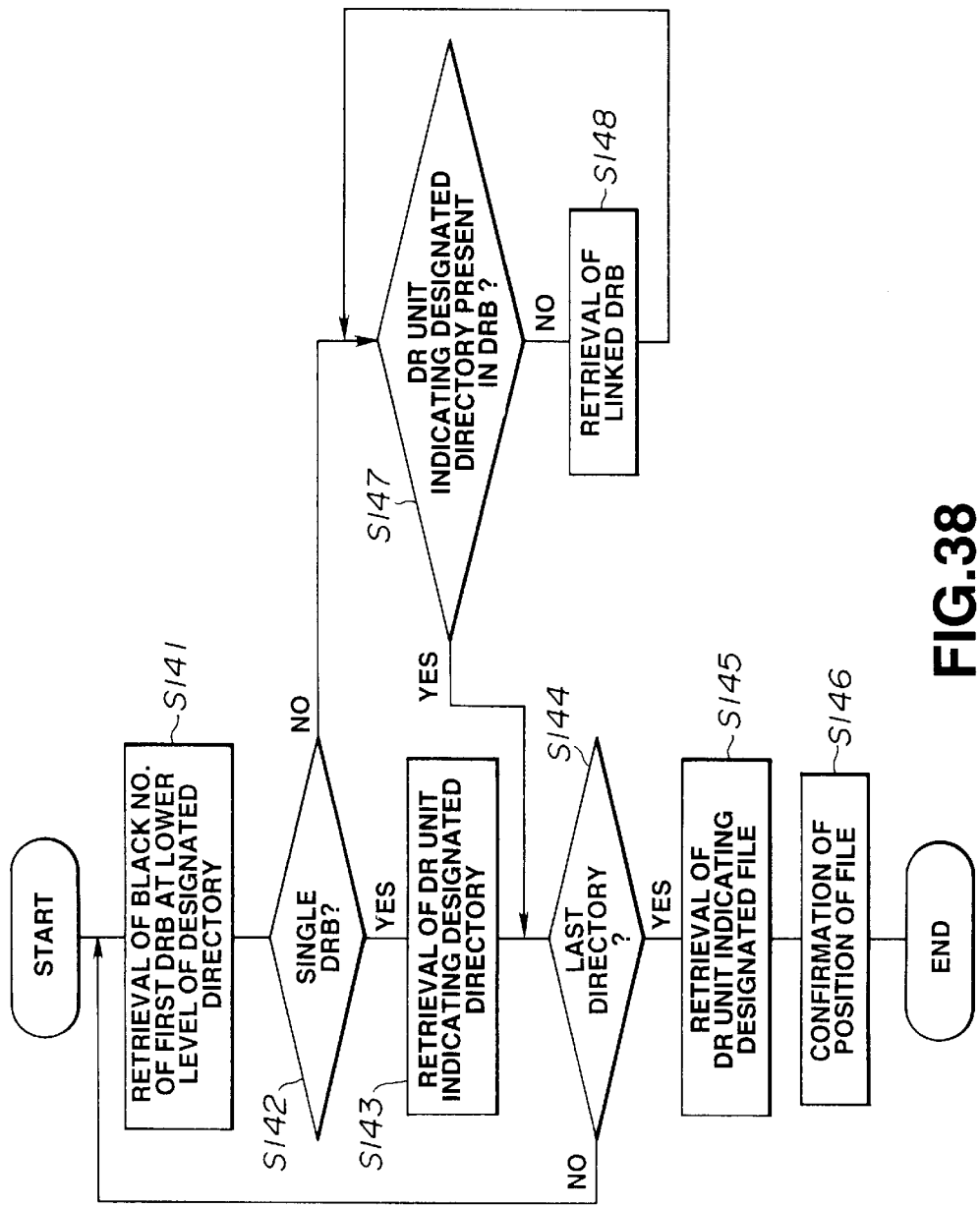
FIG. 38 is a flowchart for explaining retrieval operation of designated picture data in the still picture system.

Explanation will be given in the case where, e.g., picture file f5 (PSN00000. PMP) is retrieved with reference to the hierarchical structure of file which has been described with reference to the FIG. 19 mentioned above, etc. This retrieval operation is as indicated by the flow chart of FIG. 38. The processing operation by the flowchart shown in FIG. 38 starts when data of the data U-TOC is stored into the RAM 6a and desired directory and file name are designated by user to proceed to step S141.

At the step S141, the system controller 6 retrieves, on the basis of Volume Descriptor (VD) of the volume management area, block No. of the first Directory Record Block (DRB) indicating directory (PIC_MD). Thus, the processing operation proceeds to step S142.

In more practical sense, position of DRB within the management block is recorded by data indicating position of the first directory record block of the VD. In this still picture system, block No. of the first DRB is set to "4" as described above. Accordingly, the system controller 6 judges that DRB for indicating directory D1 (PIC_MD) is DRB indicated by management block number "0004".

At step S142, the system controller 6 discriminates, by making reference to entry of the management block recorded in MT, whether or not the designated DRB is single DRB or successive DRBs. In the case of single DRB, the processing operation proceeds to step S143. In the case where DRB is not single, the processing operation proceeds to step S147.

Figure 20:
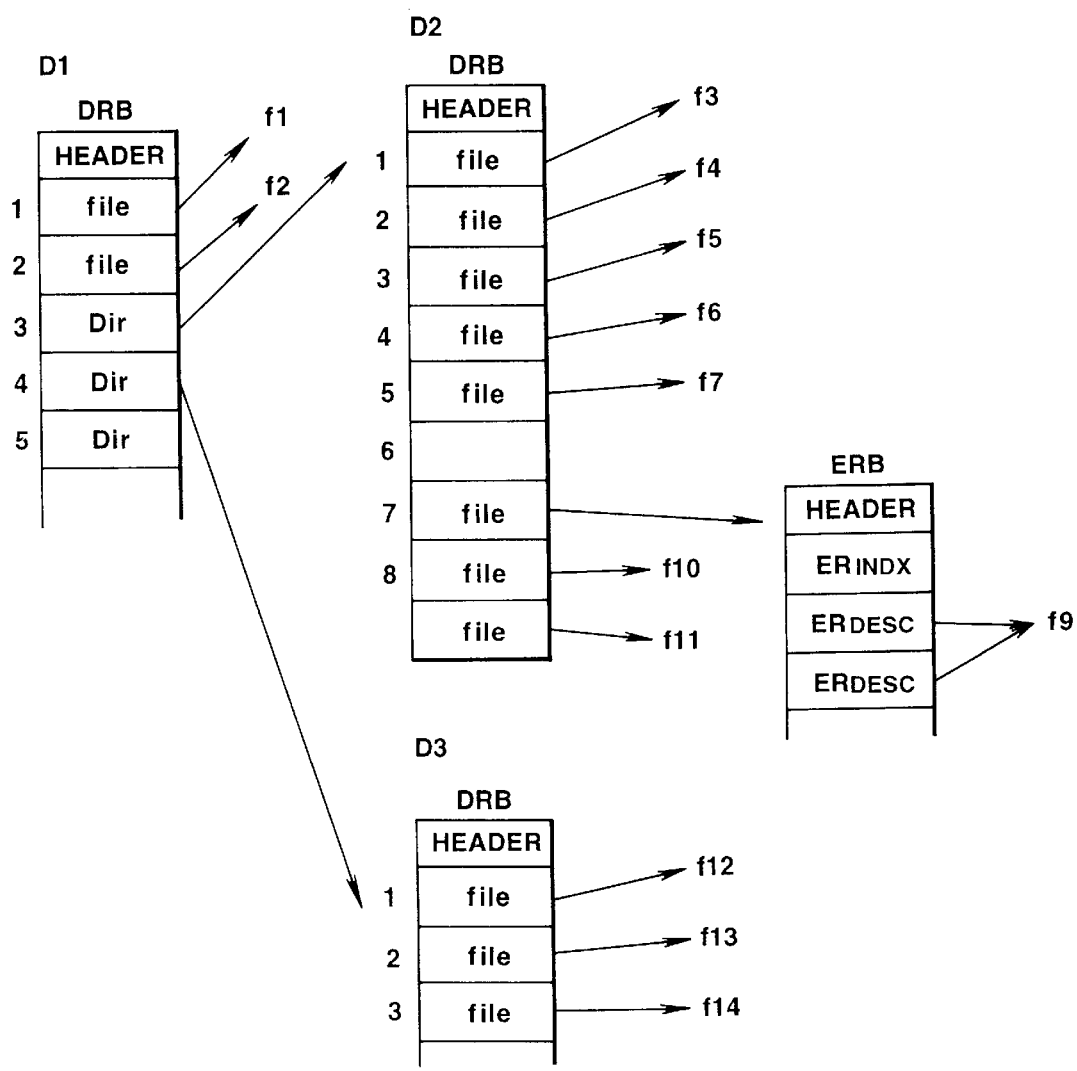
FIG. 20 is a view for explaining DRB and ERB constituting the management block.

It is to be noted that since DRB of the management block number "0004" is single DRB in the file hierarchical structure shown in FIG. 20, the processing operation proceeds to step S143.

At the step S143, the system controller 6 retrieves DR unit for directory for indicating recording position of picture directory D2 (PIC0000) where picture file f5 exists from plural DR units provided in the DRB indicating directory D1.

In the hierarchical structure shown in FIG. 19, since the third DR unit of the DRB indicating directory D1 is DR unit for directory for indicating recording position of picture D2, DR unit for directory which is the third DR unit is retrieved. In the DR unit for directory which is the third DR unit, "Index to DRB" is recorded. By management block number recorded as "Index to DRB", block position of DRB indicating picture directory D2 is designated. Namely, since "0005" is recorded as data of "Index to DRB" in the file hierarchical structure shown in FIG. 19, it is judged that DRB for indicating picture directory D2 is DRB indicated by management block number "0005".

On the other hand, at the step S147, the system controller 6 successively retrieves DR unit within the DRB to judge whether or not DR unit for directory for indicating designated picture directory exists. In the case of No (i.e., in the case where no DR unit indicating designated picture directory exists within the linked first DRB), the processing operation proceeds to step S148. In the case of Yes (i.e., in the case where DR unit indicating designated picture directory exists within the linked first DRB), the processing operation proceeds to step S144. It is to be noted that in the case where picture file f5 is retrieved in the file hierarchical structure of FIG>20. since DRB indicating directory D1 (PIC_MD) and DRB indicating picture directory D2 (PIC00000) are both single DRB, these steps S147 and S148 are not used.

At the step S144, the system controller 6 judges whether or not the DR unit for directory retrieved at the step S143 is DR unit for directory indicating designated directory. Since the file structure used in this still picture system is tree structure as shown in FIG. 19, whether or not the retrieved directory is the last directory (directory of the lowermost layer (level)) in the process of coming to the designated directory. In this example, in retrieving picture file f5 in the file hierarchical structure of FIG. 19, picture directory D2 indicated at step S143 is the lowermost layer (level) directory. For this reason, judgment result at the step S144 becomes Yes. The processing operation proceeds to step S145.

At the step S145, the system controller 6 retrieves DR unit for file for indicating recording position of picture file f5 from plural DR unit provided in DRB in order to indicate the picture directory D2 retrieved at the step S143.

Namely, in the file hierarchical structure shown in FIG. 19, the third DR unit of DRB indicating picture directory D2 is DR unit for file for indicating picture file f5. For this reason, DR unit for file which is the third DR unit is retrieved by this step S145. In the DR unit for file, "Extent Start Location" is recorded. By the allocation block number recorded as "Extent Start Location", recording position of picture file f5 is designated. Thus, the processing operation proceeds to step S146.

At the step S146, the system controller 6 provides an access to the allocation block position retrieved at the step S145 within the file extents area to confirm that the picture file f5 exists at the position to which access has been made. It is possible to reproduce picture file f5 with the access position being as the leading portion.

In this still picture system, since retrieval of picture files is carried out in a manner as described above, the number of physical read-in operations for file retrieval can be reduced. Thus, picture files within picture directories caused to be of the hierarchical directory structure can be retrieved with ease and at a high speed.

Moreover, since information relating to the hierarchical directory structure are concentrated into the second area (volume management area), in the case of reading out information necessary for file retrieval, it is sufficient to provide access only to the volume management area. For this reason, recording position of file can be grasped. Accordingly, the number of picture files can be thus carried out at a high speed.

In addition, since any large capacity of data such as picture data, etc. is not recorded in the volume management area, and only management data is recorded, such data are very suitable for storing them into the RAM. Thus, once such management data is caused to be stored into the RAM, the number of access operations to the optical disc for the purpose of retrieving file can be further reduced.

13. Edit of Picture

When recording of picture is completed as described above, it becomes possible to carry out editing of index picture by selection of user. The editing of picture refers to out, e.g., work for moving picture data of a certain picture directory to another picture director, and work for carrying out switching of index picture within the same directory to change display order of index pictures.

The example where the fifth index picture displayed within the first directory and picture data of high resolution is moved to the tenth display position of the second directory will be described below with reference to the flowchart of FIG. 39.

Figure 39:
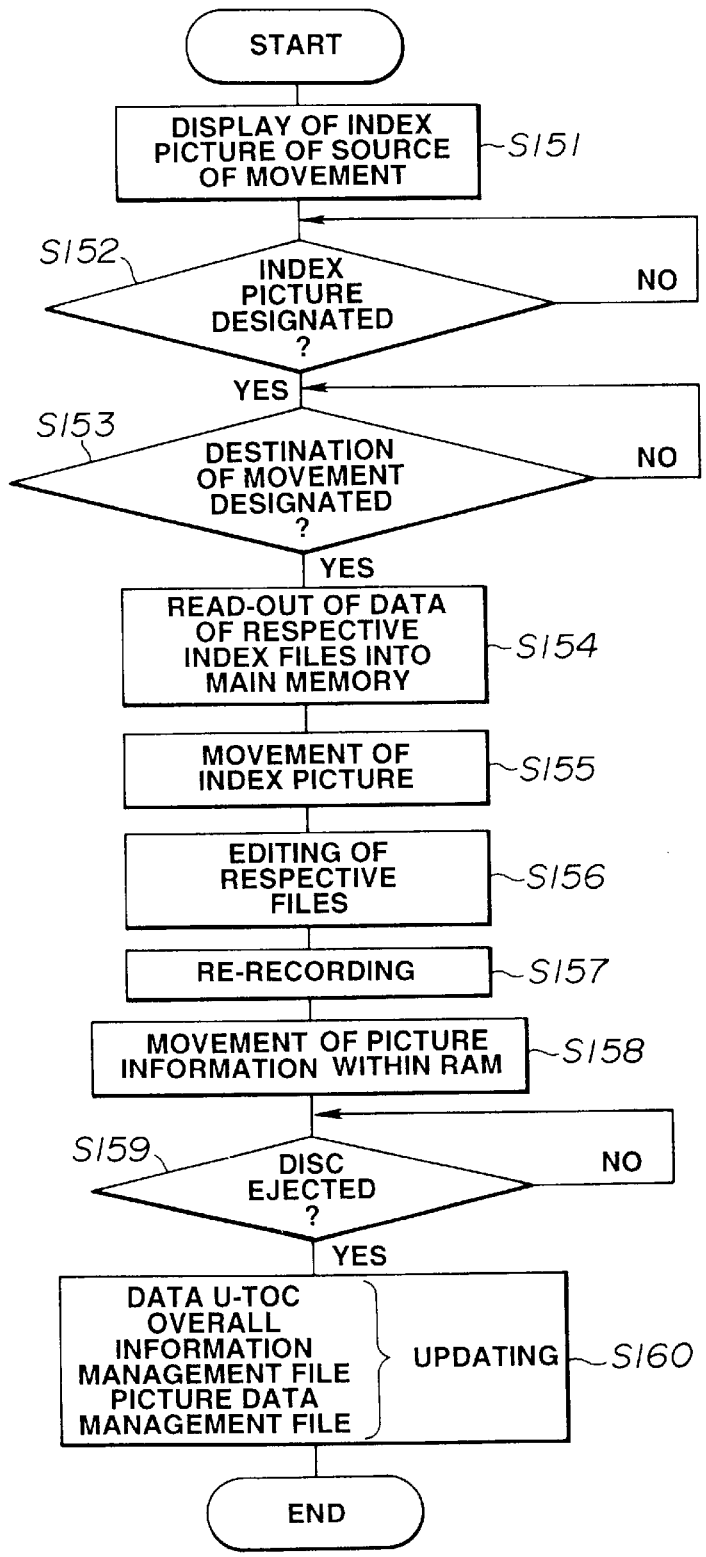
FIG. 39 is a flowchart for explaining edit operation of picture data in the still picture system.

The processing operation by the flowchart shown in FIG. 39 starts when recording of a desired picture is completed and user allows the edit designation key to be turned ON the proceed to step S151.

At the step S151, the system controller 6 reads out index file of (the first) directory of movement source to control the disc recording/reproducing section 5c so as to display 25 index pictures. Thus, the processing operation proceeds to step S152 (see the chapter of reproducing operation).

At the step S152, the system controller 6 discriminates whether or not index picture to be moved within the directory of movement source is designated (whether or not index picture displayed at the fifth position (location) of the first directory is designated). In the case of No., this step S152 is repeated. In the case of Yes, the processing operation proceeds to step S153.

At the step S153, the system controller 6 detects operation state of the operation unit 10 to thereby discriminate whether or not directory of movement destination and movement position are designated (the original picture is moved to the tenth index picture of the second directory in the case of this example). In the case of No., this step S153 is repeated. In the case of Yes, the processing operation proceeds to step S154.

At the step S154, the system controller 6 controls the disc recording/reproducing section 5c, etc. so as to read out all index pictures of index file of directory of movement source and all index pictures of index file of directory of movement destination into the main memory 11a. Thus, the processing operation proceeds to step S155.

At the step S155, the system controller 6 controls the memory controller 13 so as to move only the designated index picture (including header as well) from the index file of source of movement (first directory) to index file of destination of movement (second directory). Thus, the processing operation proceeds to step S156.

Namely, in the picture index file, respective index pictures have fixed capacity of 4096 bytes in all including the header and the data body. Accordingly, since, in this example, 4096 bytes subsequent to 4096×3 bytes from the leading portion of the file is determined to be data of the fourth index picture (including header as well), position of index picture within the picture index file can be easily grasped. Similarly, destination of movement of data of the index picture (4096 bytes) to be moved is designated to be area subsequent to 4096×9 bytes of index file of (the second) directory of destination of movement, and is inserted into the area (this operation is not overwrite operation).

At the step S156, the system controller 6 controls the memory controller 13 so as to carry out editing control to delete (erase) the moved index picture on the index file of source of movement to update file to supplement the moved index picture of the index file of destination of movement. Then, the system controller 6 updates the file of destination of movement. Thus, the processing operation proceeds to step S157.

At the step S157, the system controller 6 re-records, at the same portion on the disc, the index file of the source of movement and the index file of the destination of movement which have been respectively edited. Thus, the processing operation proceeds to step S158. It is to be noted that if there is any other portion where the area can be ensured in place of the same portion, that portion may be employed (utilized).

At the step S158, the system controller 6 moves, in the RAM 6a, picture information unit recorded at the fifth recording position of plural picture information units (16 bytes) which have been recorded within the picture data management file of source of movement (first directory) to the tenth unit within the picture data management file of destination of movement (second directory) without changing data. Thus, the processing operation proceeds to step S159. It is to be noted that any updating is not implemented to files of picture data of high resolution and intermediate resolution.

At the step S159, the system controller 6 discriminates whether or not the eject key 32 of the operation unit 10 is turned ON to thereby discriminate whether or not the disc eject is designated. In the case of No, this step S159 is repeated. In the case of Yes, the processing operation proceeds to step S160.

At the step S160, the system controller 6 controls the disc recording/reproducing section 5C so as to read out data U-TOC, overall information management file and picture data management file in the RAM 6a to write them onto the disc to thereby update the respective data. Thus, the entire routine according to the editing operation of picture is completed.

The example of a recording medium where there is provided header in which data for carrying out correspondence with display order of index picture is recorded at the leading portion of the file of high resolution picture data or intermediate resolution picture data is taken here. In such a recording medium, when attempt is made to carry out editing operation as described above, data of the header is rewritten, thereby to ensure correspondence with the display order of the index pictures. However, in order to rewrite data of the header, it is necessary to once read out all data (including picture data as well) of the picture file. As a result, it takes much time in reproduction (playback) from the disc.

In the above-described editing operation in this still picture system, however, an approach is employed such that, with respect to the index file, switching of physical position on the disc is carried out in accordance with the order actually displaced, but, with respect to the picture data of high resolution and intermediate resolution, switching of data of picture information unit within other picture data management file which has been read into the RAM 6a is carried out without carrying out any change of position on the disc. Further, correspondence between the display order of index pictures and high and intermediate resolution files can be ensured by such switching (replacement) between respective data. For this reason, rewrite operation is required only for switching of index pictures within the index file and rewriting of picture data management file in the RAM 6a. Accordingly, rewrite data can be extremely reduced. Thus, rewrite work can be carried out at a high speed.

Moreover, since physical position on the disc of the index picture is changed so that the index files take the same order as the display order, it is possible to realize high speed read-out operation of index file.

Further, also when order of display of index pictures is changed within the same index file within the same directory, such a change can be carried out by similar control. For example, in the case of changing display order so as to display the seventh index picture within the same index file at the second position (location), all data of the index file are first temporarily read out from the disc into the main memory 11a to move the seventh index picture to the second recording position thereafter to edit the file in the main memory thereafter to re-record them onto the disc. On the other hand, in the RAM 6a, within the picture data management file, the seventh picture information unit of 16 bytes is inserted into the second recording position without changing data. Namely, also in the case where order of display of index picture is changed within the same directory, only the index file and the picture information unit in the RAM are rewritten, but actual picture data are not rewritten.

14 Print Operation

The operation of the still picture system in the case of carrying out print operation of picture taken in through the scanner unit 1 or the video input unit 8 will now be described.

In the case of allowing picture taken in through the scanner unit 1 or the video input unit 8 to undergo print, user operates the operation unit 10 to display, on monitor unit 9, the picture taken in through the scanner unit 1 or the video input unit 8 similarly to the above. In the case where the picture displayed on the monitor unit 9 is desired picture, user operates the operation unit 10 to designate the number of prints, and to designate print of that picture.

The picture data taken in through the scanner unit 1 or the video input unit 8, or from the optical disc 20 is stored in the main memory 11a. For this reason, the system controller 6 is operative so that when the print is designated, it allows the main memory 11a to undergo read-out control through the memory controller 13 so that picture data stored in the main memory 11a is read out therefrom. The picture data which has been read out from the main memory 11a is delivered to data conversion circuit 2a of printer unit 2.

The data conversion circuit 2a implements data conversion processing suitable for print to the picture data which has been read out from the main memory 11a, i.e., when the picture data are delivered in a form of R, G, B or Y, Cr, Cb, the circuit 2a carries out color coordinate transform processing into form of Y (Yellow), M (Magenta) and (Cyan) from the above form to thereby form picture data for print to deliver it to thermal head 2c.

The thermal head 2c prints pictures corresponding to the picture data by about 300 DPI onto print paper 2d of, e.g., A6 size. Thus, the picture corresponding to the picture data which has been taken in through the scanner unit 1 or the video input unit 8 can be printed by the designated number of pictures.

Here, the picture image displayed on the monitor unit 9 in this way becomes picture subjected to print as it is. In this still picture system, picture processing such as enlargement (expansion), contraction, rotation or color designation, etc. is implemented to the picture image displayed on the monitor unit 9, thus making it possible to print the picture which has been caused to undergo picture processing.

Namely, such picture processing is designated by using respective keys provided at the operation unit 10.

For example, in the case where there is a need to enlarge a desired portion of picture displayed on the monitor unit to print it, user operates enlargement key provided at the operation unit 10. When this enlargement key is operated, the system controller 6 controls the picture processing circuit 12 shown in FIG. 4 so as to carry out enlargement processing by the time (period) during which the enlargement key is operated with center point of display picture image being as center. The picture processing circuit 12 forms enlarged picture data by interpolation processing. The memory controller 13 temporarily write, into the video memory 11b, the picture data which has been caused to undergo enlargement processing by the picture processing circuit 12 to read out such picture data therefrom to deliver it to the monitor unit 9. Thus, picture image in which the portion in the vicinity of center (picture of the portion in the vicinity of the center of original picture) is displayed on the monitor unit 9.

Then, user operates cross key 54 provided at the operation unit 10. The system controller 6 controls the memory controller 13 so as to display, after undergone scrolling in upper and lower directions and in left and right directions, the enlarged picture in dependency upon the operation state of the cross key 54. Thus, picture image in which the portion that user desires of the original picture is enlarged is displayed on the monitor unit 9.

In the case where the original picture is subjected to print in contracted state, user operates contraction key provided at the operation unit 10. When the contraction key is operated, the system controller 6 controls the picture processing circuit 12 so as to carry out contraction processing with the center point of display picture being as center by the time (period) during which the contraction key is operated. The picture processing circuit 12 forms contracted picture data by thinning processing. The memory controller 13 temporarily writes, into the video memory 11b, picture data which has been caused to undergo contraction processing by the picture processing circuit 12 to read out such picture data therefrom to deliver it to the monitor unit 9. Thus, the contracted original picture is displayed on the monitor unit 9. It is to be noted that in the case where display size of the original picture is less than the display size by the contraction processing, original picture image in a form such that, e.g., the peripheral portion is surrounded by black picture (other color picture such as white picture, etc. may be used).

For example, in the case where user desires to print lateral picture as longitudinal picture, or in the case where user prints longitudinal picture as lateral picture in a manner opposite to the above, etc., he operates the rotation key provided at the operation unit 10. The system controller carries out read-out control of picture data stored in the video memory 11b so that picture displayed on the monitor unit 9 is displayed in the state rotated by 90 degrees in clockwise direction every time the rotation key is operated once. Thus, lateral picture is displayed as longitudinal picture, or longitudinal picture is displayed as lateral picture on the monitor unit 9.

In the case where user desires to print picture image displayed on the monitor unit 9 in an inverted state where such picture image is projected on the mirror, he operates the mirror key provided at the operation unit 10. The system controller 6 controls the memory controller 13 so as to display picture in an inverted state every time the mirror key is operated. Thus, original picture image is displayed in the inverted state on the monitor unit 9.

In the case where user desires to carry out color processing with respect to display picture to print it as in the case where, e.g., he desires to emphasize red of picture image displayed on the monitor unit 9, he operates gain operation keys for respective colors of R, G, B provided at the operation unit 10. As described above, gains of respective colors can be adjusted at 1/256 (8 bits) intervals between magnification of 0 to 5. For this reason, the system controller 6 controls, in the + (plus) direction or in the − (minus) direction, gain of variable amplifier for respectively picture data of respective colors by the time corresponding to operation when operation keys of respective colors are operated. Thus, picture image in which, e.g., red is emphasized, which is picture corresponding to the color processing, is displayed on the monitor unit 9.

In the case where user desires to print picture in which contrast, brightness, sharpness, saturation and/or hue are controlled, he operates respective control keys provided at the operation unit 10. When the respective control keys are operated, the system controller 6 controls respective sections so as to respectively control contrast, brightness, sharpness, saturation and hue in dependency upon such operation. Thus, picture image in which the contrast, the brightness, the sharpness, the saturation, and/or the hue are adjusted is displayed on the monitor unit 9.

All of the above-mentioned picture adjustment can be adjusted by dedicated keys provided at the operation unit 10. Accordingly, user can carry out designation such as enlargement, contraction or color processing, etc. while looking at actually displayed picture.

Selection of print size, selection of multi mode, selection of presence or absence of print of caption, etc., and selection of caption to be subjected to print can be carried out by operating the print designation key. When the print designation key is operated, the system controller 6 displays, in a form superimposed on a picture image displayed at present, item for carrying out selection of the print size, selection of the multi mode, selection of presence or absence of print of caption, etc., and selection of caption to be subjected to print. User operates the cross key 54 to thereby move cursor displayed within picture on screen to select these items.

Initially, when the item of the "print size" is selected, the system controller 6 displays respective select items of E size, L size, K size, cabinet (LL size), one sixth size, quarter size, A6 size, A5 size, A4 size, A3 size, and non-regular shape. User operates the cross key 54 to designate print size from these select items.

In the case where "non-regular shape" is selected by the item of the print size, the system controller 6 displays input picture of size of lateral direction (X direction) and size of longitudinal direction (Y direction). These respective sizes can be set in mm units. User inputs desired print size by using ten key 50 provided at the operation unit 10 to designate it.

When the item of the "multi (multiple) mode" is selected, the system controller 6 displays select item for selecting multi-number of pictures of 2, 4, 6, 8 and 16. This item of "multi-mode" is the item for selecting how many number of the same pictures are subjected to print within a single print paper. For example, in the case where the select item of four pictures is selected, the print area of the print paper is quartered (is divided into four portions). Thus, the same picture images displayed on the monitor unit 9 are respectively subjected to print into the print areas thus divided.

When the item of the "caption" is selected, the system controller 6 displays select item for selecting name table, comment table, and option table. It is sufficient for user to select desired item to be subjected to print from the select items. For example, in the case where "name table" is selected from these items, caption attached to corresponding picture is subjected to print along with picture image displayed on the monitor unit 9.

When user designates print size and/or color processing, etc. in this way, he operates the determination key provided at the operation unit 10. When the determination key is determined, the system controller 6 temporarily stores, into the RAM 6a, as print control data, respective data from the picture directory No. up to hue shown in FIG. 31. Further, when the print designation key is operated, the system controller 6 reads out print control data stored in the RAM 6a to control the print operation in accordance with the print control data thus read out. Thus, it is possible to print, on a print paper of which size is designated by user, picture image to which enlargement processing, contraction processing and/or color processing, etc. have been implemented.

15 Portable Recording/Reproducing Device

Figure 40:
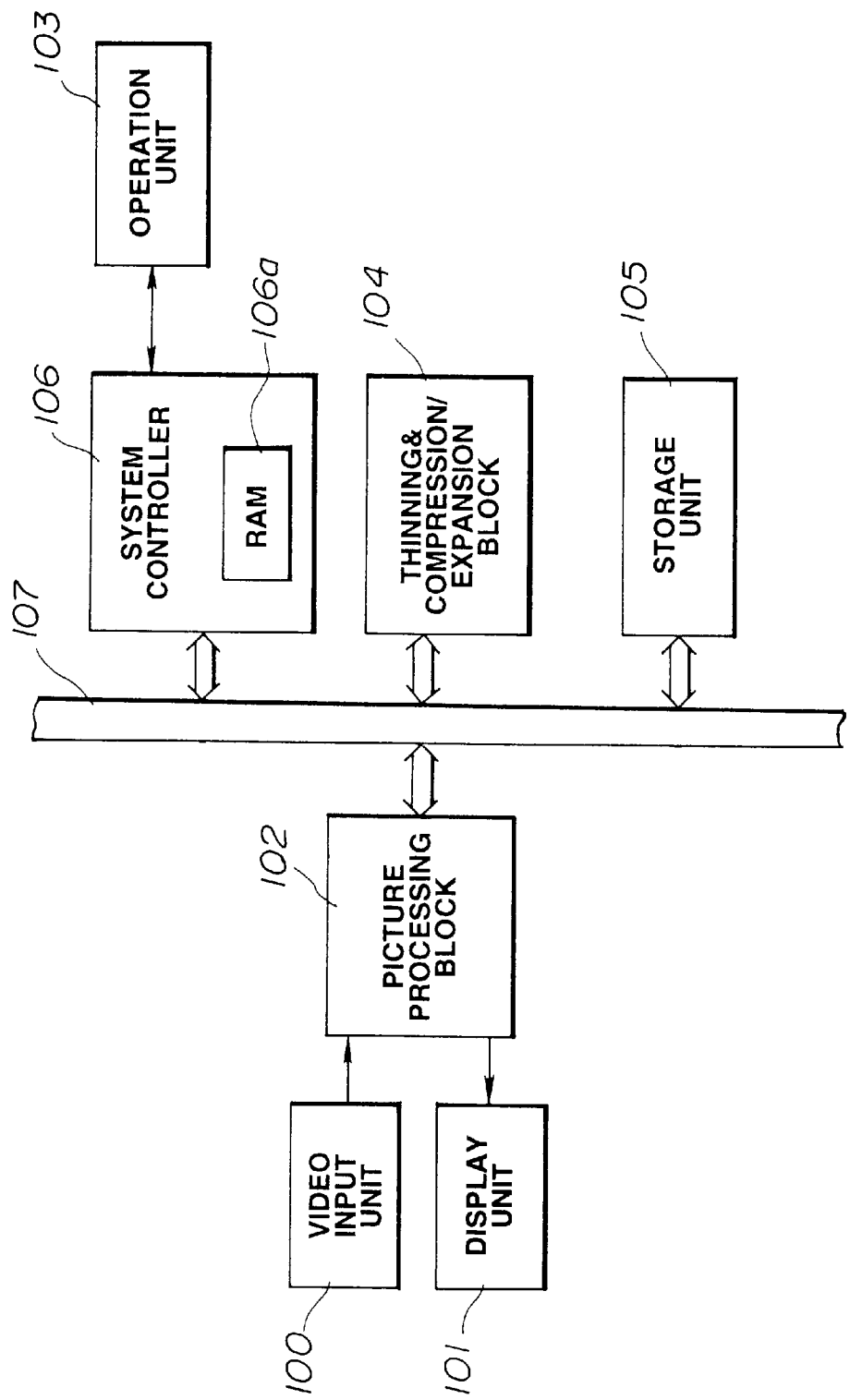
FIG. 40 is a block diagram of a portable recording/reproducing device to which a picture control apparatus, a recording medium, a picture control system and a picture control method according to this invention are applied.

The picture control apparatus, the recording medium, the picture control system and the picture control method according to this invention can be applied to a portable recording/reproducing device (apparatus) as shown in FIG. 40.

This portable recording/reproducing device is of portable size and is easy to carry. Namely, this portable recording/reproducing device is of a structure such that general user is easy to handle. This portable recording/reproducing device includes a video input unit 100 for taking picture data from scanner unit or video tape recorder equipment, etc. which is external equipment into the portable recording/reproducing device, and a display unit 101 which is a compact liquid crystal display unit for displaying picture image taken in from the external equipment, or picture image reproduced from a storage unit 105. Moreover, the portable recording/reproducing device includes a picture processing unit 102 for implementing picture processing designated from user to the picture image taken in from the external equipment, an operation unit 103 for designating the picture processing, etc., a thinning and compression/expansion processing block 104 for implementing thinning and compression/expansion processing to picture data, a storage unit 105 for recording and reproducing, with respect to the optical disc, the picture data which has been caused to undergo thinning and compression/expansion processing and fixed length encoding by the thinning and compression/expansion processing block 104, and a system controller 106 for controlling the operation of the entirety of the portable recording/reproducing device.

Further, the video input unit 100 and the display unit 101 are connected to the picture processing block 102, the operation unit 103 is connected to the system controller 106, and the picture processing block 102, the system controller 106, and the picture processing block 102, the system controller 106, the thinning and compression/expansion processing block 104, and the storage unit 105 are interconnected through bus line 7. Thus, the portable recording/reproducing device is constituted.

The video input unit 100, the display unit 101, the picture processing block 102, the operation block 103, the thinning and compression/expansion processing block 104, the storage unit 105, the system controller 106 and the bus line 107 of such portable recording/reproducing device respectively correspond to the video input unit 8, the monitor unit 9, the operation unit 10, the thinning and compression/expansion processing block 4, the storage unit 5, the system controller 6, and the bus line 7 of the still picture system shown in FIG. 1, and perform operations similar to the above. It is to be noted that this portable recording/reproducing device is made up so that it is inexpensive by taking into consideration the fact that general user side has such device. Therefore, only necessary functions as minimum as possible are provided, and scanner unit 1 and printer unit 2 as in the above-described still picture system are not provided. In addition, print control data which have been described with reference to FIG. 31 are recorded onto the optical disc along with picture data to take this optical disc to, e.g., shop side having the still picture system in which printer unit is provided, thereby making it possible to obtain a desired still picture without designating the number of prints, etc.

The operation for recording the print control data in such portable, recording/reproducing device will now be described. The recording operation for print control data in the portable recording/reproducing device is similar to the recording operation in the above-described still picture system, and is as shown in the flowchart of FIG. 41. The processing operation by the flowchart starts when the main power supply of the portable recording/reproducing device is turned ON to proceed to step S221.

At the step S221, the system controller 106 detects that the optical disc is loaded in the storage unit 105. Thus, the processing operation proceeds to step S222. It is to be noted that the storage unit 105 is adapted to carry out recording/reproduction of high resolution picture data, intermediate resolution picture data, low resolution picture data and print control data, etc., with respect to, e.g., a magneto-optical disc having diameter of 64 mm similarly to the storage unit 5 of the still picture system. In addition, the format, etc. of the optical disc is entirely the same as that of the optical disc 20.

At the step S222, the system controller 106 controls the storage unit 105 so as to read thereinto P-TOC and U-TOC on the optical disc 20 to thereby detect presence or absence of respective data of P-TOC and U-TOC transferred to thereby discriminate whether or not P-TOC and U-TOC exist on the disc. As a result, in the case of No, the processing operation proceeds to step S246 to carry out display control of the display unit 101 so as to display disc error to complete the entire routine shown in FIG. 41. In the case of Yes, the processing operation proceeds to step S223.

At the step S223, the system controller 106 controls the storage unit 105 so as to read thereinto P-TOC and U-TOC, and confirms recording position of data U-TOC. Thus, the processing operation proceeds to step S224.

At the step S224, the system controller 106 controls the storage unit 105 so as read thereinto data U-TOC on the optical disc. Then, the system controller 106 conducts an operation to temporarily store data of the data U-TOC into the RAM 106a of the system controller 106, and to read out it therefrom to thereby grasp positions of respective picture directories and respective files. Thus, the processing operation proceeds to step S225.

At the step S225, the system controller 106 discriminates on the basis of the data of the data U-TOC stored in the RAN 106a whether or not directory (PIC_MD) and overall information management file exist to thereby discriminate whether or not the optical disc is formatted for recording of picture data. As a result, in the case of Yes, the processing operation proceeds to step S226. In the case of No, the processing operation proceeds to step S247 to carry out display control so as to display disc error on the display unit 101, thus to complete the entire routine shown in FIG. 41.

At the step S226, the system controller 106 controls the storage unit 105 so as to read out all management files such as overall information management file, picture data management file and print data management file, etc., and temporarily stores the all management files thus read out into the RAM 106a. Thus, the processing operation proceeds to step S227.

At the step S227, the system controller 106 is brought into print out setting mode for recording print control data. Thus, the processing operation proceeds to step S228.

At the step S228, the system controller 106 detects operation state of the operation unit 103 to thereby discriminate whether or not designation of picture to carry out recording of print control data is made from user. In the case of Yes, the processing operation proceeds to step S238. In the case of No, the processing operation proceeds to step S229.

At the step S229, since designation of picture to carry out picture adjustment is not made from user, the system controller 106 controls the storage unit 105 so as to carry out retrieval of the overall index file. Thus, the processing operation proceeds to step S230.

At the step S230, the system controller 106 controls the display unit 101 so as to display the overall index file retrieved at the step S229. Thus, the processing operation proceeds to step S231.

At the step S231, the system controller 106 detects operation state of the operation unit 103 to thereby discriminate whether or not designation of index picture is made. In the case of No, the step S231 is repeated until the index picture is designated. In the case of Yes, the processing operation proceeds to step S232.

At the step S232, the system controller 106 retrieves picture directory corresponding to the index picture designated at the step S231. Thus, the processing operation proceeds to step S233.

In a more practical sense, picture directory information units (data of 48 bytes) in the overall information management file stored in the RAM 106a are registered by the same number as the number of index pictures (=the number of picture directories) displayed, and are recorded in order in a manner to correspond to display order of the index pictures. Explanation will be given by taking the example where, e.g., the second index picture displayed by the overall information management file is designated. Initially, picture directory information unit of 48 bytes corresponding to the designated second index file is recorded at the second position from the leading portion. Data of "00001" is recorded at the directory number of the second picture directory information unit. By this data, it is recognized that the directory where this index picture is recorded is the picture directory of the second PIC0001.

At the step S233, the system controller 106 retrieves picture index file within the picture directory retrieved at the step S232 on the basis of data of the RAM 106a. Thus, the processing operation proceeds to step S234.

At the step S234, the system controller 106 carries out display control of the display unit 101 so as to display the first picture index file (including 25 index pictures) within the retrieved picture directory. Thus, the processing operation proceeds to step S235.

At the step S235, the system controller 106 detects operation state of the operation unit 103 to thereby discriminate whether index picture that user desires is designated from the displayed index picture. In the case of Yes, the processing operation proceeds to step S238. In the case of No, the processing operation proceeds to step S236.

At the step S236, the system controller 106 detects operation state of the operation unit 103 to thereby discriminate whether or not designation of display of the next picture index file (including the remaining 25 index pictures). In the case of No, the processing operation returns to the above-described step S235. In the case of Yes, the processing operation proceeds to step S237.

At the step S237, the system controller 106 conducts a control to display, on the display unit 101, the remaining 25 index pictures. Thus, the processing operation returns to the step S235.

On the other hand, at the step S235, in the case where it is discriminated that designation of index picture is present, the processing operation proceeds to step S238. The system controller 106 retrieves high resolution picture file or intermediate resolution picture file corresponding to the designated index picture. Thus, the processing operation proceeds to step S239.

In a more practical sense, the system controller 106 selects picture data management file corresponding to the picture directory where displayed index file exists from respective picture data management file of respective picture directories stored in the RAM 106a. In the picture information unit (16 bytes) of the selected picture data management file, the same number of picture information units as the number (N) of indices registered in the picture index file are registered. In addition, these picture information units are recorded in order in a manner to correspond to the order of the displayed indices.

The case where, e.g., 25 index pictures are index file of the first picture directory and the fourth index picture is designated from that index file will be described below. Since the displayed index file is index file of the first picture directory, the system controller 106 first makes reference to data of the first picture data management file in the RAM 106a. When the fourth index picture is designated by user, there is carried out retrieval of the fourth picture information unit of the picture data management file to which reference is being made. In the data within the retrieved picture information unit, data of "00000" is recorded as directory number, and data of "00003" is recorded as picture information. Accordingly, with respect to the picture file of intermediate resolution corresponding to the designated index picture, file name in the picture directory "PIC00000" is judged to be "PSN00003".

It is to be noted that when index picture is selected as described above to retrieve picture file of intermediate resolution corresponding thereto, picture file corresponding to data in the picture information unit of the picture data management file is retrieved on the basis of that data.

At step S239, the system controller 106 carries out display control of the display unit 101 so as to display picture of intermediate resolution reproduced by the storage unit 105. Thus, the processing operation proceeds to step S240.

At the step S240, the system controller 106 forms print control data designated as the result of the fact that user operates the operation unit 103. Thus, the processing operation proceeds to step S241.

In a more practical sense, for example, in the case where there is a necessity of enlarging desired portion of picture displayed on the display unit 101 to print it, user operates the enlargement key provided at the operation unit 103. When the enlargement key is operated, the system controller 106 controls the picture processing block 102 so as to carry out enlargement processing with the center point of display picture being as center by the time (period) during which the enlargement key is operated. The picture processing block 102 forms enlarged picture data by interpolation processing. The system controller 106 conducts display control of the display unit 101 so as to display picture data which have been caused to undergo enlargement processing by the picture processing block 102. Thus, picture image in which the portion in the vicinity of center is enlarged (picture image of the portion in the vicinity of center of original picture) is displayed on the display unit 101.

Then, user operates the cross key provided at the operation unit 103. The system controller 106 controls the display unit 101 so as to display the enlarged picture image in dependency upon operation state of the cross key while scrolling it in upper and lower directions and in left and right directions. Thus, picture image in which the portion that user desires is enlarged of the original picture is displayed on the display unit 101.

In the case where there is a necessity of contracting the original picture to print it, user operates the contraction key provided at the operation unit 103. When this contraction key is operated, the system controller 106 controls the picture processing block 102 so as to carry out contraction processing with the center point of display picture being as center by the time (period) during which the contraction key is operated. The picture processing block 102 forms contracted picture data by thinning processing. The system controller 106 delivers, to the display unit 101, picture data which has been caused to undergo contraction processing by the picture processing block 102. Thus, the contracted original picture image is displayed on the display unit 101. It is to be noted that in the case where display size of the original picture is less than display size by the contraction processing, original picture image in such a form that, e.g., the peripheral portion is surrounded by black picture (other color picture such as white picture, etc. may be employed in addition to the above) is displayed.

Such enlargement processing or contraction processing for picture designates extraction position, etc. of the original picture. As described above, in the case where enlargement or contraction processing is designated, the system controller 106 calculates respective trimming data such as picture extraction start position (X, Y) and extraction size (X, Y) which have been described with reference to FIG. 31. Namely, the system controller 106 calculates data indicating picture processing state of picture image displayed on the display unit 101 after undergone enlargement or contraction processing. As described later, these data are recorded as print control data into the print data file.

In the case where there is a necessity of allowing, e.g., lateral picture to undergo print as longitudinal picture, or in the case where there is a necessity of allowing longitudinal picture to undergo print as lateral picture in a manner opposite to the above, etc., user operates the rotation key provided at the operation unit 103. The system controller 106 controls the picture processing block and the display unit 101 so that picture image displayed on the display unit 101 is displayed in the state rotated by 90 degrees in clockwise direction every time the rotation key is operated once. Thus, lateral picture is displayed as longitudinal picture, or longitudinal picture is displayed as lateral picture on the display unit 101.

In the case where such rotation processing of picture is designated, the system controller 106 calculates print control data of rotation ID which has been described with reference to FIG. 31 to record this data into the print data file as print control data.

In the case where there is a necessity of allowing picture image displayed on the display unit 101 to undergo print in the inverted (reversed) state like in the state where picture image is projected, user operates mirror key provided at the operation unit 103. The system controller 106 controls the picture processing block 102 and the display unit 101 so as to display picture in inverted (reversed) state every time the mirror key is operated. Thus, the original picture is displayed in the inverted state on the display unit 101.

When such reversal processing is designated, the system controller 106 calculates print control data of the mirror ID which has been described with reference to FIG. 31 to record this data into the print data file as print control data.

In the case where there is a necessity of carrying out color processing with respect to display picture to print it, such as, for example, in the case of emphasizing red of picture displayed on the display unit 101, user operates gain operation keys for respective colors of R, G, B provided at the operation unit 103. As described above, gains of respective colors can be adjusted at 1/256 (8 bits) intervals within the range of magnification of 0 to 5. For this reason, when the operation key are operated, the system controller 106 controls, in the + direction or in the − direction, gain of variable amplifier for amplifying picture data of respective colors by the time corresponding to the operation. Thus, picture image corresponding to the color processing, e.g., picture image in which red is emphasized is displayed.

When such color processing is implemented, the system controller 106 calculates respective print control data of color processing ID, R gain, G gain and B gain which have been described with reference to FIG. 31 to record them into print data file as print control data.

In the case where there is a necessity of carrying out print operation of picture in which contrast, brightness, sharpness, saturation and/or hue have been controlled, user operates respective control keys provided at the operation unit 103. The system controller 106 is operative so that when the respective control keys are operated, it controls respective components so as to control contrast, brightness, sharpness, saturation and hue in dependency upon such operation. Thus, picture image in which the contrast, the brightness, the sharpness, the saturation and the hue have been adjusted is displayed on the display unit 101.

The system controller 106 is operative so that when the contrast, the brightness, the sharpness, the saturation, and the hue have been adjusted, it calculates respective print control data of the contrast, the brightness, the sharpness, the saturation and the hue which have been described with reference to FIG. 31 to record such data into the print data file as print control data.

All of above-mentioned picture adjustment can be adjusted by the dedicated keys provided at the operation unit 103. Accordingly, user can designate enlargement, contraction and/or color processing, etc. while looking at picture image actually displayed.

Namely, the respective print control data (extraction ID, extraction start position, extraction size, rotation ID, mirror ID, color processing ID, respective gains of R, G, B, contrast, brightness, sharpness, saturation and hue) formed by the above-mentioned picture adjustment are caused to serve as data indicating picture processing state of picture data displayed on the display unit 101 as they are.

Selection of print size, selection of multi-mode, selection of presence or absence of print of caption, etc., and selection of caption to be subjected to print can be carried out by operating the print designation key provided at the operation unit 103. T he system controller 106 is operative so that when the print designation key is operated, it displays items for carrying out selection of the print size , select ion of multi-mode, selection of presence or absence of print of option and selection of caption to be subjected to print in a form superimposed on picture image currently displayed. User operates the cross key to thereby move cursor displayed within picture on screen to select these items.

When the item of the "print size" is selected, the system controller 106 displays respective select items of E size, L size, K size, cabinet (LL size), one sixth size, quarter size, A6 size, A5 size, A4 size, A3 size and non-regular shape. User operates the cross key to designate print size from those items. When designation of this print size is made, the system controller 106 calculates the designated print size to form this print control data. Data indicating print size of regular shape is recorded into print data file as print control data.

In the case where selection of "regular shape" is not carried out in the item of the print size, but "non-regular shape" is selected, the system controller 106 displays input picture of size in lateral direction (X direction) and size in longitudinal direction (Y direction). Respective sizes can be set in mm units. User inputs desired print size by using ten key provided at the operation unit 103 to designate it. The system controller 106 is operative so that when print size that user desires which does not exist within the regular shape is designated, it calculates print size of the designated non-regular (shape) size to form print control data of the non-regular shape designation which has been described with reference to FIG. 31. Data indicating the non-regular (shape) size is recorded as print control data into the print data file.

When the item of the "multi-mode" is selected, the system controller 106 displays select items for selecting the number of multi-prints (pictures) of 2, 4, 6, 8 and 16. This is item for selecting how many number of the same pictures are subjected to print on a single print paper. In the case where, e.g., the select item of four (pictures) is selected, the print area of the print paper is quartered. Thus, the same pictures displayed on the display unit 101 are respectively subjected to print in divided respective print areas. For this reason, the system controller 106 is operative so that the number of multi-prints is designated, it forms print control data of multi-ID shown in FIG. 31, and forms print control data corresponding to the designated number of multi-prints. Respective data indicating the multi-ID and the number of multi-prints are recorded as print control data into the print data file as has been respectively explained with reference to FIG. 31.

When the item of the "caption" is selected, the system controller 106 displays select items for selecting name table, comment table, and option table. It is sufficient for user to select desired item to be subjected to print from these select items. For example, in the case where "name table" is selected from the select items, caption, etc. attached to the corresponding picture is subjected to print along with the picture displayed on the display unit 101. For this reason, the system controller 106 is operative so that when such selection is made, it forms print control data of caption ID shown in FIG. 31, and forms print control data every kind of caption corresponding to the selected caption. Data indicating the caption ID and caption kind are recorded as print control data into the print data file as has been respectively explained with reference to FIG. 31.

When the system controller 106 forms print control data corresponding to designation by user in this way, the processing operation proceeds to step S241.

At the step S241, the system controller 106 detects operation state of the operation unit 103 to thereby discriminate whether or not determination of all print control data is made. In the case of Yes, the processing operation proceeds to step S242. In the case of No, the steps S240 and S241 are repeated, resulting in the standby state for determination.

At the step S242, since all the print control data are determined at the step S241, all the calculated print control data are recorded into the RAM 106*a* as print information unit shown in FIG. 31 along with picture directory number, the picture number and the picture kind for indicating picture which has been caused to undergo picture adjustment at the step S240. Thus, the processing operation proceeds to step S243.

At the step S243, the system controller 106 detects operation state of the operation unit 103 to thereby discriminate whether or not picture to be subsequently subjected to picture adjustment is designated. In the case of No, the processing operation proceeds to step S244. In the case of Yes, the processing operation proceeds to the step S229. By the routine from the step S229 to the step S243, print control data of new picture is formed.

Namely, since these print information units are formed every pictures in correspondence with respective pictures which have been caused to undergo picture adjustment, when the processing of the step S243 is completed, the same number of print information units as the number of pictures which have been caused to undergo picture adjustment are recorded into the RAM 106*a*.

At the step S244, print data files of a file structure as shown in FIGS. 30 and 31 are recorded onto the optical disc 20 with plural print information unit data formed in correspondence with respective pictures in the RAM 106*a* at the step S243 being as data body. When recording of the print data files is completed, the processing operation proceeds to step S245.

In a more practical sense, explanation will be given by taking the example where print data file of "PRT001.PMO" is newly recorded as shown in FIG. 19. Since print data file of PRT000. PMO exists on the optical disc, "0001" is recorded as total number of files in data of "total number of print data files" within the print data management file. The leading three characters of the file name of the print data file is "PRT". Since next three characters "nnn" are formed as numbers in order of formation of print data files, the newly formed file number becomes "001". Accordingly, file name of the new print data file is determined as "PRT001. PMO". In the case of recording this file, the system controller 106 controls the storage unit 105 on the basis of data of data U-TOC recorded in the RAM 6*a* so that this print data file is recorded into the print directory.

On the other hand, when this new print data file PRT001. PMO is formed, print data management information unit (see FIG. 26(*a*)) corresponding to this file is formed. In the print execution ID within the print data management information unit, "00h" signifying control of the printer unit by print control data recorded in the newly formed print data file PRT001. PMO is recorded.

In this example, in the print data file management information unit corresponding to the already recorded print data file PRT001. PMO, "01h" signifying that the printer unit is not controlled by the print control data recorded in the print data file PRT000. PMO is recorded. Moreover, even if picture processing is implemented to picture data reproduced from the optical disc in print, there is no possibility that the picture data itself is updated. It is indicated that only the execution ID is updated from "00h" into "01h", and that picture is printed out.

At step S245, the system controller 106 reads out print control data temporarily stored in the RAM 106*a* to control the storage unit 1205 so as to update data U-TOC, overall information management file, picture data management file, and print data management file on the optical disc in accordance with the print control data. Thus, the entire routine shown in FIG. 41 is completed.

As stated above, this portable recording/reproducing device can record, onto the optical disc, print control data for designating print of corresponding picture data along with the corresponding picture data. For this reason, by only reproducing (playing back) the optical disc, it is possible to easily recognize which picture is subjected to print among recorded pictures, in what state that picture is subjected to print, and how many number of pictures are subjected to print, etc.

16. Print Operation in the Still Picture System

As described above, in the portable recording/reproducing device, picture processing is implemented to the designated picture data so that picture that user desires is provided, plural print control data are formed as data indicating this picture processing, and these print control data are recorded onto the optical disc 20 as print data file. An operator who operates the still picture system shown in FIG. 1 loads the optical disc 20 into the still picture system to only designate print out, whereby picture processing that use desires is implemented to the designated picture. Thus, print out operation thereof is carried out.

Figure 42:
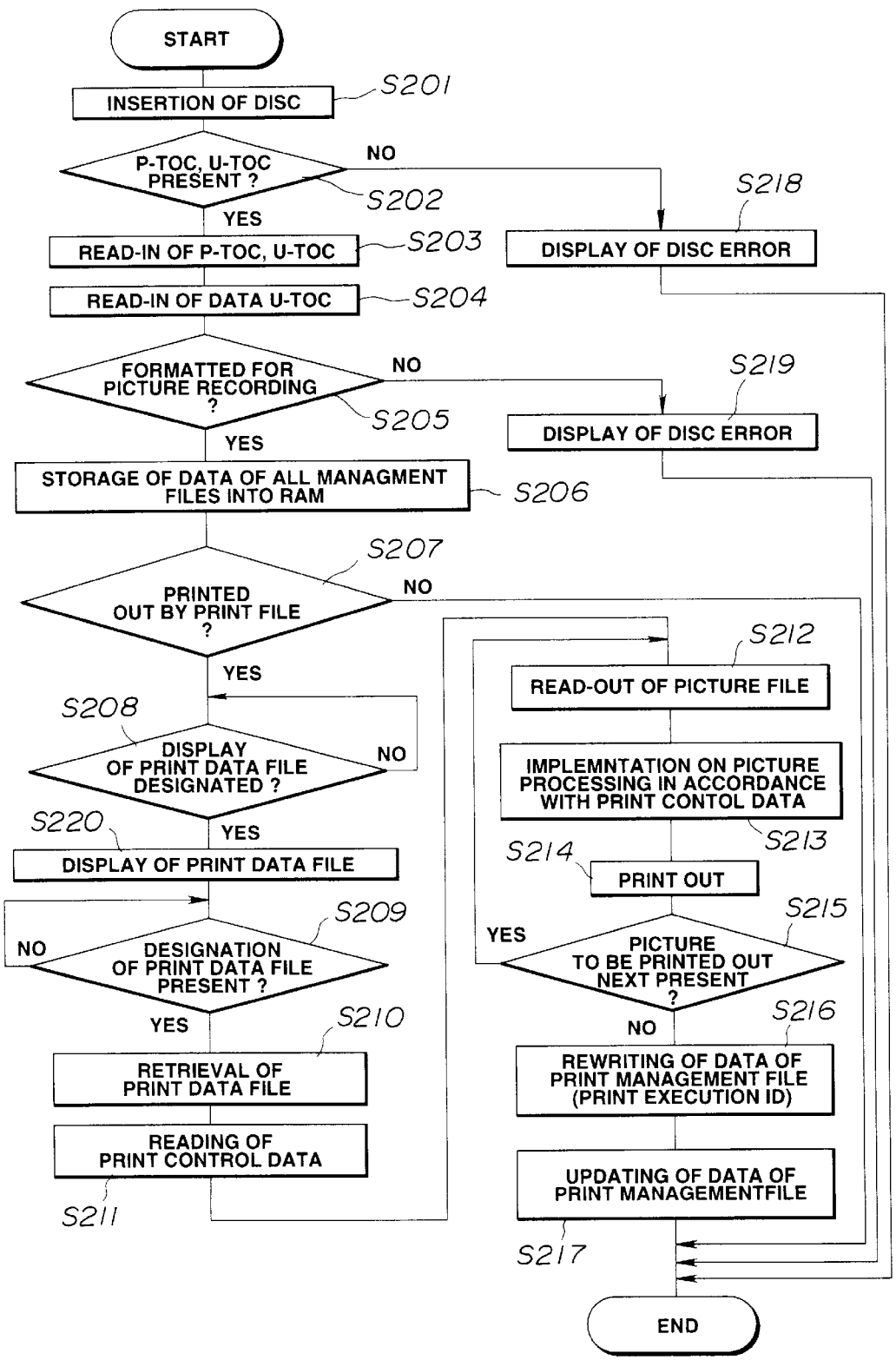
FIG. 42 is a flowchart for explaining print operation in the still picture system.

The print operation in such still picture system is as shown in the flowchart of FIG. 42. The processing operation by this flowchart starts when the print out designation key of the operation unit 10 is turned ON to proceed to step S201.

At the step S201, the system controller 6 detects that the optical disc 20 is loaded into the storage unit 5. Thus, the processing operation proceeds to step S202.

At the step S202, the system controller 6 controls the storage unit 5 so as to read thereinto P-TOC and U-TOC on the optical disc to thereby detect presence or absence of respective data of P-TOC and U-TOC transferred to thereby discriminate whether or not P-TOC and U-TOC exist on the disc. As a result, in the case of No, the processing operation proceeds to step S218 to carry out display control of the monitor unit 9 so as to display disc error to complete the entire routine shown in FIG. 42. In the case of Yes, the processing proceeds to step S203.

At the step S203, the system controller 6 controls the storage unit 5 so as read thereinto P-TOC and U-TOC, and confirms recording position of data U-TOC. Thus, the processing operation proceeds to step S204.

At the step S204, the system controller 6 controls the storage unit 5 so as to read thereinto data U-TOC on the optical disc. Then, the system controller 6 temporarily stores data of the data U-TOC into the RAM 6a of the system controller 6 to thereby grasp positions of respective picture directories and respective files. Thus, the processing operation proceeds to step S205.

At the step S205, the system controller 6 discriminates on the basis of data of data U-TOC stored in the RAM 6a whether or not directory (PIC_MD) and overall information management file exist to thereby whether or not the optical disc is formatted for recording of picture data. As a result, in the case of Yes, the processing operation proceeds to step S206. In the case of No, the processing operation proceeds to step S219 to carry out display control so as to display disc error on the monitor unit 9, thus to complete the entire routine shown in FIG. 42.

At the step S206, the system controller 6 controls the storage unit 5 on the basis of data of the data U-TOC stored in the RAM 6a so as to read out all management files of overall information management file, picture data management file and print data management file, etc., and temporarily store all the management files thus read out into the RAM 6a. Thus, the processing operation proceeds to step S207.

At the step S207, the system controller 6 discriminates by using print data file whether or not picture data is subjected to print out. In this case, judgment is made as to whether print control is automatically carried out by plural print control data recorded as print data file onto the loaded optical disc 20 to carry out print out, or an operator who operates the still picture system shown in FIG. 1 newly reads out picture to implement picture processing so that picture that the operator desires is provided as has been explained in the chapter of the above-described [print operation]. Accordingly, in the case where judgment of Yes is provided at the step S207, it is possible to automatically print out picture that user who has controlled the portable recording/reproducing device desires without allowing the operator to operate the still picture system to newly designate picture processing.

As the result of this judgment, in the case of Yes, the processing operation proceeds to step S208. In the case of No, the processing operation proceeds to step S219 to carry out display control of the monitor unit 9 so as to display disc error to complete the entire routine of FIG. 42.

At the step S208, the system controller 6 detects operation state of the operation unit 10 to thereby discriminate whether or not display designation of file name of print data file is made. In the case of Yes, the processing operation proceeds to step S220. In the case of No, the step S208 is repeated.

At the step S220, the system controller 6 displays file names of "PRT000. PMO" and "PRT001. PMO" recorded as print data file in the print directory as shown in FIG. 19 on the basis of data of data U-TOC and data of print data management file recorded in the RAM 6a. Thus, the processing operation proceeds to step S209. At this time, data of print execution ID recorded in the print data management file is displayed at the same time. Namely, in this case, since print out control has been already carried out by using the print data file, "10h" indicating that print out has been executed is recorded in the print execution ID corresponding to the print data file PRT000. PMO. Accordingly, in this case, characters, such as, for example, "PRT001. PMO USED" are displayed on the screen of the monitor unit 9.

Moreover, since print control has not yet been carried out by using the print data file, "00h" indicating that print out has not been yet executed is recorded in the print execution ID corresponding to the print data file PRT001. PMO. Accordingly, is this case, characters such as, for example, "PRT000. PMO UNUSED" are displayed on the screen of the monitor unit 9.

For this reason, an operator who operates the still picture system shown in FIG. 1 displays the print data file name and the print execution ID, thereby making it possible to judge which print data file records print control data that user desires. In addition, such information can be also utilized as past record information for judging what print data files are formed by user from now.

At the step S209, the system controller 6 detects operation state of the operation unit 10 to thereby discriminate whether or not designation of print data file (the PRT001. PMO in this case) in present. In the case of No, this step S209 is repeated until such designation is made. In the case of Yes, the processing operation proceeds to step S210.

At the step S210, the system controller 6 retrieves on the basis of data of the data U-TOC stored in the RAM 6a which position within file extent area records designated print data file PRT001. PMO.

At step S211, the system controller 6 reproduces the retrieved print data file from the optical disc to control the storage unit 5 so as to read out, every print information unit, the print control data recorded in the print data file. In addition, the print control data thus read out are stored into the RAM 6a every print information unit. Thus, the processing operation proceeds to step S212.

At the step S212, the system controller 6 retrieves recording positions of picture file corresponding to respective position of picture file corresponding to respective data every picture directory number (m), picture number (n) and picture kind (PHP) recorded in the first print information unit recorded in the RAM 6a on the basis of data of the overall management information file and the picture data management file of the RAM 6a. In this case, recording position of file of the high resolution picture file "PHP0000n. PMX" in the picture directory "PIC0000m" is retrieved.

The system controller 6 controls the storage unit 5 so as to reproduce, from the optical disc 20, high resolution picture data included in the retrieved high resolution picture file. Thus, the processing operation proceeds to step S213.

At the step S213, the system controller 6 controls the picture processing block 4 so as to implement picture processing corresponding to print control data such as extraction ID, extraction start position, extraction size, rotation ID, mirror ID, print ID, caption ID, caption kind, color processing ID, respective gains of R, G, B, contrast, brightness, sharpness, saturation, and hue, etc. Thus, the processing operation proceeds to step S214.

The example where caption data is superimposed on picture data on the basis of the caption ID and the caption kind will now be described as one example in this step.

With respect to the caption kind, "11h" is recorded as table ID indicating "name table", "12h" is recorded as table ID indicating "comment table", and "14h" is recorded as table ID indicating "recording date table".

Assuming now that "11h" is recorded as the caption kind, the system controller 6 conducts a control so as to read out name table recorded in the header of high resolution picture file which has been read out at the step S212 on the basis of data of data of "11h" to transfer the caption data of the file name recorded by the ASCII code in the name table to the picture processing block 4. The picture processing block 4 carries out picture processing so as to allow the caption data to be interposed on the designated picture data.

At step 214, the system controller 6 transfers, to the printer unit 2, the high resolution picture data which has been caused to undergo picture processing on the basis of the print control data. At the printer unit 2, picture corresponding to the high resolution picture data which has been caused to undergo picture processing on the basis of the print control data is subjected to print out (printed out). Thus, the processing operation proceeds to step S215.

At the step S215, the system controller 6 discriminates on the basis of the print control data whether or not picture to be subjected to print out next is present.

Namely, at the step S215, the system controller 6 discriminates on the basis of total number of print data files stored in the RAM 6a whether or not picture to be subjected to print out next is present. If the number of pictures which have been caused to undergo print processing at the step S214 is in correspondence with the total number of prints, it is judged that there is no picture to be subjected to print out next.

On the other hand, in the case where the number of pictures which have been caused to undergo print processing at the step S214 is not in correspondence with the total number of prints, the system controller 6 makes reference, in order to print out next picture data, to respective data of picture directory number, picture number and picture kind recorded in the next print information unit recorded in the RAM 6a. Thus, the processing operation returns to the step S212.

At times subsequent thereto, in a manner similar to the above, processing from the step S212 to the step S215 are repeated until print out operations of all picture data registered in the designated print data file are completed. When print out operations of all picture data are completed, the processing operation proceeds to step S216.

Up to the step S215, data of "01h" is recorded as print execution ID corresponding to the print data file PRT001. PMO in the print data management file of the RAM 6a. At the step S216, data of the print execution ID recorded as "01H" is rewritten into data of "00h" indicating that print out operation has been executed. The reason why the print execution ID is rewritten in this way is to clarify that picture has been subjected to print out by using the print data file PRT001. PMO. Thus, in the case where, e.g., in the portable recording/reproducing device, user desires to newly carry out print out of print data file PRT002. PMO, it is possible to prevent inconvenience such that operator who operates the still picture system erroneously carries out print out operation of any other print data file such as print data file PRT001. PMO, etc.

At the step S217, since the print execution ID of the print management file in the RAM 6a was rewritten at the step S216, the system controller 6 controls the storage unit 5 so as to overwrite data of the print management file onto data of the print management file on the optical disc 20 to update the above-mentioned ID. Thus, the entire routine of the flowchart shown in FIG. 42 is completed.

As stated above, an approach is employed to record print control data on the optical disc 20, thereby making it possible to carry out print out of still picture that user desires without carrying out setting of print out.

Figure 43:
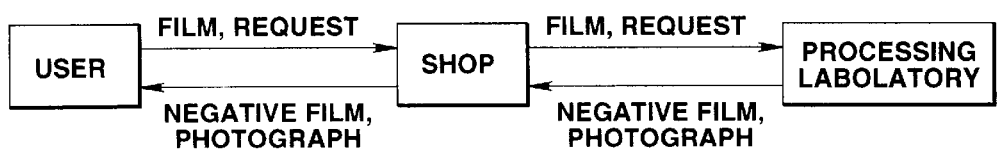
FIG. 43 is a view for explaining a conventional system of obtaining still picture.

Hitherto, as a system of obtaining still picture, as shown in FIG. 43, there is popular a system such that user takes, to a shop (store), a photographed film for photography formed by taking images of objects by using a camera device in which, e.g., photographic film of 35 mm is loaded to designate development of the film, and to carry out request such as the number of prints, or color processing, and the shop side informs the processing laboratory of such request, whereby the negative film and photographs are handed to user through the shop side for a second time.

On the contrary, in the portable recording/reproducing device (apparatus) and the still picture system according to this invention, user records, onto the optical disc, picture data and print control data for the picture data by using the portable recording/reproducing device, whereby user's request in carrying out print out such picture is recorded. For this reason, user takes the optical disc to the shop provided with the still picture system, thereby making it possible to recognize request for print by reproducing (playing back) the optical disc even if user makes a request for print. Thus, still picture corresponding to user's request can be subjected to print out at the printer unit of the still picture system.

Figure 44:
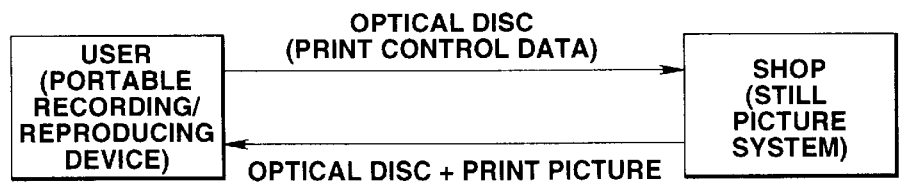
FIG. 44 is a view for explaining a novel system of obtaining still picture realized by this invention.

Accordingly, user is caused to have a portable recording/reproducing (playback) device, and the shop side is caused to have a still picture system as described above, thereby making it possible to realize an entirely new system of obtaining still picture in which the processing laboratory is omitted as shown in FIG. 44. In addition, in the portable recording/reproducing (playback) device and the still picture system, since the magneto-optical is used as the optical disc, it is possible to carry out desired number of rewrite operations of picture data and print control data. Thus, goods excellent in convenience can be provided.

As is clear from the foregoing description, since the picture control apparatus, the recording medium, the picture control system and the picture control method according to this invention can record picture data onto a recording medium along with print control data such as the number of prints and/or color designation, etc. of the picture, entirely new system of obtaining still picture can be realized.

What is claimed is:

1. An apparatus for forming Picture control data on a recording medium that stores data for a plurality of images, the data stored on the recording medium having a hierarchical directory structure with a main directory and a plurality of subdirectories, an image being recorded on the recording medium in a first picture file that has first picture data of a first resolution, and a second picture file that has second picture data of a second resolution, the second resolution being higher than the first resolution, the picture control apparatus comprising:

a storage unit that retrieves the first picture file or the first and second picture files from the recording medium, and stores a print control data file related to the first or second picture files on the recording medium, the first and second picture files being stored in a first subdirectory on the recording medium, the print control data file being stored in a second subdirectory on the recording medium;

a display;

a picture processing block connected to the display, the picture processing block driving the display to display the image in response to the first picture data; and a controller connected to the storage unit and the picture processing block that requests retrieval of the first picture file from the first subdirectory when a user selects the first picture file, requests retrieval of the first and second picture files from the first subdirectory when the user selects the second picture file, receives customization data input from the user that modifies the first picture data, forms the print control data file so that the print control data file identifies the customization data and whether the customization data applies to the first picture file or the second picture file, and requests storage of the print control data in the second subdirectory.

2. The apparatus as set forth in claim 1, wherein the print control data file recorded onto the recording medium controls an external device when the recording medium is loaded into the external device.

3. The apparatus as set forth in claim 2, wherein when the customization data applies to the second picture file, a picture printed from the second picture data corresponds with the first picture data as modified by the customization data.

4. The apparatus of claim 1 wherein the second subdirectory includes a number of print control data files and a control data management file that manages the print control data files, the control data management file having information that indicates the number of print control data files that are managed by the control data management file.

5. The apparatus as set forth in claim 4, wherein the recording medium comprises a first area and a second area, the first area storing the first picture file, the second picture file, the control data file and the control data management file, the second area storing a management information table that manages the first area, wherein the print control data file is recorded in the first area on a basis of the control data management file and the management information table.

6. The apparatus of claim 4, wherein an external device is controllable by the print control data file recorded onto the recording medium when the recording medium is loaded into the external device, and wherein the control data management file includes information that indicates whether the external device is to be controlled by the print control data file.

7. The apparatus as set forth in claim 2, wherein the external device comprises reproducing means for reproducing the second picture data of the second resolution as modified by the print control data file, and print means for carrying out a print out operation of the second picture data of the second resolution on a basis of the print control data file.

8. The apparatus as set forth in claim 7, wherein the print control data file includes additional information that indicates whether a table recorded in a header of the second picture file is subjected to the print out operation along with the second picture data of the second resolution, wherein an operation is conducted by the reproducing means to reproduce the second picture data of the second resolution on a basis of the print control data file, and to reproduce the additional information when indicated, and wherein an operation is conducted by the print means to carry out the print out operation of the second picture data of the second resolution in a manner such that the additional information is superimposed thereon.

9. The apparatus as set forth in claim 8, wherein the additional information is a file name of the second picture file.

10. The apparatus as set forth in claim 7, wherein the print control data file includes trimming data for designating a print area in carrying out print out operation of the second picture data of the second resolution by the print means.

11. The apparatus as set forth in claim 7, wherein the print control data file includes color adjustment data for designating hue or tint in carrying out print out operation of the second picture data of the second resolution by the print means.

12. A system for operating on a recording medium that stores data for a plurality of images, the data stored on the recording medium having a hierarchical directory structure with a main directory and a plurality of subdirectories, an image being recorded on the recording medium in a first picture file that has first picture data of a first resolution, and a second picture file that has second picture data of a second resolution, the second resolution being higher than the first resolution, the system comprising:

a first picture control unit having:

first picture processing means for customizing the first picture data of the first resolution reproduced from the recording medium;

control data generating means for generating control data for indicating a customization of first picture data of the first resolution by the first picture processing means; and recording means for recording, onto the recording medium, the control data generated by the control data generating means as a print control data file, the first and second picture files being stored in a first subdirectory on the recording medium, the print control data file being stored in a second subdirectory on the recording medium; and a second picture control unit having:
  reproducing means for reproducing, from the recording medium, the second picture data of the second resolution and the print control data file, and
  second picture processing means for implementing picture processing to the second picture data on a basis of the print control data file reproduced by the reproducing means.

13. The system as set forth in claim 12, wherein a picture printed from the second picture data corresponds with the first picture data as modified by the customization.

14. The system as set forth in claim 13, wherein the second subdirectory includes a number of print control data files and a control data management file that manages the print control data files, the control data management file having information that indicates the number of print control data files that are managed by the control data management file.

15. The system as set forth in claim 14,
  wherein the recording medium is composed of a first area and a second area, the first area storing the first picture file, the second picture file, the control data file and the control data management file, the second area storing a management information table that manages the first area, and
  wherein the print control data file is recorded in the first area on a basis of the control data management file and the management information table.

16. The system as set forth in claim 14, wherein the control data management file includes execution discrimination data indicating whether picture processing based on the print control data file should be executed by the second picture processing means with respect to the second picture data of the second resolution.

17. The system as set forth in claim 16,
  wherein the reproducing means of the second picture control unit reproduces control data included in the print control data file on a basis of the execution discrimination data, and
  wherein the second picture processing means implements picture processing corresponding to the control data to the second picture data of the second resolution on the basis of the execution discrimination data.

18. The system as set forth in claim 16,
  wherein when picture processing is implemented to the second picture data of the second resolution by the second picture processing means on a basis of control data included in the print control data file,
  the execution discrimination data is rewritten to indicate that picture processing has been executed.

19. The system as set forth in claim 12,
  wherein the second picture control unit further comprises print means for carrying out a print out operation of the second picture data of the second resolution on a basis of the print control data file, and
  wherein the print control data file includes print control data for controlling the print means.

20. The system as set forth in claim 19,
  wherein the print control data file includes additional information that indicates whether a table recorded in a header of the second picture file should be caused to undergo the print out operation along with the second picture data of the second resolution,
  whereby an operation is conducted by the reproducing means to reproduce the second picture data of the second resolution on a basis of the print control data file, and to reproduce the additional information when indicated, to carry out, by the print means, the print out operation of the second picture data of the second resolution in such a manner that the additional information is superimposed thereon.

21. The system as set forth in claim 20, wherein the additional information is a file name of the second picture file.

22. The system as set forth in claim 19, wherein the print control data file includes trimming data for designating a print area in carrying out the print out operation of the second picture data of the second resolution by the print means.

23. The system as set forth in claim 19, wherein the print control data file includes color adjustment data for designating hue or tint in carrying out the print out operation of the second picture data of the second resolution by the print means.

24. A method for using a recording medium with a first picture control unit and a second picture control unit,
  the recording medium storing data for a plurality of images, the data stored on the recording medium having a hierarchical directory structure with a main directory and a plurality of subdirectories, an image being recorded on the recording medium in a first picture file that has first picture data of a first resolution, and a second picture file that has second picture data of a second resolution, the second resolution being higher than the first resolution,
  a first picture control unit having:
    first picture processing means for customizing the first picture data of the first resolution reproduced from the recording medium;
    control data generating means for generating control data for indicating a customization of first picture data of the first resolution by the first picture processing means; and
    recording means for recording, onto the recording medium, the control data generated by the control data generating means as a print control data file, the first and second picture files being stored in a first subdirectory on the recording medium, the print control data file being stored in a second subdirectory on the recording medium; and
  a second picture control unit having:
    reproducing means for reproducing, from the recording medium, the second picture data of the second resolution and the print control data file, and
    second picture processing means for implementing picture processing to the second picture data on a basis of the print control data file reproduced by the reproducing means,
  the method comprising the steps of:
    customizing the first picture data of the first resolution reproduced from the recording medium by the first picture control unit,
    generating control data on a basis of the customization of the first picture data of the first resolution by the first picture control unit,
    recording onto the recording medium the control data as a print control data file, the first picture file and the second picture file being stored in a first subdirectory, the print control data file being stored in a second subdirectory, reproducing from the recording medium the second picture data of the second resolution and the print control data file by the second picture control unit, and implementing picture processing to the second picture data of the second resolution on a basis of the print control data file by the second picture control unit.

25. The method as set forth in claim 24, wherein a picture printed from the second picture data corresponds with the first picture data as modified by the customization.

26. The method as set forth in claim 25, wherein the second subdirectory includes a number of print control data files and a control data management file that manages the print control data files, the control data management file having information that indicates the number of print control data files that are managed by the control data management file.

27. The method as set forth in claim 26, wherein the recording medium is composed of a first area and a second area, the first area storing the first picture file, the second picture file, the control data file and the control data management file, the second area storing a management information table that manages the first area, and wherein the print control data file is recorded in the first area on a basis of the control data management file and the management information table.

28. The method as set forth in claim 26, wherein the control data management file includes execution discrimination data indicating whether picture processing based on the print control data file is executed by the second picture processing unit.

29. The method as set forth in claim 28, wherein control data included in the print control data file is reproduced on a basis of the execution discrimination data, and wherein picture processing corresponding to the control data is implemented to the second picture data of the second resolution on a basis of the execution discrimination data.

30. The method as set forth in claim 28, and further comprising the step of:

writing data which indicates that picture processing has been executed in the second picture processing unit.

31. The method as set forth in claim 24, and further comprising the step of carrying out a print out operation of the second picture data of the second resolution which has been caused to undergo picture processing by the second picture control unit, and wherein the print control data file includes print control data for controlling the print means.

32. The method as set forth in claim 31, wherein the print control data file includes additional information that indicates whether a table recorded in a header of the second picture file is subjected to the print out operation along with the second picture data of the second resolution, wherein the second picture data of the second resolution is reproduced on a basis of the print control data file, and the additional information is reproduced from the second picture file on a basis of the discrimination data, and wherein a print out operation is carried out on the second picture data of the second resolution in such a manner the additional information is superimposed thereon.

33. The method as set forth in claim 32, wherein the additional information is a file name of the second picture file of the second resolution.

34. The method as set forth in claim 31, wherein the print control data file includes trimming data for designating a print area in carrying out the print out operation of the second picture data of the second resolution by the print means.

35. The method as set forth in claim 31, wherein the print control data file includes color adjustment data for designating hue or tint in carrying out the print out operation of the second picture data of the second resolution by the print means.

* * * * *